United States Patent [19]
Mitsuishi et al.

[11] Patent Number: 5,933,344
[45] Date of Patent: Aug. 3, 1999

[54] MICROPROCESSOR HAVING TIMER CIRCUIT GENERATING COMPLEMENTARY NON-OVERLAPPED PWM SIGNALS

[75] Inventors: Naoki Mitsuishi, Kodaira; Hiroshi Saito, Koganei; Kenji Takechi, Kokubunji; Hisashi Kajiwara, Toukai-mura; Hiromasa Yamagata, Hitachi; Koichi Hashimura, Koganei, all of Japan

[73] Assignee: Hitachi, Ltd., Tokyo, Japan

[21] Appl. No.: 08/614,715

[22] Filed: Mar. 13, 1996

[30] Foreign Application Priority Data

Mar. 20, 1995 [JP] Japan .................................. 7-085927

[51] Int. Cl.$^6$ .................................................. G05B 11/01
[52] U.S. Cl. ...................... 364/142; 364/136; 364/141; 364/486; 364/487
[58] Field of Search ........................... 364/724.01, 724.1, 364/724.16, 723, 757, 758, 487, 130, 136, 141, 143, 140.08, 148.01, 148.08, 486, 724.14, 224.03, 736.01; 375/1; 235/92 PE

[56] References Cited

U.S. PATENT DOCUMENTS

| | | | |
|---|---|---|---|
| 4,104,629 | 8/1978 | Isbister et al. .......................... 343/6 R |
| 4,144,447 | 3/1979 | Fossum et al. ...................... 235/92 PE |
| 5,095,878 | 3/1992 | Kumagai et al. .......................... 123/489 |
| 5,132,682 | 7/1992 | Higgins et al. .......................... 340/931 |
| 5,148,095 | 9/1992 | Miller et al. .............................. 320/22 |
| 5,222,009 | 6/1993 | Scharnick et al. ......................... 361/28 |
| 5,237,264 | 8/1993 | Moseley et al. .......................... 232/324 |
| 5,278,864 | 1/1994 | Mori et al. .................................... 375/1 |
| 5,476,010 | 12/1995 | Fleming et al. ........................... 73/620 |
| 5,479,532 | 12/1995 | Abel et al. ............................... 382/137 |
| 5,592,403 | 1/1997 | Trager et al. ....................... 364/724.01 |
| 5,614,720 | 3/1997 | Morgan et al. ....................... 250/360.1 |

OTHER PUBLICATIONS

Excerpts from "H8/3003 Hardware Manual" issued by Hitachi in Mar., 1993.

*Primary Examiner*—Paul P. Gordon
*Assistant Examiner*—Ramesh Patel
*Attorney, Agent, or Firm*—Loudermilk & Associates

[57] ABSTRACT

Two up-counters and two down-counters having a time difference corresponding to a dead time are provided to realize an up-down symmetric count, such that the up-counters and the down-counters are made to count the lower limit and the upper limit (a ½ period+the dead time), the up-counter for counting a relatively large value and the down-counter for counting a relatively large value are made to contact at the upper limit, the up-counter for counting a relatively small value and the down-counter for counting a relatively small value are made to intersect at a count value corresponding to the ½ period, the up-counter for counting the relatively large value and the down-counter for counting the relatively large value are made to intersect at the count value corresponding to the dead time, and the up-counter for counting the relatively small value and the down-counter for counting the relatively small value are made to contact at the lower limit.

19 Claims, 49 Drawing Sheets

COMPARE MATCH BUFFER OPERATION

INPUT CAPTURE BUFFER OPERATION

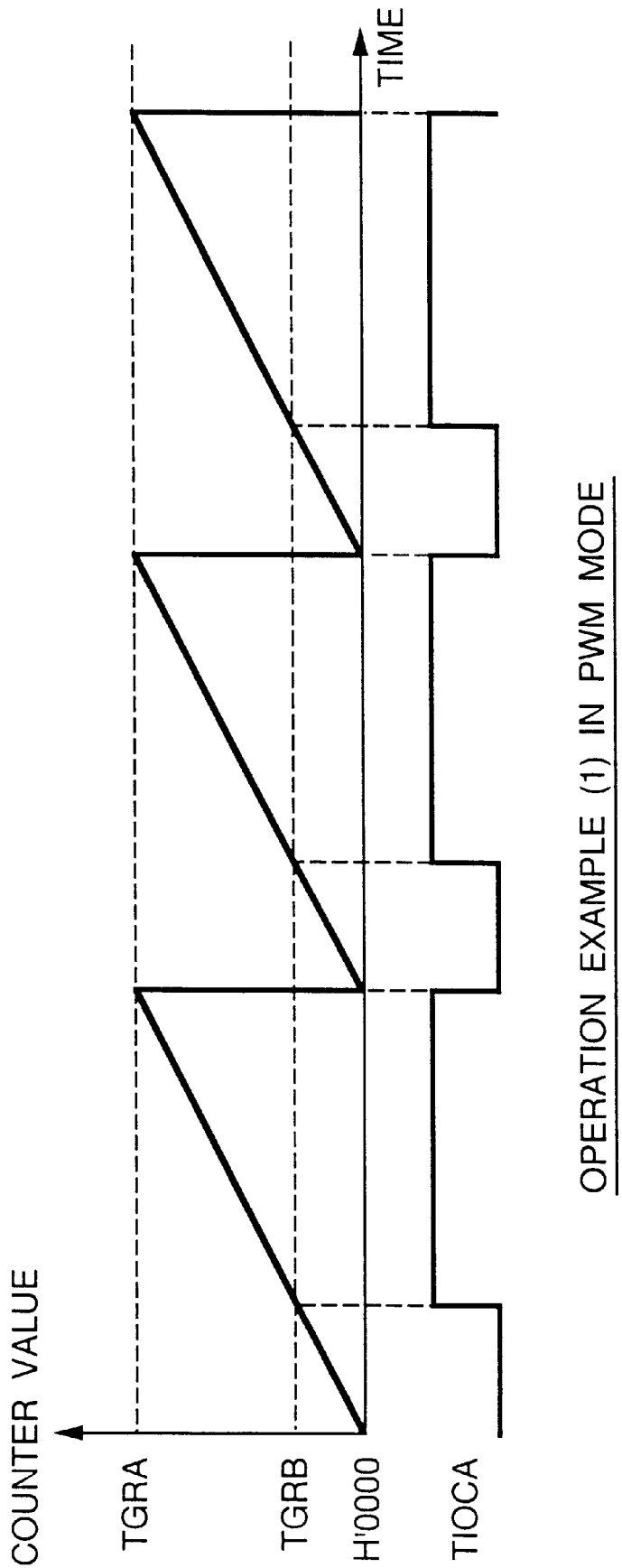

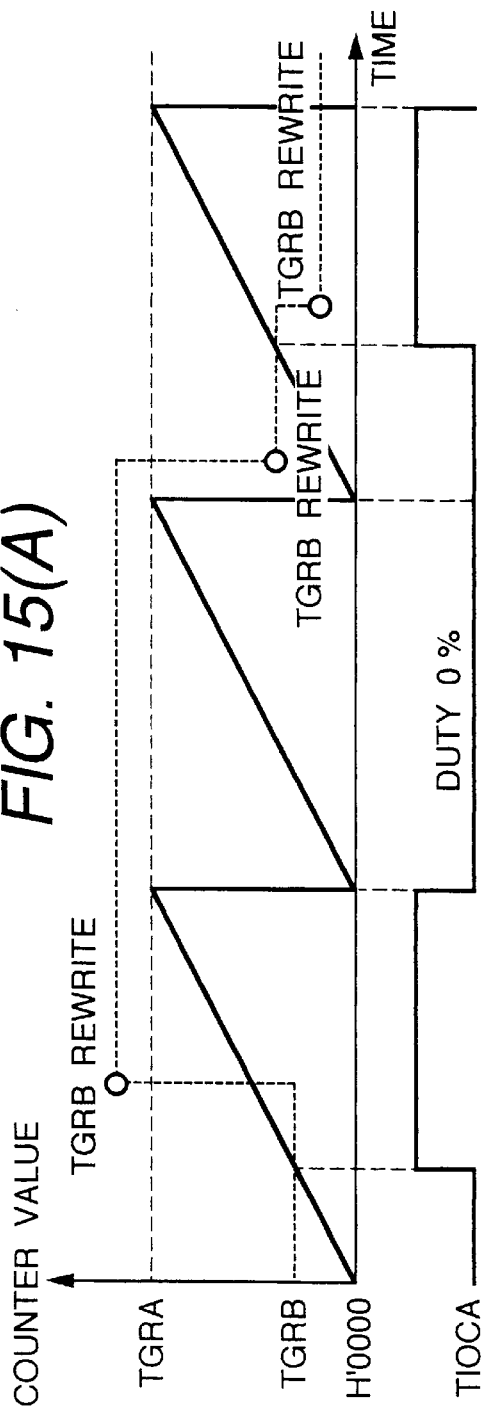
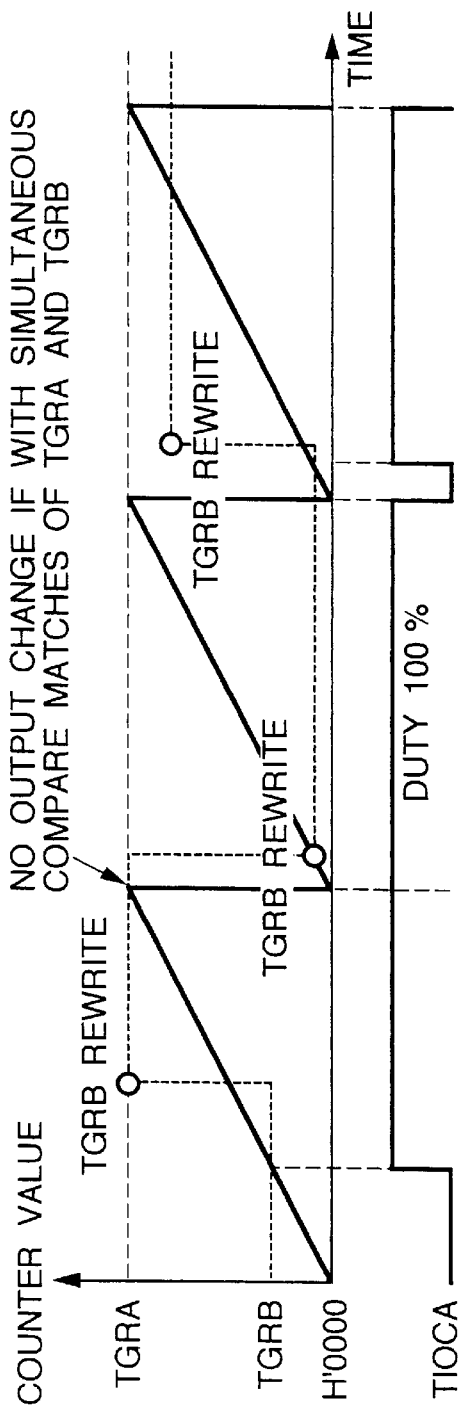

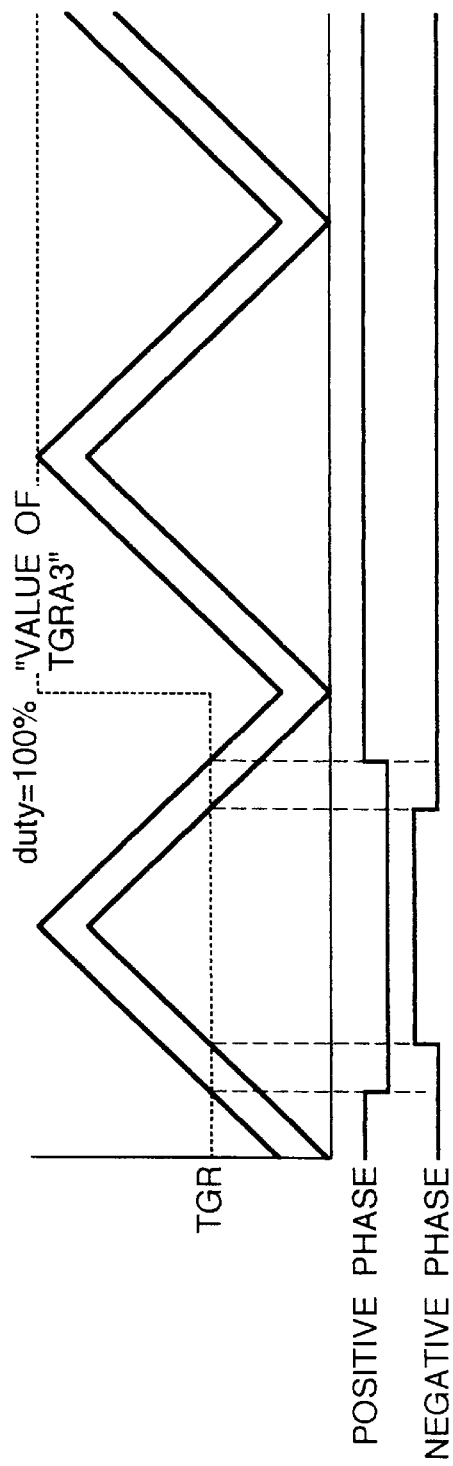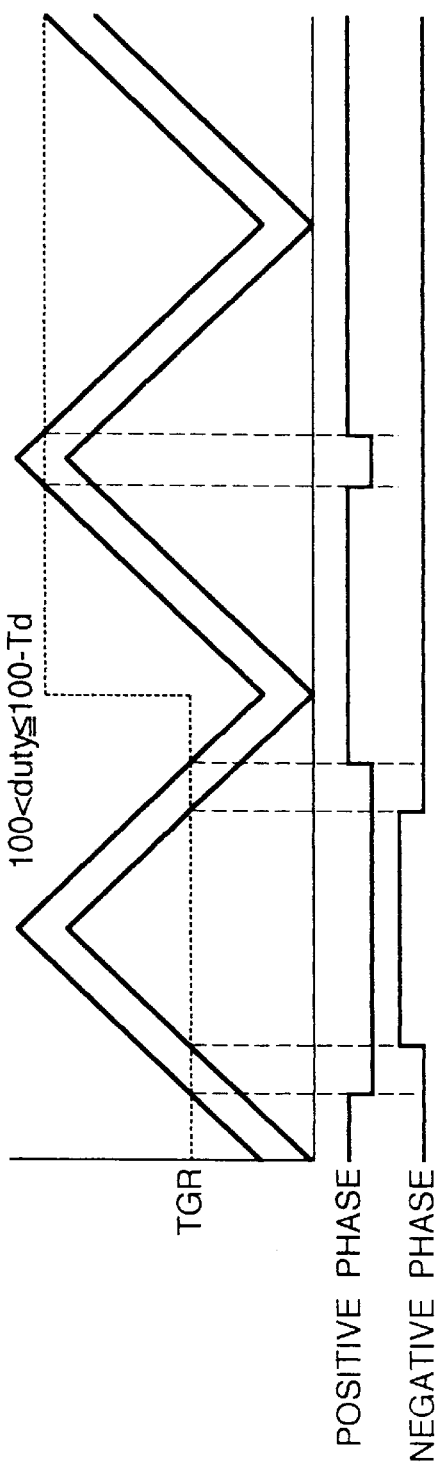

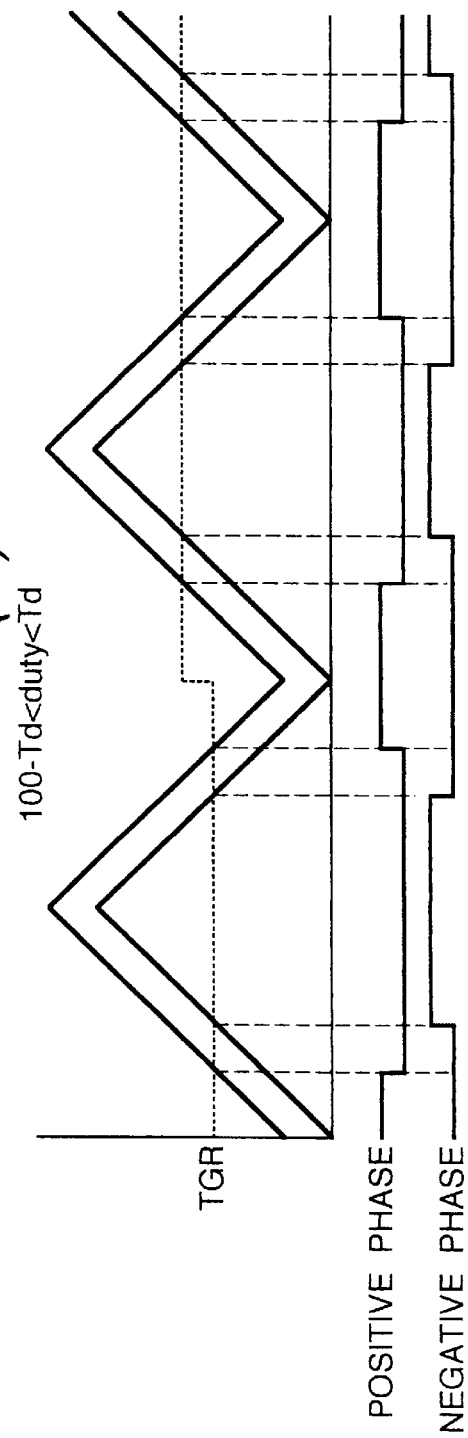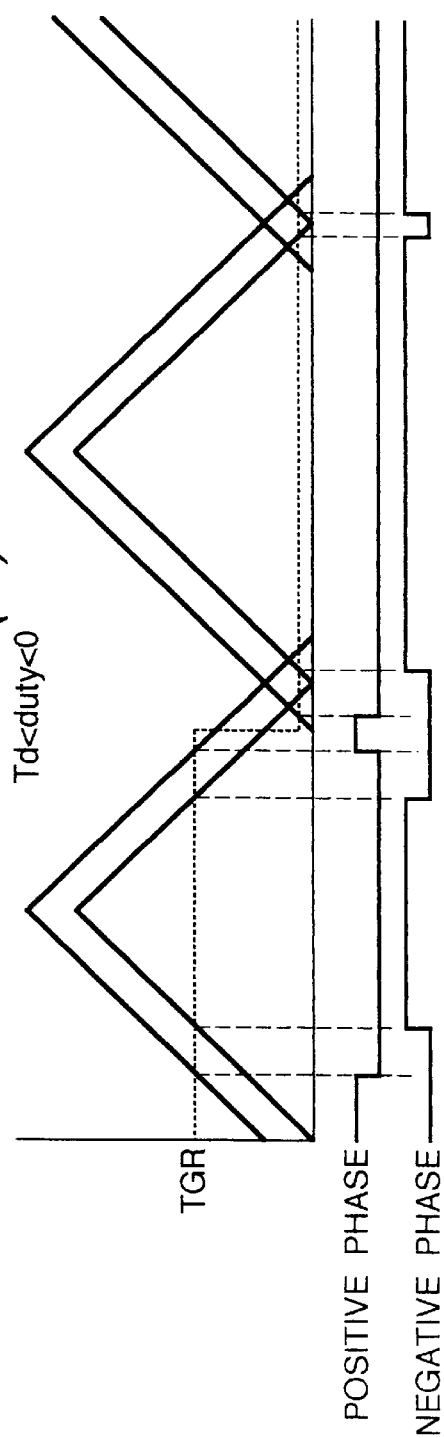

BUFFER TRANSFER SIGNAL GENERATION TIMING CHART (φ/2)

GENERATION (φ/2) OF COUNTER/REGISTER SELECT SIGNALS m=1 m=0.6

MICROPROCESSOR HAVING TIMER CIRCUIT GENERATING COMPLEMENTARY NON-OVERLAPPED PWM SIGNALS

BACKGROUND OF THE INVENTION

The present invention relates to a control apparatus and a control system and, more particularly, to a microcomputer, a data processor or a semiconductor integrated circuit device having a packaged timer for driving a motor, and a technique which is effective if applied to a control system for driving the motor by using it.

The microcomputer is made, as described on pp. 540 and 541 of "LSI Handbook" issued by OHM on Nov. 30, 1984, by forming around a central processing unit CPU and over one semiconductor substrate functional blocks including a program holding ROM (Read Only Memory), a data latching RAM (Random Access Memory) and input/output circuits such as a timer for inputting/outputting data.

This microcomputer may be used for controlling the drive of a motor. For example, a single-chip microcomputer which has a packaged timer for performing the PWM (Pulse Width Modulation) output suited for the so-called "inverter motor control" such as the motor control of an air conditioner or an AC induction servo-motor, is disclosed in "H8/3003 Hardware Manual" issued by HITACHI in March of 1993. The inverter motor is driven with a three-phase sinusoidal signal (U, V and W). The aforementioned single-chip microcomputer drives the aforementioned motor by generating the PWM output which is approximated by a carrier wave having a higher frequency than that of the sinusoidal wave.

The aforementioned timer outputs the three-phase PWM with two up/down counters and three compare registers. In the so-called "180-degree power supply system", the so-called "dead time" has to be interposed between upper and lower arms so as to prevent the short-circuit of the arms. The compare registers are individually equipped with buffer registers for transferring the data to the compare registers when the counters reach their lower limit value (or valley) or their upper limit value (or crest).

SUMMARY OF THE INVENTION

In the complementary PWM mode of the timer disclosed on pp. 372 to 380 of the aforementioned "H8/3003 Hardware Manual", however, it is possible to make six-phase (or three pairs) PWM outputs in a complementary non-overlap relation. However, the following problems arise:

(1) Pulses of duties of 0% and 100% can be produced for values over the upper limit and below the lower limit but rise to 100%, if the aforementioned value is given when the timer counters are at the lower limit, but drop to 0% if the aforementioned value is given when the timer counters are at the upper limit. Therefore, the central processing unit has to decide the direction of the timer counters and to write a new compare value in the buffer registers. Thus, there arises a problem that the data setting timing has to be changed while the aforementioned arbitrary duty pulse from 0% to 100% are being outputted. Moreover, the pulses of the duties of 0% and 100% go out of shift by a half period. This leads to a problem that the maximum torque cannot be ensured in the case of the motor drive.

(2) Any intermediate setting between the dead time of 0% and the dead time of 100% is disabled so that pulses of an arbitrary duty cannot be outputted. A heavy load is exerted upon the central processing unit if that disabling is to be avoided. Because an arbitrary duty from 0% to 100% cannot be realized, on the other hand, there arises a problem that a ripple occurs in the rate and torque.

(3) The crest/valley data cannot be rewritten. Thus, there arises a problem that the timing to be set cannot be shorter than one period thereby to make it difficult to improve the accuracy.

An object of the present invention is to provide a control apparatus having a packaged timer and a control system using the apparatus, which is enabled: (1) to make the complementary PWM output of 0% to 100% without burdening the central processing unit; (2) to match the phases of 0% and 100%; (3) to offer the dead time (or the non-overlap time) without fail at the ON-OFF and OFF-ON between the positive/negative phases; (4) to make the positive/negative phase OFF period shorter than twice as long as the dead time; (5) to make the positive/negative phase duties symmetric around the duty of 50%; (6) to make the rewrite timing of the data of the compare registers arbitrary; and (7) to facilitate the rewriting of the duty values even by the data transfer unit. These and other objects and features of the invention will be apparent from the description of the specification and the accompanying drawings.

A representative one of the inventions to be disclosed herein will be briefly summarized in the following. Specifically, (1) two up-counters and two down-counters having time differences corresponding to the dead time are provided to count values between the lower and upper limits (i.e., ½ period+dead time) such that the upper limit of the up-counter for counting the relatively large value is equalized to the lower limit of the down-counter for counting the relatively large value, such that the upper limit of the up-counter for counting the relatively small value and the down-counter for counting the relatively small value intersect at a count value corresponding to the ½ period, such that the up-counter for counting the relatively large value and the down-counter for counting the relative large value intersect at a count value corresponding to the dead time, and such that the up-counter for counting the relatively small value and the down-counter for counting the relatively small value contact at the lower limit, whereby the upper and lower symmetric counts are realized.

(2) Data of a first compare register (TGR or general register) and a data of a second compare register (BR or buffer register) can be compared with a data (count value) of the aforementioned counters so that they are compared when the aforementioned counter values are smaller than the dead time and larger than the count value corresponding to the ½ period and so that only the first comparisons are compared when the same is larger than the dead time and smaller than the count value corresponding to the ½ period.

(3) When the positive-phase output is in an OFF level state so that the compare registers coincide with the up-count for counting the relatively small value, the negative-phase output is set to an ON level. When the compare registers coincide with the down-count for counting the relatively small value, the negative-phase is set to an OFF level. When the negative-phase is in the OFF level state so that the compare registers coincide with the down-count for counting the relatively large value, the positive-phase output is set to the ON level. When the compare registers coincide with the up-count for counting the relatively large value, the positive-phase output is set to the OFF level.

(4) The central processing unit CPU data in writes data in the second compare register. When a transition is made from the region for the second comparison to the region for only the first comparison, the data can be transferred from the second compare register to the first compare register by the hardware. It is further possible to select the data transfer from the second compare register to the first compare register, when the transition is made from the region for the two comparisons to the region for only the first comparison at the up-count time, and the data transfer from the second compare register to the first compare register when the transition is made from the region for the two comparisons to the region for only the first comparison at the down-count time.

According to the above-described means, (1) the count operation and the compare operation can be made symmetric to make upper/lower symmetric outputs around the output of 50% (i.e., the count value of ½ period+¼ dead time). (2) Since the ON-OFF output change and the OFF-ON output change never fail to occur as a pair of events across the crest/valley, an arbitrary value from the lower limit to the upper limit can be set at any time. (3) No restriction is exerted upon the setting of outputs from 0% to 100% so that the outputs of 0% and 100% can match in phase. (4) The dead time can be retained without fail by switching ON one output while the other is OFF.

BRIEF DESCRIPTION OF THE DRAWINGS

FIG. 14 is an operation waveform chart for explaining an operation in a PWM mode according to the present invention;

FIGS. 15(A) and 15(B) are an operation waveform chart for explaining another operation in the PWM mode according to the present invention;

FIGS. 25(A) and 25(B) are a waveform chart for explaining an output example in the complementary PWM mode according to the present invention;

FIGS. 26(A) and 26(B) are a waveform chart for explaining an output example in the complementary PWM mode according to the present invention;

DESCRIPTION OF THE PREFERRED EMBODIMENTS

Figure 1:
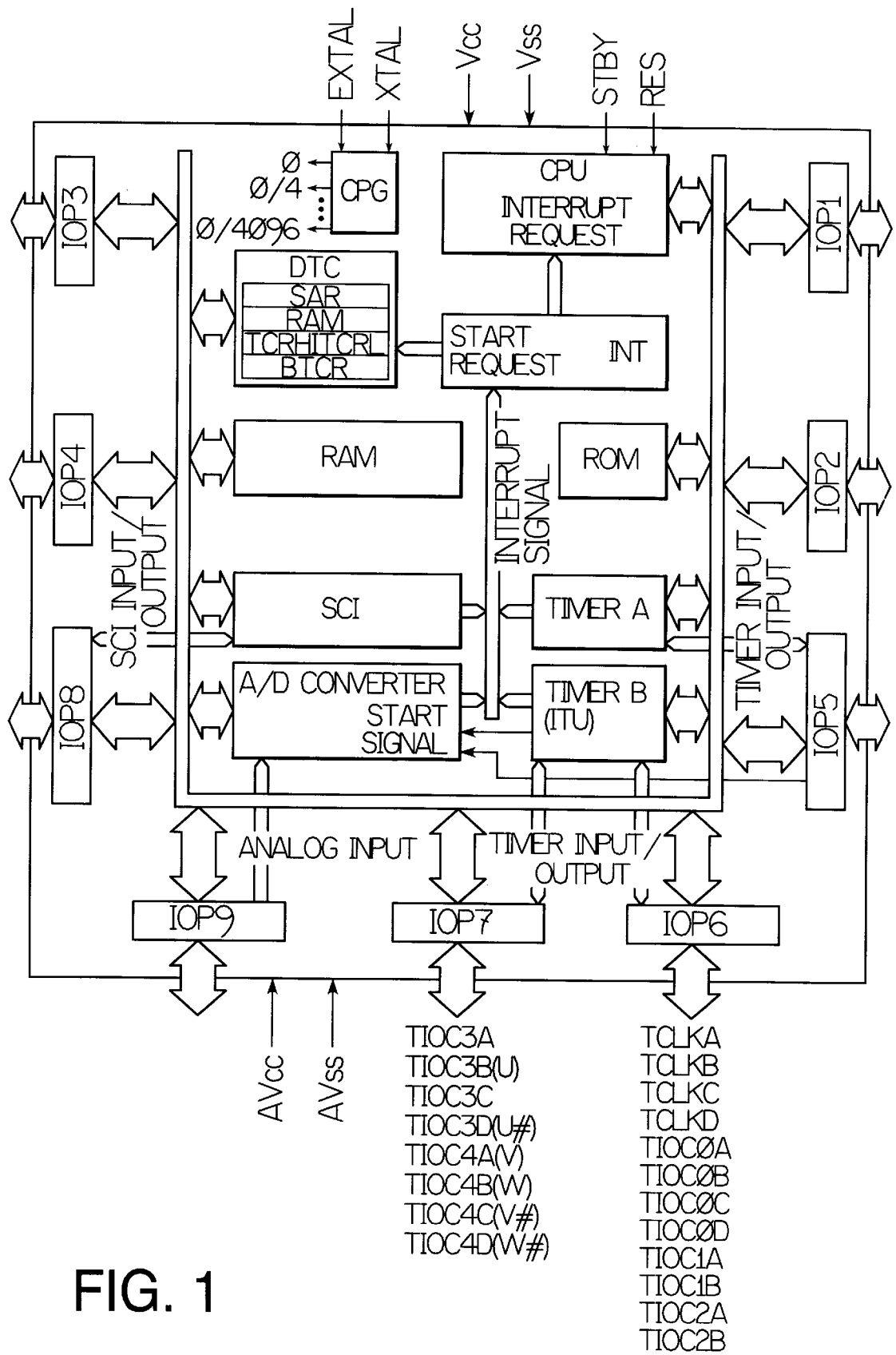
FIG. 1 is a block diagrams showing one embodiment of the microcomputer of a single chip, to which the present invention is applied.

FIG. 1 is a block diagram showing one embodiment of the microcomputer of a single chip, to which the present invention is applied. The individual circuit blocks of FIG. 1 are formed over a single semiconductor substrate of single-crystal silicon by a well-known technique for manufacturing semiconductor. integrated circuits.

The single-chip microcomputer of this embodiment is constructed to include function blocks or modules of a central processing unit CPU, a clock generator CPG, a data transfer controller (or data transfer unit) DTC, an interrupt controller INT, a read only memory ROM stored with programs or the like, a random access memory RAM to be used as a temporary memory or the like, timers A and B (ITU), a serial communication interface SCI, an A/D converter and first to ninth input/output ports IOP1 to IOP9.

These function blocks or modules are connected with each other by internal buses. These internal buses are composed of not only an address bus and a data bus but also a control bus containing a read signal and a write signal. This control bus may contain a bus size signal (WORD) or a system clock. The aforementioned function blocks or modules are read/written through the internal bus by the central processing unit CPU or the data transfer controller DTC. The data bus width of the internal bus is composed of sixteen bits, although not especially limited thereto.

The single-chip microcomputer of this embodiment is provided with a ground potential Vss, a power supply voltage Vcc, an analog ground potential AVss and an analog power supply voltage AVcc, as its power supply terminals, and with a reset RES, a standby STBY, mode controls MD0 and MD1 and clock inputs EXTAL and XTAL as its other dedicated control terminals.

The individual input/output ports are commonly used as the input/output terminals for the address bus, the data bus, the bus control signal, the timers, the serial communication interface SCI and the A/D converter. Specifically, the timer, the serial communication interface SCI and the A/D converter have the individual input/output signals which are inputted from and outputted to the outside through the terminals acting as the input/output ports. For example, the 5th port IOP5 is commonly used as the input/output terminals of the timer A, the 6th port IOP6 and the 7th port IOP7 are commonly used as the input/output terminals of the timer B (ITU), and the 8th port IOP8 is commonly used as the input/output terminals of the serial communication interface SCI. The input terminal of the analog data is commonly used as the 9th port IOP9. The external trigger signal is commonly used as the aforementioned 5th port IOP5.

The aforementioned timer B (ITU) is equipped as its input terminals with external clock inputs TCLKA. to TCLKD and as its input/output terminals with input-capture/output-compare terminals TIOC0A to TIOC4A, TIOC0B to TIOC4B, TIOC0C, TIOC3C and TIOC4C, and TIOC0D, TIOC3D and TIOC4D. Of these, the terminals TIOC3B, TIOC3D, TIOC4A, TIOC4C, TIOC4B and TIOC4D are motor-controlling six-phase outputs, and called the U-phase, U#-phase, V-phase, V#-phase, W-phase and W#-phase. Here, the symbol "#" indicates the logical inversion. The terminals TCLKA, TCLKB, TCLKC and TCLKD can input two-phase clocks individually.

The compare match signal, the overflow signal and the underflow signal of the aforementioned timers A and B are fed as A/D conversion start triggers to the A/D converter. The interrupt signal is outputted from the A/D converter, the timers A and B and the serial communication interface SCI. In response to the interrupt signal, the interrupt controller INT controls whether or not an interrupt demand signal is fed to the central processing unit CPU or whether or not a start demand signal is fed to the data transfer controller DTC, on the basis of the designation of a predetermined register. This switching operation is executed with DTE bits. Specifically, if an interrupt factor occurs with the DTE bit being set at 1, the start demand signal for the data transfer controller DTC is generated, and the interrupt demand is automatically cleared after the data transfer. On the other hand, if the interrupt factor occurs with the DTE bit being cleared to 0, the start demand signal for the central processing unit CPU is generated so that the central processing unit CPU performs the desired data processing to clear the bit indicating the interrupt factor.

If a predetermined condition holds during the data transfer by the data transfer controller DTC, e.g., if the transfer counter takes the value 0, the bit indicating the interrupt factor is not cleared but the corresponding DTE bit is cleared to 0 to generate the interrupt demand in the central processing unit CPU. An independent DTE bit and an independent vector are assigned to each interrupt factor.

The data transfer unit may use not only the aforementioned data transfer controller DTC but also a direct memory access controller DMAC. The data transfer controller DTC can be exemplified by one which is disclosed in "H8/532 Hardware Manual" issued by HITACHI in December, 1988. The direct memory access controller DMAC can be exemplified by one which is disclosed in "H8/3003 Hardware Manual" issued by HITACHI in March, 1993.

These data transfer units (DTC/DMAC) are enabled to transfer a plurality of units of data at one start, i.e., to establish the so-called "block transfer mode", as disclosed in the "H8/3003 Hardware Manual" or Japanese Patent Application No. 137954/1992. These units are provided with a source address register SAR, a destination address register DAR, a block size counter TCRH, a block size hold register TCRL and a block transfer counter BTCR so that they can transfer the data at the block unit.

Figure 2:
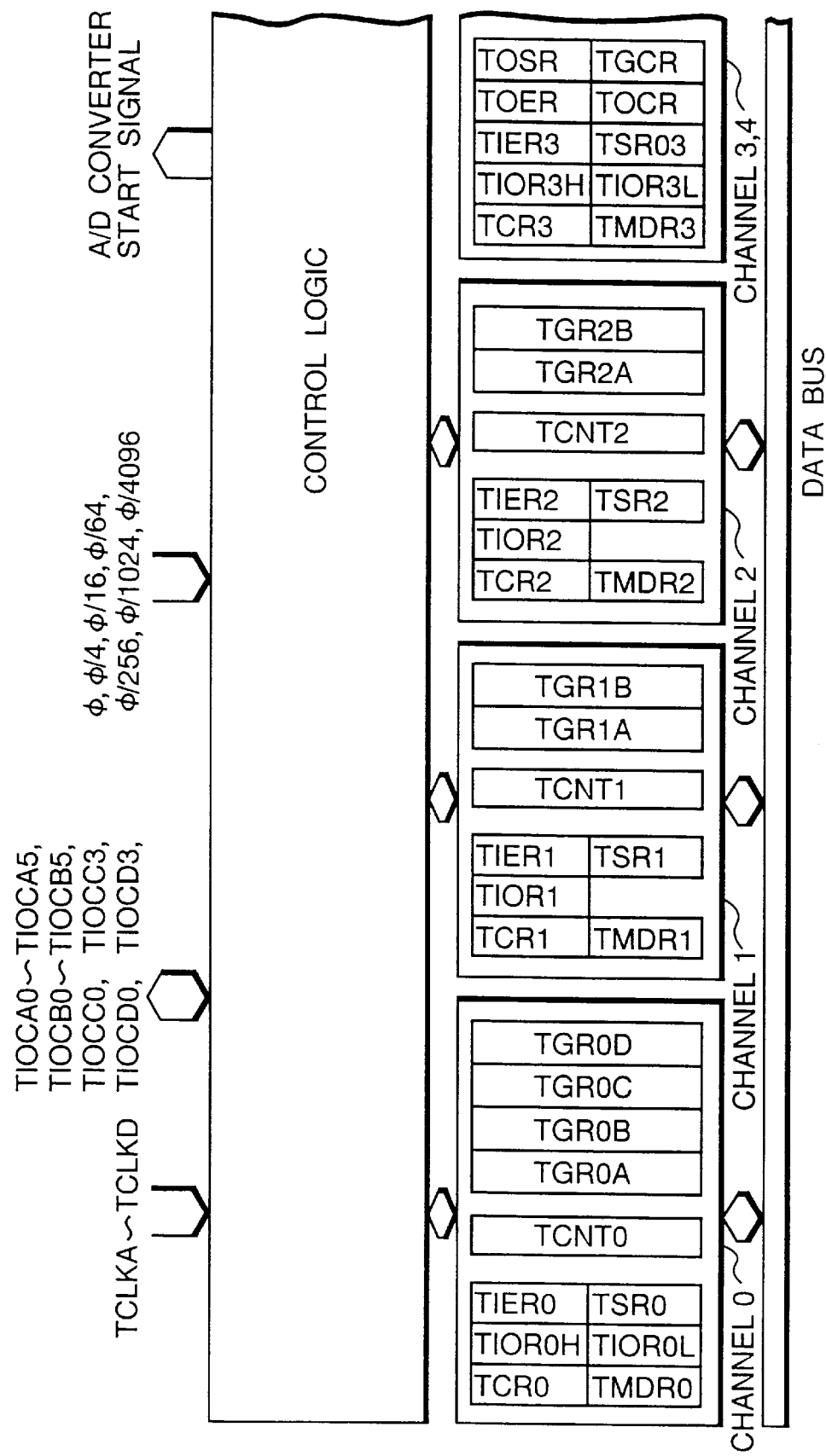
FIG. 2 is a block diagram showing a portion of one embodiment of a timer B (ITU, or integrated timer unit) according to the present invention.
Figure 3:
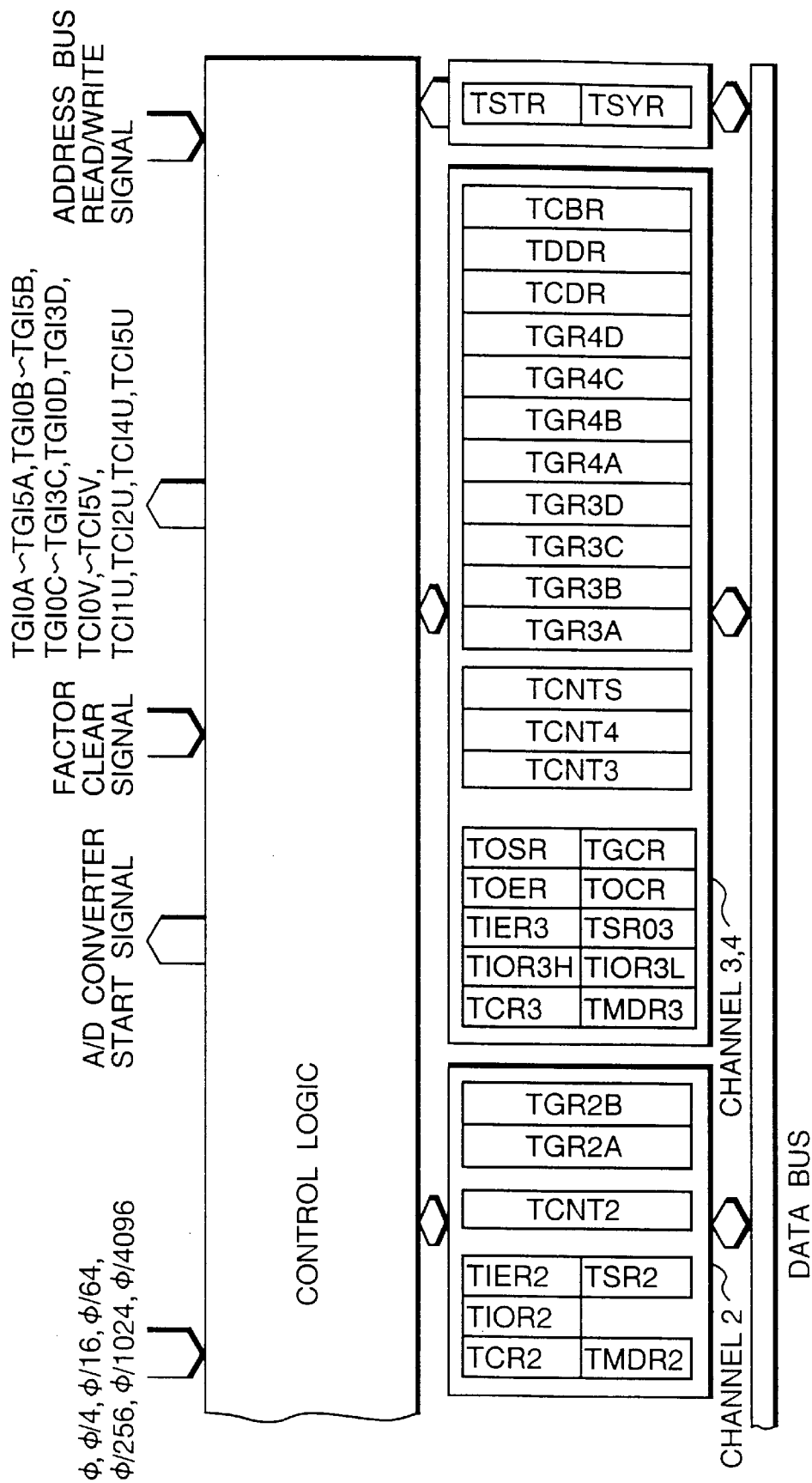
FIG. 3 is a block diagram showing the remaining portion of the embodiment of the timer B (ITU) according to the present invention.

FIGS. 2 and 3 are block diagrams of one embodiment of the timer B (ITU) according to the present invention. This timer B (ITU) is constructed, as shown in FIGS. 2 and 3, and the channel 2 and the channels 3 and 4 are illustrated in a partially overlapped manner so as to facilitate the understanding of the mutual relations between FIGS. 2 and 3.

The timer B is an integrated timer unit (ITU) of 16 bits, constructed of a 16-bit timer, and has five counters of timer counters TCNT0 to TCNT4 to construct five channels. Of these, the channel 0 has four output-compare-registers/input-capture-registers 0A to 0D (TGR0A to TGR0D). The channel 1 has two output-compare-register/input-capture-register 1A and 1B (TGR1A and TGR1B). In the so-called "phase count mode", the channel 1 can effect the up/down with a two-phase external clock. The channel 2 has two output-compare register/input capture registers 2A and 2B (TGR2A and TGR2B). In the so-called "phase count mode", the channel 2 can effect the up/down with a two-phase external clock.

The channel 3 has four output-compare-register/input-capture-registers 3A to 3D (TGR3A to TGR3D). The channel 4 has four output-compare-registers/input-capture-registers 4A to 4D (TGR4A to TGR4D). By combining these channels 3 and 4, the so-called "reset synchronized mode and complementary PWM mode" can be executed. In addition, the channels 3 and 4 have common registers TSTR and TSYR, a complementary PWM mode sub-counter TCNTS and so on. In the aforementioned channels 0, 3 and 4, the output-compare-registers/input-capture-registers A and C, and B and D can effect the buffer operation, as will be described later.

The phase count mode, the reset synchronized mode and the buffer operation, as described above, are disclosed on pp. 307 to 415 of the aforementioned "H8/3003 Hardware Manual". In the complementary PWM mode, the counters TCNT3 and TCNT4 performs the parallel up/down counts. An underflow occurs when the counter TCNT4 makes a down-count to 0, and a compare match 3A is generated when the counter TCNT3 makes an up-count to match the data to be stored in the register TGR3A. In this course, moreover, the timer output is changed when the data to be individually stored in the aforementioned registers TGR3B, TGR3D, TGR3A, TGR4B, TGR4C and TGR4D are matched. The timer outputs (U and U#, V and V#, and W and W#) have positive/negative phases, respectively. As a result, the complementary three-phase PWM outputs can be generated.

The timer of this embodiment has the following characteristics. Each channel can select eight kinds of counter input clocks of $\phi$, $\phi/4$, $\phi/16$, $\phi/64$, $\phi246$, $\phi/1024$ and $\phi/4096$. Each channel can select the 0 output, the 1 output and the toggle output by the compare match. The rising edge, the falling edge and the two edges can be selectively detected by the Input capture function. The counter clear operation is made possible by the compare match or the input capture. Synchronous operation includes simultaneous write of the plurality of timer counters TCNT, the simultaneous clearance by the compare-match/input-capture, and the synchronous input/output of the individual registers by the synchronous operation of the counters. The PWM output of an arbitrary duty can be outputted as the PWM mode and combined with the synchronous operation to make the PWM output of the maximum eight phases.

The channels 0, 3 and 4 can be so set as to perform buffer operation. In other words, the input capture register can be given the double buffer construction, and the output compare register can be automatically rewritten. The channels 1 and 2 can be set independently of each other in the phase count mode, in which the two-phase encoder pulses can be counted up/down. Moreover, the channel 2 is enabled to act as a 32-bit counter by using its input clock as the overflow/underflow of the channel 1.

The channels 3 and 4 can output the six-phase PWM waveform when they are set into the reset synchronization mode and combined with each other. The channels 3 and 4 can output the six-phase PWM waveforms having a non-overlap of triangular compare type when they are set in the complementary PWM mode and combined with each other.

TABLE 1

| bit | | | | | | | |
|---|---|---|---|---|---|---|---|
| 7 | 6 | 5 | 4 | 3 | 2 | 1 | 0 |
| CCLR2 | CCLR1 | CCLR0 | CKEG1 | CKEG0 | TPSC2 | TPSC1 | TPSC0 |

The timer control register TCR is an 8-bit register and is provided for each of the channels 0 to 4 so that it is used for controlling the timer counter TCNT. The TCR0, TCR3 and TCR4 are given the bit construction, as shown in the foregoing Table 1, and the TCR1 and TCR2 is given the following Table 2:

TABLE 2

| bit | | | | | | | |
|---|---|---|---|---|---|---|---|
| 7 | 6 | 5 | 4 | 3 | 2 | 1 | 0 |
| — | CCLR1 | CCLR0 | CKEG1 | CKEG0 | TPSC2 | TPSC1 | TPSC0 |

The bits 7, 6 and 5 (CCLR2 to CCLR0) are the control bits for selecting the counter clear factor of the counter TCNT. In the channels 0, 3 and 4: the clearance is disabled if at B1000 (B': a binary number); the TCNT is cleared by the compare-match/input-capture of the register TGRA if at B'001; The TCNT is cleared by the compare-match/input-capture of the register TGRB if at B'010; the TCNT is cleared by the counter of another channel in the synchronous-clear/synchronous operation if at B'011; the TCNT is cleared by the compare-match/input-capture of the register TGRC if at B'100; the TCNT is cleared by the compare-match/input-capture of the register TRGD if at B'101; and the TCNT is reserved (or disabled in the setting) if at B'110 and B'111.

In the channels 1 and 2, the bit 7 is unused but "1" is outputted if read is performed. In the channels 1 and 2: the clearances is disabled if at B'00; the TCNT is cleared by the compare-match/input-capture of the register TGRA if at B'01; the TCNT is cleared by the compare-match/input-capture of the register TGRB if at B'10; and the TCNT is cleared by the counter of another channel in the synchronized-clear/synchronized operation if at B'11.

The bits 4 and 3 (CKEG1 and CKEG0) are the control bits for selecting the edge of the input clocks, and this setting is invalidated when the counting is made with the internal clock φ. This counting is made with the rising edge if at B'00 (or the initial value), with the falling edge if at B'01, and with the two edges if at B'1-. Here, this symbol "-" may be 0 or 1.

The bits 2, 1 and 0 (TPSC2 to TPSC0) are the control bits for selecting the clocks of the counters. In the channel 0; the internal clock φ is selected if at B'000; the internal clock φ/4 is selected if at B'001; the internal clock φ/16 is selected if at B'010; the internal clock φ/256 is selected if at B'011; the external clock A (TCLKA terminal) is sellected if at B;100; the external clock B (TCLKB terminal) is selected if at B'101; the external clock C (TCLKC terminal) is selected if at B'110; and the external clock D (TCLKD terminal) is selected if at B'111.

In the channel 1: the internal clock φ is selected if at B'000; the internal clock φ/4 is selected if at B'001; the internal clock φ/16 is selected if at B'010; the internal clock φ/64 is selected if at B'011; the internal clock φ/256 is selected if at B'100; the overflow/underflow of the TCNT of the channel 2 is selected if at B'101; the external clock A (TCLKA terminal) is selected if at B'110; and the external clock B (TCLKB terminal) is selected if at B'111. However, these settings are invalidated when the channel 1 is in the phase count mode.

In the channel 2; the internal clock φ is selected if at B'000; the internal clock φ/4 is selected if at B'001; the internal clock φ/16 is selected if at B'010; the internal clock φ/64 is selected if at B'011; the internal clock φ/1024 is selected if at B'100; the external clock A (TCLKA terminal) is selected if at B'101; the external clock B (TCLKB terminal) is selected if at B'110; and the external clock C (TCLKC terminal) is selected if at B'111. However, these settings are invalidated when the channel 2 is in the phase count mode.

In the channels 3 and 4: the internal clock φ is selected if at B'000; the internal clock φ/4 is selected if at B'001; the internal clock φ/16 is selected if at B'010; the internal clock φ/256 is selected if at B'100; the internal clock φ/1024 is selected if at B'101; the external clock A (TCLKA terminal) is selected if at B'110; and the external clock B (TCLKB terminal) is selected if at B'111.

A timer mode register TMDR is a register capable of reading/writing 8 bits to set the operation modes of the individual channels. The bit construction is tabulated in Table 3. In this bit construction, the bits 7 and 6 are unused (or reserved bits) and "1" is outputted if read is performed, and "1" is written if write is performed.

TABLE 3

| bit | | | | | | | |
|---|---|---|---|---|---|---|---|
| 7 | 6 | 5 | 4 | 3 | 2 | 1 | 0 |
| — | — | BFB | BFA | MD3 | MD2 | MD1 | MD0 |

The bit 5 (RFB) decides whether or not the register TGRB is normally operated or whether or not the registers TGRB and TGRD are combined to effect the buffer operation. This bit is unused in the channel not having the TGRD. The bit 4 (BFA) decides whether or not the register TGRA is normally operated or whether or not the registers TGRA and TGRC are combined to effect the buffer operation. This bit is unused in the channel not having the TGRC.

The bits 3 to 0 (MD3 to MD0) are control bits for setting the operation modes of the timers. In the channels 0, 3 and 4, the phase count modes cannot be set. In the channels 0, 1, 2 and 4, the reset synchronized PWM mode and the complementary PWM mode cannot be set. The bit 3 is always written with 0. When the channel 3 is set in the reset synchronized PWM mode or in the complementary PWM mode, the setting of the channel 4 is invalidated, following the setting of the channel 3.

The ordinary operation is established if at B'0000; the reservation (disabling) if at B'0001; the PWM mode 1 if at B'0010; the PWM mode 2 if at B'0011; the phase count mode 1 if at B'0100; the phase count mode 2 if at B'0101; the phase count mode 3 if at B'0110; the phase count mode 4 if at B'0111; the reset synchronized PWM mode if at B'1000; the reservation (disabling) if at B'1001; B'1010; B'1011 and B'1100; the complementary PWM mode (transfer at crest) if at B'1101; the complementary PWM mode (transfer at valley) if at B'1110; and the complementary PWM mode (transfer at crest/valley) if at B'1111.

A timer I/O control register TIOR is an 8-bit register for controlling the function of the register TGR of each channel in each channel. The channels 0, 3 and 4 are individually equipped with two registers (TIOR0H, TIOR0L, TIOR3H, TIOR3L, TIOR4H and TIOR4L), and the channels 1 and 2 are individually equipped with one register (TIOR1 and TIOR2), so that those channels are totally equipped with the eight registers. The bit construction is tabulated Table 4:

TABLE 4

| | | | Bit | | | | |
|---|---|---|---|---|---|---|---|
| 7 | 6 | 5 | 4 | 3 | 2 | 1 | 0 |
| IOB3 | IOB2 | IOB1 | IOB0 | IOA3 | IOA2 | IOA1 | IOA0 |

In the channel 0, the register TIOR0H is used for controlling the functions of the registers TGR0A and TGR0B, and the TIOR0L is used for controlling the functions of the registers TGR0C and TGR0D. In the channel 3, the register TIOR3H is used for controlling the functions of the registers TGR3A and TGR3B, and the TIOR3L is used for controlling the functions of the registers TGR3C and TGR3D. In the channel 4, the register TIOR4H is used for controlling the functions of the registers TGR4A and TGR4B, and the TIOR4L is used for controlling the functions of the registers TGR4C and TGR4D. In the channel 1, the register TIOR1 is used for controlling the functions of the registers TGR1A and TGR1B. In the channel 2, the register TIOR2 is used for controlling the functions of the registers TGR2A and TGR2B. When the register TGRC or TGRD of the channel 0, 3 and 4 is set in the buffer mode, it acts as the buffer register irrespective of the setting of the register TIOR.

The register TIORnH is adapted to control the functions of the registers TGRnA and TGRnB (n=0, 3 and 4), and the register TIORnL is adapted to control the functions of the registers TGRnC and TGRnD (n=0, 3 and 4). The bits 7 to 4 set the function controls of the registers TGRB and TGRD. At B'0000 to B'0111, these registers TGRB and TGRD are used as the output compare registers and are made to disable the output (an initial value) if at B'0000, to have the initial output 0 and output 0 in the compare match if at B'0001, to have the initial value 0 and output 1 in the compare match if at B'0010, and have the initial value 0 and output a toggle if at B'0011. The registers TGRB and TGRD are further made to disable the output (an initial value) if at B'0100, to have the initial output 1 and output 0 in the compare match, to have the initial value 1 and output 1 in the compare match if at B'0110, and to have the initial output 1 and output the toggle in the compare match if at B'0111.

At B'1000 to B'1111, the registers TGRB and TGRD are used as the input capture registers such that the capture input sources act as the input captures at the rising edges of the terminals (TIOCnB and TIOCnD) if at B'1000, as the input captures at the falling edges of the terminals if at B'1001, and as the input captures at the two edges of the terminals if at B'1010 and B'1011. The capture input sources further act as the input captures at the rising edge of the external clock to be fed to the channel 1, if at B'1100, as the input captures at the falling edge of the external clock to be fed to the channel 1, if at B'1101, and as the input captures at the two edges of the external clock to be fed to the channel 1, if at B'1110 and B'1111.

The bits 3 to 0 (IOA3 to IOA0) set the function controls of the registers TGRA and TGRC. AT B'0000 to B'0111, these registers TGRA and TGRC are used as the output compare registers and are made to inhibit the output (an initial value) if at B'0000, to have the initial output 0 and output 0 in the compare match if at B'0001, to have the initial value 0 and output 1 in the compare match if at B'0010, and have the initial value 0 and output a toggle if at B'0011. The registers TGRA and TGRC are further made to inhibit the output (an initial value) if at B'0100, to have the initial output 1 and output 0 in the compare match, to have the initial value 1 and output 1 in the compare match if at B'0110, and to have the initial output 1 and output the toggle in the compare match if at B'0111.

At B'1000 to B'1111, the registers TGRA and TGRC are used as the input capture registers such that the capture input sources act as the input captures at the rising edges of the clock to be fed to the terminals if at B'1000, as the input captures at the falling edges of the clock to be fed to the terminals if at B'1001, and as the input captures at the two edges of the clock to be fed to the terminals if at B'1010 and B'1011. The capture input sources further act as the input captures at the rising edge of the external clock to be fed to the channel 1, if at B'1100, as the input captures at the falling edge of the external clock to be fed to the channel 1, if at B'1101, and as the input captures at the two edges of the external clock to be fed to the channel 1, if at B'1110 and B'1111.

The registers TIOR1 (TIOR2) are adapted to control the function of the registers TGR1B (TGR2B). The bits 7 to 4 (IOB3 to IOB0) set the function controls of the registers TGR1B (TGR2B). At B'0000 to B'0111, this register TGR1B (TGR2B) is used as the output compare register and is made to inhibit the output (an initial value) if at B'0000, to have the initial output 0 and output 0 in the compare match if at B'0001, to have the initial value 0 and output 1 in the compare match if at B'0010, and have the initial value 0 and output a toggle if at B'0011. The register TGR1B (TGR2B) is further made to inhibit the output (an initial value) if at B'0100, to have the initial output 1 and output o in the compare match if at B'0101, to have the initial value 1 and output 1 n the compare match if at B'0110, and to have the initial output 1 and output the toggle in the compare match if at B'0111.

At B'1000 to B'1111, the register TGR1B (TGR2B) is used as the input capture register such that the capture input source acts as the input capture at the rising edges of the clock to be fed to the terminals if at B'1000, as the input capture at the falling edges of the clock to be fed to the terminals if at B'1001, and as the input capture at the two edges of the clock to be fed to the terminals if at B'1010 and B'1011. The capture input source further acts as the input capture at the rising edge of the external clock to be fed to the channel 1, if at B'1100, as the input capture at the falling edge of the external clock to be fed to the channel 1, if at B'1101, and as the input capture at the two edges of the external clock to be fed to the channel 1, if at B'1110 and B'1111.

The bits 3 to 0 (IOA3 to IOA0) set the function controls of the registers TGR1A (TGR2A). At B'0000 to B'0111, this register TGR1A (TGR2A) is used as the output compare register and is made to disable the output (an initial value) if at B'0000, to have the initial output 0 and output 0 in the compare match if at B'0001, to have the initial value 0 and output 1 in the compare match if at B'0010, and have the initial value 0 and output a toggle if at B'0011. The register TGR1A (TGR2A) is further made to disable the output (an initial value) if at B'0100, to have the initial output 1 and output 0 in the compare match, to have the initial value 1 and output 1 in the compare match if at B'0110, and to have the initial output 1 and output the toggle in the compare match if at B'0111.

At B'1000 to B'1111, the register TGR1A (TGR2A) is used as the input capture register such that the capture input source acts as the input capture at the rising edges of the clock to be fed to the terminals if at B'1000, as the input capture at the falling edges of the clock to be fed to the terminals if at B'1001, and as the input capture at the two edges of the clock to be fed to the terminals if at B'1010 and B'1011. The capture input source further acts as the input capture at the rising edge of the external clock to be fed to the channel 1, if at B'1100, as the input capture at the falling edge of the external clock to be fed to the channel 1, if at B'1101, and as the input capture at the two edges of the external clock to be fed to the channel 1, if at B'1110 and B'1111.

A timer interrupt enable register TIER is an 8-bit register and controls the enable/disable of generating the signals of the overflow interrupt demand, compare-match/input-capture interrupt demand of the general register (TGR) and the A/D conversion start demand. The channels 0 to 4 are equipped individually with one, totally with the five registers TIER0 to TIER4. The bit constructions of the registers TIER0, TIER3 and TIER4 are tabulated in Table 5, and the bit constructions of the registers TIER1 and TIER2 are tabulated in Table 6:

TABLE 5

| | | | | bit | | | |
|---|---|---|---|---|---|---|---|
| 7 | 6 | 5 | 4 | 3 | 2 | 1 | 0 |
| TTGE | — | — | TCIEV | TGIED | TGIEC | TGIEB | TGIEA |

TABLE 6

| | | | | bit | | | |
|---|---|---|---|---|---|---|---|
| 7 | 6 | 5 | 4 | 3 | 2 | 1 | 0 |
| TTGE | — | TCIEU | TCIEV | — | — | TGIEB | TGIEA |

The bit 7 (TTGE) is caused to disable the generation of the A/D conversion start demand, if at 0, and to allows the generation of the A/D conversion start demand, if at 1, by the input-capture/compare-match (the overflow/underflow of the counter for the channel 4) of the register TGRA. The bit 6 is unused and outputs 1 if read operation is performed.

The bit 5 (TCIEU) is an underflow interrupt enable bit for disabling, when the interrupt demand of an underflow flag (TCFU) of a timer status register TSR is set to 1 in the channels 1 and 2, if the interrupt demand by the TCFU is at 0, but for enabling the interrupt demand if at 1.

The bit 4 (TCIEV) is an overflow interrupt enable bit for disabling, when the interrupt demand of an overflow flag TCFV) of the timer status register TSR is set to 1 in the channels 1 and 2, if the interrupt demand by the TCFV is at 0, but for enabling the interrupt demand if at 1.

The bit 3 (TGIED) is a TGR interrupt enable D for disabling, when the TGFD of the timer status register is set to 1 in the channels 0, 3 and 4, the interrupt demand by the TGFD bit, if at 0, but for enabling it if at 1. The channels 1 and 2 are unused but output 1 if read operation is performed.

The bit 2 (TGIEC) is a TGR interrupt enable C for disabling, when the TGFC of the timer status register is set to 1 in the channels 0, 3 and 4, the interrupt demand by the TGFC bit, if at 0, but for enabling it if at 1. The channels 1 and 2 are unused but output 1 if read operation is performed.

The bit 1 (TGIEC) is a TGR interrupt enable B for disabling, when the TGFB of the timer status register is set to 1 in the channels 0 to 4, the interrupt demand by the TGFB bit, if at 0, but for enabling it if at 1.

The bit 0 (TGIEC) is a TGR interrupt enable A for disabling, when the TFGA of the timer status register is set to 1 in the channels 0 to 4, the interrupt demand by the TGFA bit if at 0, but for enabling it if at 1.

The timer status register TSR is an 8-bit register. The channels 0 to 4 are equipped individually with one, totally with five registers TSR0 to TSR4. The bit construction of the TSR0 is tabulated in Table 7; the bit constructions of the TSR1 and TSR2 are tabulated in Table 8; and the bit constructions of the TSR3 and TSR4 are tabulated in Table 9.

TABLE 7

| | | | | bit | | | |
|---|---|---|---|---|---|---|---|
| 7 | 6 | 5 | 4 | 3 | 2 | 1 | 0 |
| — | — | — | TCFV | TGFD | TGFC | TGFB | TGFA |

TABLE 8

| | | | | bit | | | |
|---|---|---|---|---|---|---|---|
| 7 | 6 | 5 | 4 | 3 | 2 | 1 | 0 |
| TCFD | — | TCFU | TCFV | — | — | TGFB | TGFA |

TABLE 9

| | | | | bit | | | |
|---|---|---|---|---|---|---|---|
| 7 | 6 | 5 | 4 | 3 | 2 | 1 | 0 |
| TCFD | — | — | TCFV | TGFD | TGFC | TGFB | TGFA |

The bit 7 (TCFD) is a count direction flag, i.e., a status flag for indicating the count direction of the TCNT of the channels 1 to 4. This status flag is unused in the channel 0, and the value 1 is outputted when the flag is read out. The TCFD indicates the down-count, if at 0, and the up-count if at 1. The bit 6 is unused in the channels 0 to 4, and the value 1 is outputted when the bit is read out.

The bit 5 (TCFU) is the underflow flag indicating the generation of the underflow of the TCNT of the channels 1 and 2 and is unused in the channels 0, 3 and 4. Therefore, the value 1 is outputted, as described above, when the underflow flag is read out. The clear condition for this flag TCFU is that the value 0 is written in the underflow flag TCFU after this flag TCFU has been read out with TCFU=1. The set condition for 1 is that the value of the TCNT underflows (B'0000→B'FFFF).

The bit 4 (TCFV) is a status flag indicating the overflow flag of the TCNT and is cleared on condition that the value is written in the TCFV after the TCFV has been read out with TCFV=1. This status flag is set to 1 on condition that the value of the TCNT overflows (B'FFFF→B'0000).

The bit 3 (TGFD) is an input-capture/output-compare flag D indicating the generation of the input capture or the compare match of the TGRD of the channels 0, 3 and 4. The channels 1 and 2 are unused, and the value is outputted when the bit is read out. The 0 clear condition is that the value 0 is written in the TGFD after the TGFD has been read out with the TGFD=1. The setting condition of 1 is (1) that TCNT=TGRD while the TGRD is functioning as the output compare register, and (2) that the value of the TCNT is transferred to the TGRD while the TGRD is functioning as the input capture register.

The bit 2 (TGFC) is an input-capture/output-compare flag C indicating the generating of the input capture or the compare match of the TGRC of the channels 0, 3 and 4. The channels 1 and 2 are unused, and the value is outputted when the bit is read out. The 0 clear condition is that the value 0 is written in the TGFC after the TGFC has been read out with the TGFC=1. The setting condition of 1 is (1) that TCNT=TGRC while the TGRC is functioning as the output compare register, and (2) that the value of the TCNT is transferred to the TGRC while the TGRC is functioning as the input capture register.

The bit 1 (TGFB) is an input-capture/output-compare flag C indicating the generating of the input capture or the compare match of the TGRC of the channels 0 to 4. The 0 clear condition is that the value 0 is written in the TGFB after the TGFB has been read out with the TGFB=1. The setting condition of 1 is (1) that TCNT=TGRB while the TGRB is functioning as the output compare register, and (2) that the value of the TCNT is transferred to the TGRB while the TGRB is functioning as the input capture register.

The bit 0 (TGFA) is an input-capture/output-compare flag C indicating the generating of the input capture or the compare match of the TGRC of the channels 0 to 4. The 0 clear condition is that the value 0 is written in the TFGA after the TGFA has been read out with the TFGA=1. The setting condition of 1 is (1) that TCNT=TGRA while the TGRA is functioning as the output compare register, and (2) that the value of the TCNT is transferred to the TGRA while the TGRA is functioning as the input capture register.

The timer counter TCNT is a 16-bit counter and is always accessed in units of 16 bits. The channels 0 to 4 are equipped individually with one, totally with five timer counters TCNT0 to TCNT4. Of these, the TCNT0 is the up counter, and the TCNT1 and TCNT2 are up/down counters, the remainder being an up counter. The TCNT3 and TCNT4 are the up/down counters in the complementary PWM mode, the remainder being the up counters.

The general register TGR is a 16-bit register. The channels 0, 3 and 4 are equipped individually with four, and the channels 1 and 2 are equipped individually with two general registers TGR, i.e., totally sixteen general registers TGR are provided. In the channels 0, 3 and 4, these general registers act as the output-compare/input-capture registers so that they can be set to perform buffer operation in the combinations of TGRC and TGRA, and TGRD and TGRB. In the channels 1 and 2, the TGRA and TGRB act as the output-compare/input-capture registers.

The timer start register TSTR is an 8-bit register for selecting the ON/OFF of the counters TCNT of the channels 0 to 4. The bit construction is tabulated in Table 10. The timer counter TCNT is inactivated, when each bit (although the bits 5, 4 and 3 are unused) is at 0, and activated to count when at 1.

TABLE 10

| | | | bit | | | | |
|---|---|---|---|---|---|---|---|
| 7 | 6 | 5 | 4 | 3 | 2 | 1 | 0 |
| CST4 | CST3 | — | — | — | CST2 | CST1 | CST0 |

TABLE 11

| | | | bit | | | | |
|---|---|---|---|---|---|---|---|
| 7 | 6 | 5 | 4 | 3 | 2 | 1 | 0 |
| SYNC4 | SYNC3 | — | — | — | SYNC2 | SYNC1 | SYNC0 |

The timer synchro register TSYR is an 8-bit register for selecting the independent/synchronous operations of the timer counters TCNT0 to TCNT4 of the channels 0 to 4. The channel performs the synchronous operation when the bit corresponding thereto is set to 1. The bit construction is tabulated in Table 11.

The SYNC4 to SYNC0 of the bits excepting the bits 5 to 3 select the independent/synchronous operations of the channels 4 to 0. If these bits are at 0, the timer counters TCNT4 to TCNT0 of the corresponding channels are made to perform independent operations (in which the write/clear of the TCNT4 to TCNT0 are independent of other channels). If at 1, the channels 4 to 0 are caused to perform synchronous operations, in which the TCNT4 to TCNT0 can write/clear synchronously. In the synchronous writing operation, when one TCNT instructed to perform synchronous operation is written, the same value is written in another counter, as instructed to perform synchronous operation. In the synchronous clearing operation, when the clear condition on one TCNT instructed to perform synchronous operation is established, another counter, instructed to perform synchronous operation, is also cleared.

A timer output master enable register TOER is an 8-bit register for enabling/disabling the output setting of the channels 3 and 4. The bit construction on one TCNT instructed to perform synchronous operation is established, another counter, instructed to perform synchronous operation, is also cleared.

A timer output master enable register TOER is an 8-bit register for enabling/disabling the output setting of the channels 3 and 4. The bit construction is tabulated in Table 12. The bits 7 and 6 are unused, and the value 1 is outputted when they are read. In the writing operation, the value 1 is written.

TABLE 12

| | | | bit | | | | |
|---|---|---|---|---|---|---|---|
| 7 | 6 | 5 | 4 | 3 | 2 | 1 | 0 |
| — | — | OE4D | OE4C | OE3D | OE4B | OE4A | OE3B |

The ITU output of the TIOC4D terminal is disabled (to act as an input/output port) if the bit 5 (OE4D) is at 0, and is enabled if at 1. The ITU output of the TIOC4C terminal is disabled (to act as an input/output port), if the bit 4 (OE4C) is at 0, and is enabled if at 1. The ITU output of the TIOC3D terminal is disabled (to act as an input/output port), if the bit 3 (OE3D) is at 0, and is enabled if at 1. The ITU output of the TIOC4B terminal is disabled (to act as an input/output port), if the bit 2 (OE4B) is at 0, and is enabled if at 1. The ITU output of the TIOC4A terminal is disabled (to act as an input/output port), if the bit 1 (OE4A) is at 0, and is enabled if at 1. The ITU output of the TIOC3B terminal is disabled (to act as an input/output port), if the bit 1 (OE3B) is at 0, and is enabled if at 1.

A timer output control register TOCR is an 8-bit register for controlling the disable of input of the complementary- PWM-mode/reset-synchronization-mode output by the external trigger, the enable/disable of the toggle output synchronized with the PWM period, and the output level inversion of the PWM output.

TABLE 13

| bit | | | | | | | |
|---|---|---|---|---|---|---|---|
| 7 | 6 | 5 | 4 | 3 | 2 | 1 | 0 |
| PSYN1 | PSYN0 | TPIE | XTGD | XTEG | POFF | OLS4 | OLS3 |

The bit 7 (PSYN1) controls the PWM synchronization output. At 0, the level in the output of the PWM output is held when the PWM output is turned off. At 1, the PWM output is made, when it is turned off, in synchronism with the operation of the timer counters TCNT3 and TCNT4 of the channels 3 and 4, unless the timer counters are stopped. In other words, the bit 7 is not affected by the OFF of the PWM output. The bit 6 (PSYN0O) sets the disable/enable of the toggle output synchronized with the PWM period. The toggle output, synchronized with the PWM period, is disabled if at 0 and enabled if at 1.

The bit 5 is a PWM output cutoff interrupt enable for setting the enable/disable of the interrupt demand (TPISD) of the output cutoff signal by the external trigger of the ITU in the reset-synchronization PWM-mode/complementary-PWM-mode. In short, the PWM output cutoff interrupt demand (TPISD) at the external trigger input time is disabled if at 0 and enabled if at 1.

The bit 4 (XTGD) is an external trigger disable for setting the disable of the external trigger of the ITU in the reset-synchronization-PWM-mode/complementary-PWM-mode. In short, the external trigger input is disabled if at 0, and the TIOC3C terminal is used as the external trigger input terminal for disabling the ITU output if at 1.

The bit 3 (XTEG) is an external trigger edge for setting the edges of the external trigger of the ITU in the reset-synchronization-PWM-mode/complementary-PWM-mode. In short, the output is interrupted with the rising edge if at 0 and with the falling edge if at 1.

The bit 2 (POFF) is a PWM output OFF flag to be set when the ITU output in the reset-synchronization-PWM-mode/complementary-PWM-mode is turned off. This flag is cleared when the value 0 is written after read in the timer output (clear condition) POFF=1. The block data output (set condition) is allowed (1) when the value 1 is written and (2) when the trigger specified by the TIOC3C is inputted for XTGD=0.

The bits 1 and 0 (OLS4 and OLS3) are the output level selects 4 and 3 for selecting the output levels in the reset-synchronization-PWM-mode/complementary-PWM-mode. The individual terminals are initially set such that the individual output levels of the TIOC3B, TIOC4A and TIOC4B are set to the 0 output, if the compare match is generated at the up-count time with the counter 4, and to the 1 output if the compare match is generated at the down-count time with the counter 4, and such that the output levels of the TIOC3D, TIOC4C and TIOC4D are set to the 1 output, if the compare match is generated at the up-count time with the counter 3 and to the 0 output if the compare match is generated at the down-count time with the counter 3.

TABLE 14

| bit | | | | | | | |
|---|---|---|---|---|---|---|---|
| 7 | 6 | 5 | 4 | 3 | 2 | 1 | 0 |
| — | — | OS4D | OS4C | OS3D | OS4B | OS4A | OS3B |

A timer output cutoff data register TOSR is an 8-bit register for outputting its set value when the TOCR/POFF bit is set to 1 in the reset-synchronization-PWM-mode/complementary-PWM-mode. The bit construction is tabulated in Table 14. The bits 7 and 6 are unused but outputs 1 when read and are set to 1 when written.

The bit 5 (OS4D) sets the cutoff output data of the TIOC4D terminal to 0, if at 0, and to 1 if at 1. The bit 4 (OS4C) sets the enable/disable of the ITU output of the TIOC4C terminal thereby to set the cutoff output of the TIOC4C terminal to 0, if at 0, and to 1 if at 1. The bit 3 (OS3D) sets the cutoff output data of the TIOC3D terminal to 0, if at 0, and to 1 if at 1.

The bit 2 (OS4B) sets the cutoff output data of the TIOC4B terminal to 0, if at 0, and to 1 if at 1. The bit 1 (OS3B) sets the cutoff output data of the TIOC3B terminal to 0, if at 0, and to 1 if at 1. The bit 0 (OS3B) sets the cutoff output data of the TIOC3B terminal to 0, if at 0, and to 1 if at 1.

A timer gate control register TGCR is an 8-bit register for controlling the waveform output necessary for a brushless DC motor control in the reset-synchronization-PWM-mode/complementary-PWM-mode. The bit construction is tabulated in Table 15. The bit 7 is unused but outputs 1 when read and is set to 1 when written.

TABLE 15

| bit | | | | | | | |
|---|---|---|---|---|---|---|---|
| 7 | 6 | 5 | 4 | 3 | 2 | 1 | 0 |
| — | BDC | N | P | FB | WF | VF | UF |

The bit 6 (BDC) is for a brushless DC motor and for selecting the functions of the gate signal output and the chopping output for controlling the brushless DC motor. An ordinary output is made, if the BDC is at 0, and a gate-signal/chopping-output for the brushless DC motor is made if at 1. The bit 5 (N) is a negative phase output for selecting the outputs of a gate signal at the terminal of the negative-phase terminal and the chopped outputs of the gate signal and the reset-synchronization-PWM-mode/complementary-PWM-mode output. In short the gate signal is directly outputted to the negative phase terminal output if the N is at 0, and the gate signal and the reset-synchronization-PWM-mode/complementary-PWM-mode output are chopped and outputted to the negative phase terminal output if at 1. The bit 4 (P) is a positive phase output for selecting the outputs of a gate signal at the terminal of the positive-phase terminal and the chopped outputs of the gate signal and the reset-synchronization-PWM-mode/complementary-PWM-mode output. In short, the gate signal is directly outputted to the positive phase terminal output if the N is at 0, and the gate signal and the reset-synchronization-PWM-mode/complementary-PWM-mode output are chopped and outputted to the positive phase terminal output if at 1.

The bit 3 (FB) is a feedback input for selecting the external input or the register input as the feedback input for generating the gate signal. The feedback input is set to the external input (whose source is the input capture signal of the TGRA, TGRB and TGRC of the channel 0), if the FB is at 0, and the register input (the set value of the UF, VF and WF of the TGCR) if at 1. The WF, VF and UF of the bits 2 to 0 are the settings of the aforementioned feedback input data.

The sub-counter TCNTS is a 16-bit up/down counter and is provided for the channel 3. This counter TCNTS is effective, if in the complementary PWM mode, and is used as a read only counter.

A dead time register TDDR is a 16-bit register and is provided for three channels. This register TDDR is effective only in the complementary PWM mode to set the offset values of the TCNT3 and TCNT4 in the complementary PWM mode. When the TCNT3 and TCNT4 are cleared and restarted in the complementary PWM mode, the TCNT3 is loaded with the value of the TDDR to start the count operation. This register TDDR is disabled to access in units of 8 bits but is always accessed in units of 16 bits.

A PWM carrier period register TCDR is a 16-bit register and is provided for the channel 3. This register TCDR is effective only in the complementary PWM mode and is always compared with the value set in the TCNT4 in the complementary PWM mode so that the TCNT3 and TCNT4 are switched to the down-count if matched. When a triangular wave is formed, the TCDR is set with a ½ PWM period. This register TCDR cannot be written by the CPU. A value is transferred in the transfer timing selected at the time of setting the complementary PWM mode, when it is set in the buffer register TCBR of the register TCDR.

The PWM carrier period buffer register TCBR is a 16-bit register and is provided for the channel 3. This register TCDR is effective only in the complementary PWM mode and functions as the buffer register of the TCDR in the complementary PWM mode. A value is transferred in the transfer timing selected at the time of setting the complementary PWM mode, when it is set in the register TCBR.

The operations of the aforementioned timers will be summarized in the following.

(1) Normal Operations

The channels 0 to 4 are individually equipped with the timer counters TCNT and the general registers TGR. The timer counters TCNT perform the up/down count operations for the free running operation, the period count operation or the external event count operation. The general registers TGR can be individually used as the input capture registers or the output compare registers.

(2) Synchronous Operations

The timer counter TCNT of the channel set to perform synchronous operation performs the synchronous preset operation. In other words, simultaneously as the value of an arbitrary TCNT of the channel set to perform synchronous operation is rewritten, the value of the TCNT of another channel is rewritten. Moreover, the TCNTs can be synchronously cleared by setting the timer synchronization bits of the TSYR of a plurality of channels set to perform synchronous operation.

(3) Buffer Operations

The buffer operations can be performed by combining the general registers TGRA and TGRC, and TGRB and TGRD. Of these, the TGRC and TGRA function as the buffer registers, and the TGRD and TGRB function as the buffer registers.

(4) Cascade Connecting Function

The timer counter TCNT1 of the channel 1 and the timer counter TCNT2 of the channel 2 can be operated as a 32-bit counter by connecting them.

(5) PWM Mode

This is the mode for outputting the PWM waveform, and its output level is set by the TIOR. The PWM waveform of the duty of 0% to 100% can be outputted by setting each general register TGR.

(6) Phase Count Mode

In this mode, the up/down of the TCNT is effected by detecting the phases of the two clocks which are inputted from the external clock input terminals in the channels 1 and 2. When this phase count mode is setup, the corresponding TCLK terminal acts as the clock input, and the TCNT performs the up/down count operation so that it can be used as the input of the two-phase encoder pulse.

(7) Reset Synchronization PWM Mode

The PWM waveforms of positive/negative phases are outputted in three phases by combining the channels 3 and 4. These three-phase PWM waveforms are in a relation that the change point of one waveform is common. When the reset synchronization PWM mode is setup, the general registers TGR3A, TGR3B, TGR4A and TGR4B automatically function as the output compare registers. Moreover, the individual terminals of the TIOC3A, TIOC3B, TIOC4A, TIOC4B and TIOC4D serve as the PWM output terminals automatically, and the TCNT3 performs the up-count operation whereas the TCNT4 independently operates. However, the TGR4A and TGR4B are isolated from each other.

(8) Complementary PWM Mode

The channels 3 and 4 are combined to output the three-phase PWM waveform in which the positive/negative phases are in a non-overlap relation. When the complementary PWM mode is setup, the general registers TGR3A, TGR3B, TGR4A and TGR4B automatically function as the output compare registers. Moreover, the individual terminals of the TIOC3A, TIOC3B, TIOC4A, TIOC4B and TIOC4D serve as the PWM output terminals automatically, and the TCNT3 and TCNT4 perform the up/down count operations.

The aforementioned buffer operations are the functions which the channels 0, 3 and 4 of the four general registers TGRA to TGRD have. The buffer operations are different with the input capture function and the compare function. The combination of the registers in the buffer operations is presented, as described above.

Figure 4:
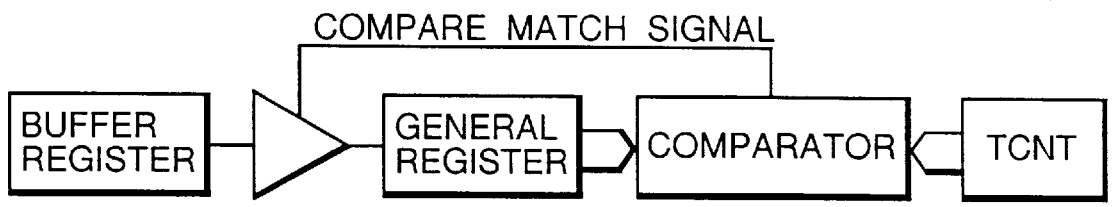
FIG. 4 is a diagram showing the operations of the case in which a general register of the timer B is an output compare register.

FIG. 4 is a construction diagram showing the buffer operation of the case that the general register is the output compare register. When the general register and the TCNT are compared by the comparator so that the compare match is made, the buffer circuit acting as the signal transfer path is activated so that the value of the buffer register of the corresponding channel is transferred to the general register.

Figure 5:
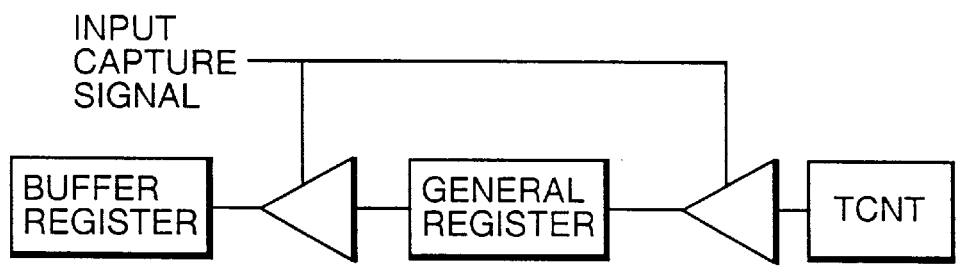
FIG. 5 is a diagram showing the operations of the case in which a general register of the timer B is an input capture register.

FIG. 5 is a construction diagram showing the buffer operation of the case that the general register is the input capture register. When the buffer circuit is activated with the input capture signal and the value of the counter TCNT is transferred to the general register, the value, stored in the general register, is simultaneously transferred to the buffer register.

Figure 6:
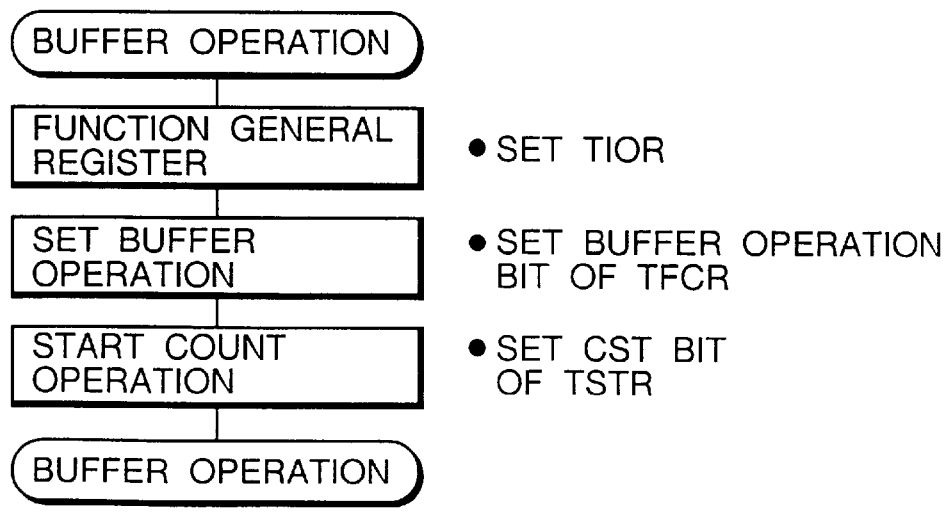
FIG. 6 is a flow chart showing a procedure for setting a buffer operation according to the present invention.

FIG. 6 is a flow chart for explaining the setting procedure of the buffer operation. The function of the general register is set in the timer I/O control register TIOR. Next, the buffer operation bit of the TFCR is set, and the CST bit of the TSTR is set to start the count operation.

Figure 7:
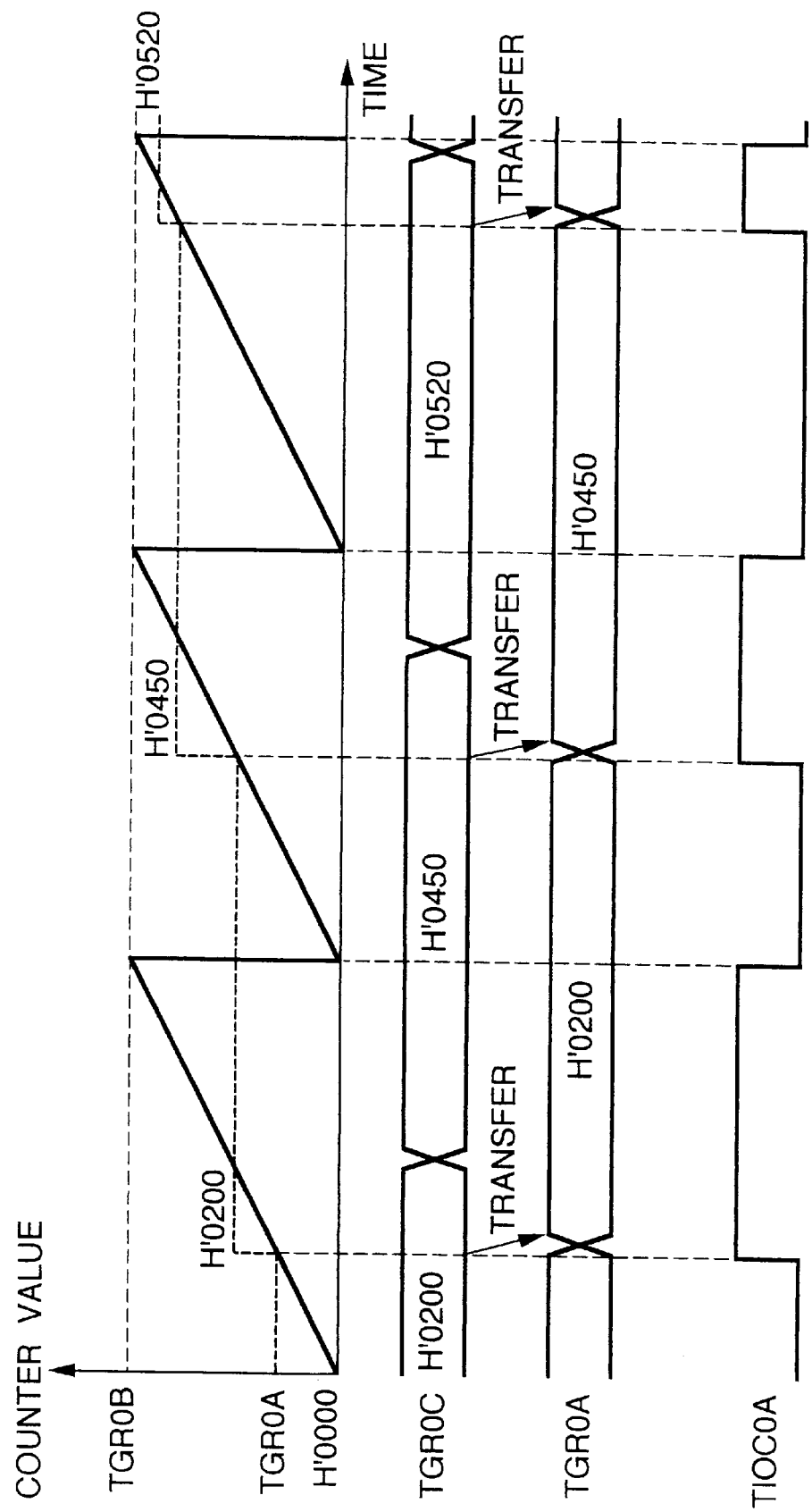
FIG. 7 is a timing chart for explaining one example of the buffer operation according to the present invention.

FIG. 7 is a timing chart for explaining one example of the buffer operation. In FIG. 7, the channel 0 is set in the PWM mode, and the general registers TGR0A and TGR0C are set for the buffer operation. In FIG. 7, the TCNT is cleared with the compare match B (the counter value is equal to that of the TGR0B). The output is at 1 with the compare match A (the counter value is equal to that of the TGR0A) and at 0 with the compare match B. When the compare match A is generated with the aforementioned buffer operation being set, the output is changed to 1. Simultaneously with this, the value (B'0200) of the buffer register TGR0C is transferred to the general register TGR0A. This operation is repeated each time the aforementioned compare match A is generated. The data from the central processing unit are stored in the TGR0C.

Figure 8:
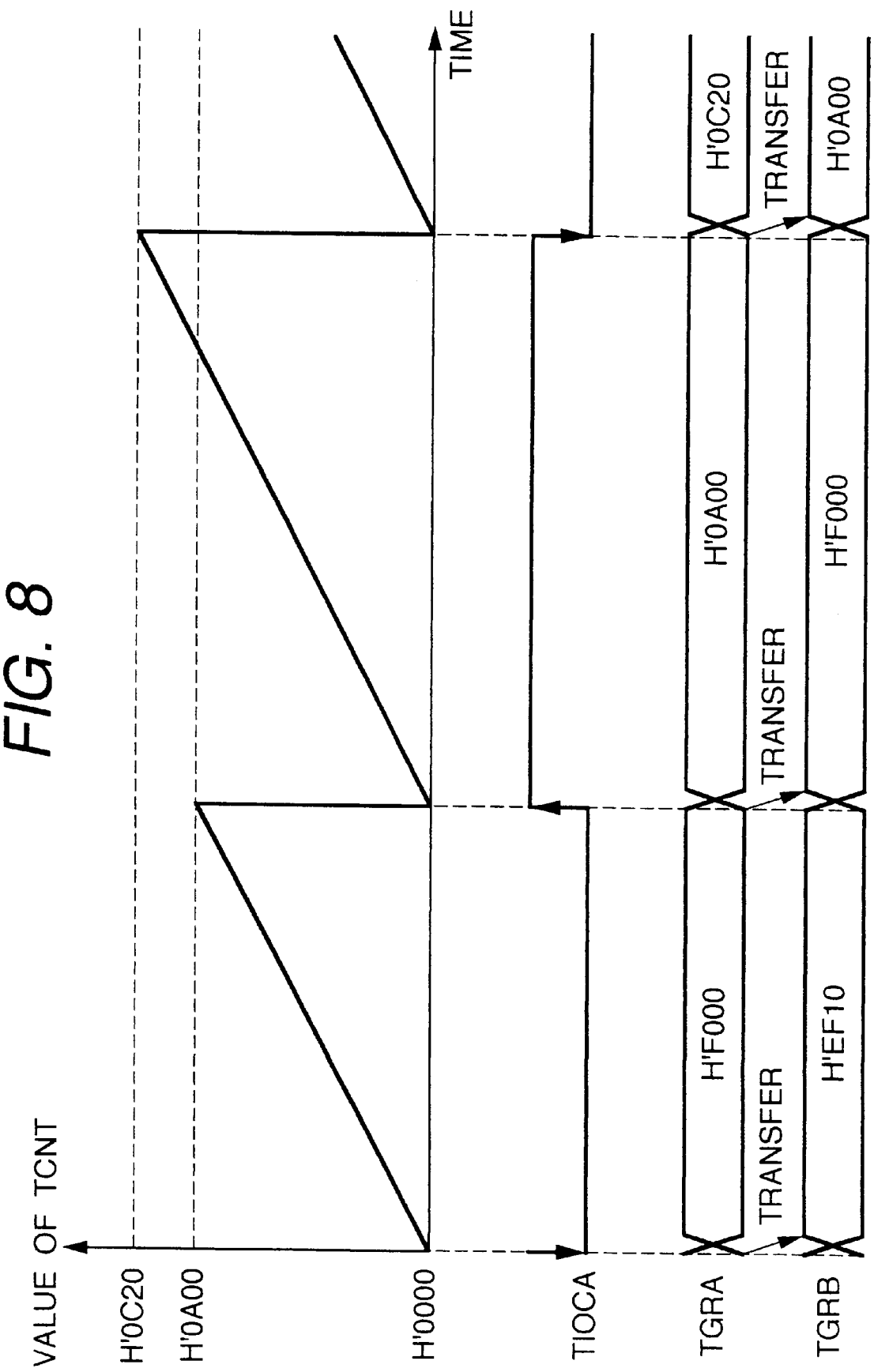
FIG. 8 is a timing chart for explaining another example of the buffer operation according to the present invention.

FIG. 8 is a timing chart for explaining one example of the buffer operation. In FIG. 8, the general register TGRA is set to operate as the input capture register, and these TGRA and TGRC are set for the buffer operation. In FIG. 8, the TCNT is counter-cleared by the input capture of the TGRA, and both the rising/falling edges are selected as the input capture input edge of the TIOCA terminal. With these buffer operations set, as described above, the value of the TCNT is stored in the TGRA by the input capture A, and simultaneously the value, which has been stored till then in the TGRA, is transferred to the TGRC. In short, when the signal TIOCA to be fed to the TIOCA terminal rises, the counter has the value H'0A00 so that this value H'0A00 is set in the transfer register TGRA. At this time, the value H'F000, held in the register TGRA, is transferred to the register TGRB, which holds the value. At the falling time of the signal TIOCA, too, the operations similar to the aforementioned ones are executed, so that the value of the counter is set in the register TGRA. At this time, the value, held in the register TGRA, is transferred to the register TGRB, which holds the value.

Figure 9:
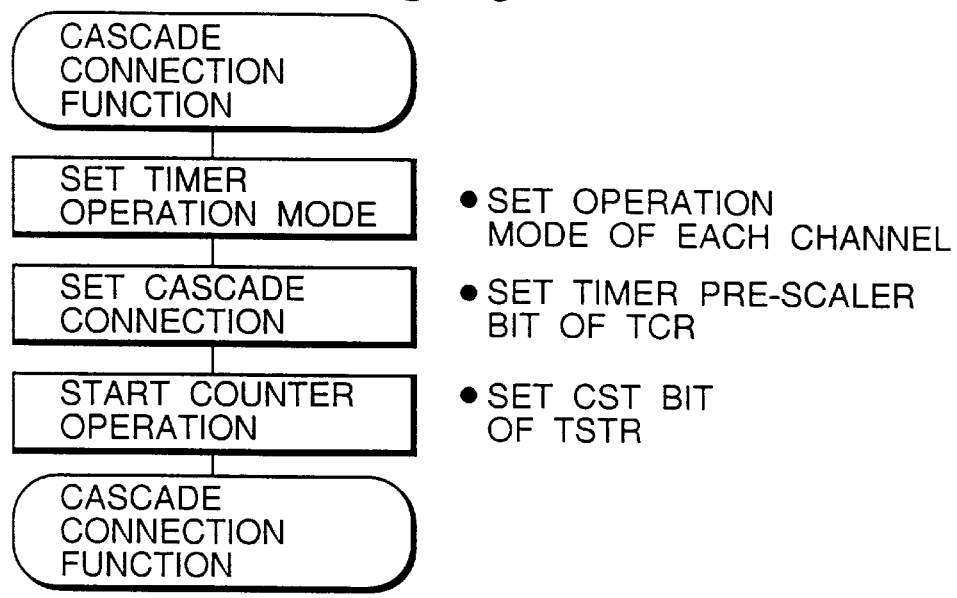
FIG. 9 is a flow chart for explaining a procedure for setting a cascade connection function according to the present invention.

FIG. 9 is a flow chart for explaining the procedure to set the cascade connection function. In the timer operation mode setting, the operation of each channel is set. Next, the cascade connection is set by setting the timer pre-scaler bit of the TCR. Then, the count operation is started by setting the CST bit of the TSTR.

Figure 10:
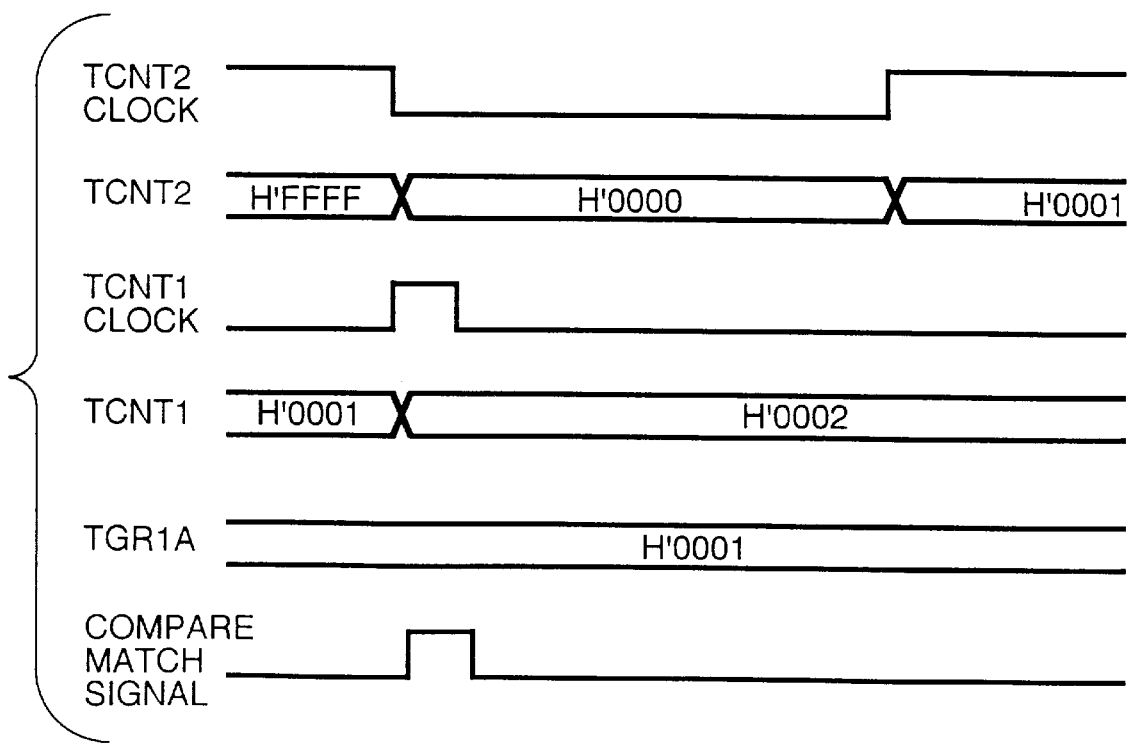
FIG. 10 is a timing chart showing one example of a cascade connecting operation according to the present invention.

FIG. 10 is a timing chart for explaining one example of the cascade connection operation. In the normal operation mode (in which the TGR is set in the compare match register), as shown in FIG. 10, the channel 1 performs the count operation with the overflow of the TCNT2, and the channel 2 performs the operation to count the two edges of the internal clock φ/16. Specifically, at the fall of the TCNT2 clock, the timer counter TCNT2 changes from H'FFFF to H'0000 to generate the TCNT1 clock. As a result, the timer counter TCNT1 changes from H'0001 to H'0002. The register TGR1A is stored with the H'0001 so that the compare match signal is generated.

Figure 11:
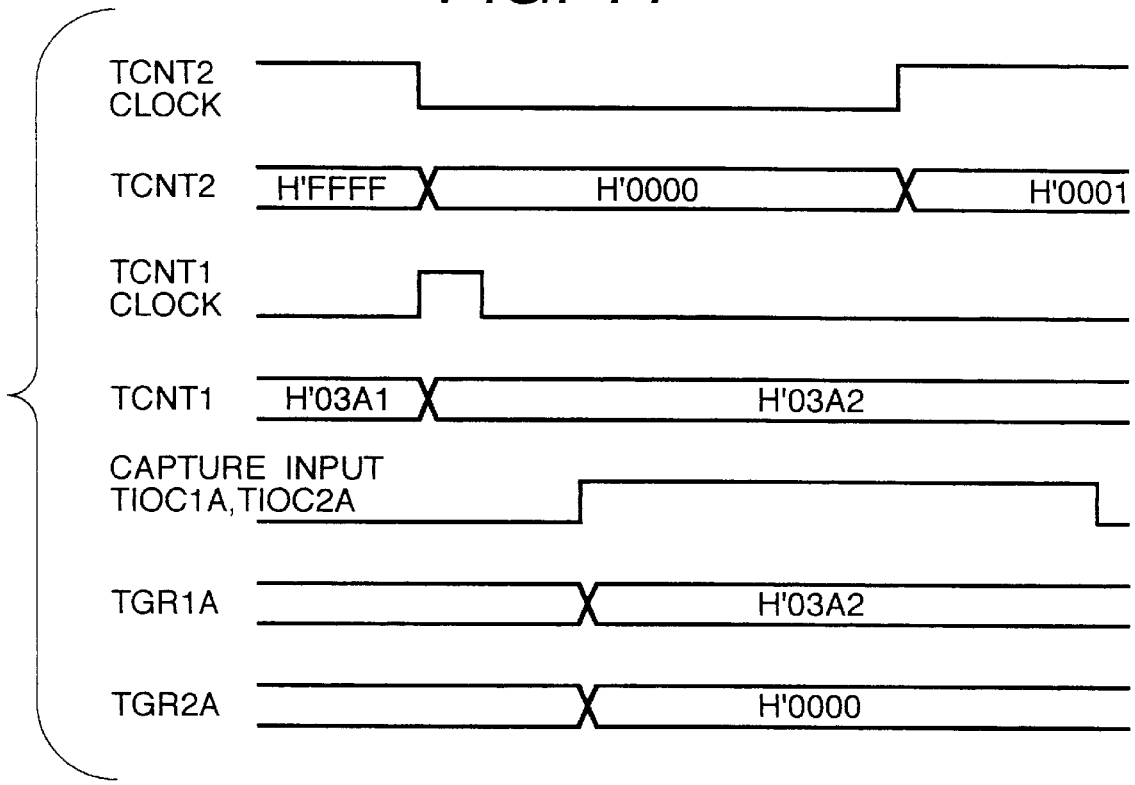
FIG. 11 is a timing chart showing another example of a cascade connection operation according to the present invention.

FIG. 11 is a timing chart for explaining another example of the cascade connection operation. In the normal operation mode (in which the TGR is set in the capture register), as shown in FIG. 11, the channel 1 performs the count operation with the overflow of the TCNT2, and the channel 2 performs the operation to count the two edges of the internal clock φ/16. Specifically, at the fall of the TCNT2 clock, the timer counter TCNT2 changes from H'FFFF to H'0000 to generate the TCNT1 clock. As a result, the timer counter TCNT1 changes from H'03A1 to H'03A2. When the capture inputs TIOC1A and TIOC2A are inputted, the register TGR1A is stored with the counted value H'03A2 of the TCNT1, and the register TGR2A is stored with the counted value H'0001 of the TCNT2.

Figure 12:
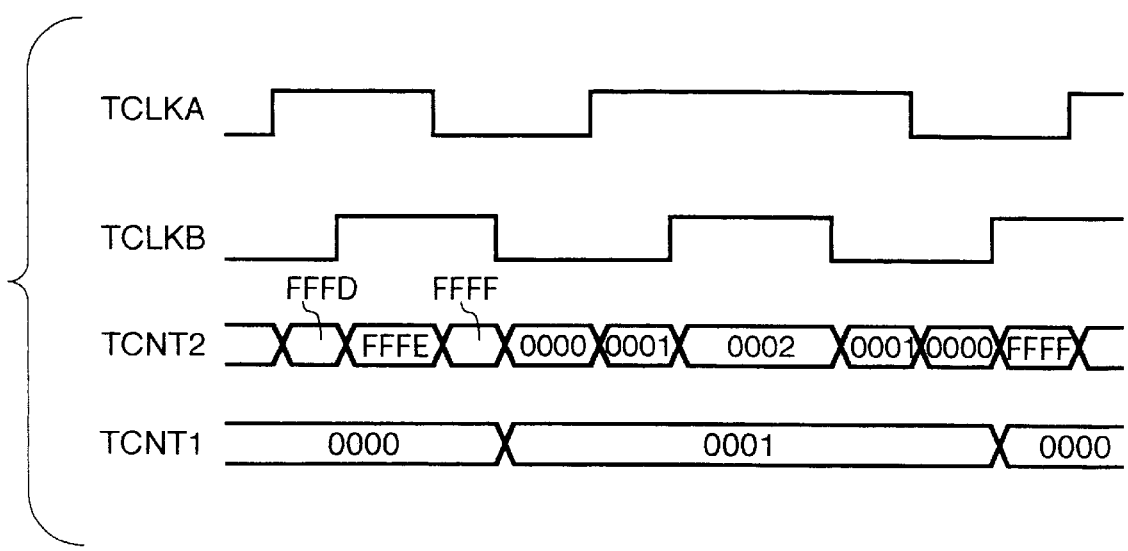
FIG. 12 is a timing chart showing still another example of a cascade connection operation according to the present invention.

FIG. 12 is a timing chart for explaining still another embodiment of the cascade connection operation. In the phase count mode of FIG. 12, the channel 1 performs the count operation in the case of overflow/underflow of normal mode/TCNT2 in the phase count mode, and the channel 2 performs the up/down counts with a phase difference of the external clock inputted to the phase count mode/TCLKA and TCLKB. Specifically, the TCNT2 performs the up-count operation of H'FFFD → H'FFFE → H'FFFF → H'0000, when the phase of the TCLKA is advanced, and the TCNT1 is caused to perform the up-count operation of H'0000 → H'0001 by that overflow. When the count value comes to H'0002, the TCNT2 performs the down-count operation of H'0002 → H'0001 → H'0000 → H'FFFF, if the phase of the TCLKA is larged, and the TCNT1 is caused to perform the down-count operation of H'0001 → H'0000 by that underflow. Thanks to this cascade connection, the dynamic range of the phase count mode can be expanded.

In the PWM mode, the PWM waveforms are individually outputted from the output terminals. By the clear or overflow of the counter, the initial values, designated by the TOIR, are outputted from the individual terminals. The level of the compare match of the individual registers can be selected from the 0 output, the 1 output and the toggle output. If the output levels of the initial value and the compare match are equalized, the PWM waveform output is not generated because the output levels do not change. By making the compare match of the TGR a counter clear factor of the TCNT, the register can be set with the period. In the PWM mode, it is possible to output the PWM waveforms of duties 0% to 100%. All the channels can be independently set in the PWM mode and can be synchronously operated. In the PWM mode 1, the TGRA and the TGRB, and the TGRC and the TGRD can be used in pairs to generate the PWM waveforms and to output the eight PWM waveforms at the maximum. In the PWM mode 2, one TGR is used for the dedicated period register whereas the others are used for the PWM outputs. In combination with the synchronous operations, it is possible to output the fifteen complementary PWM waveforms at the maximum.

Figure 13:
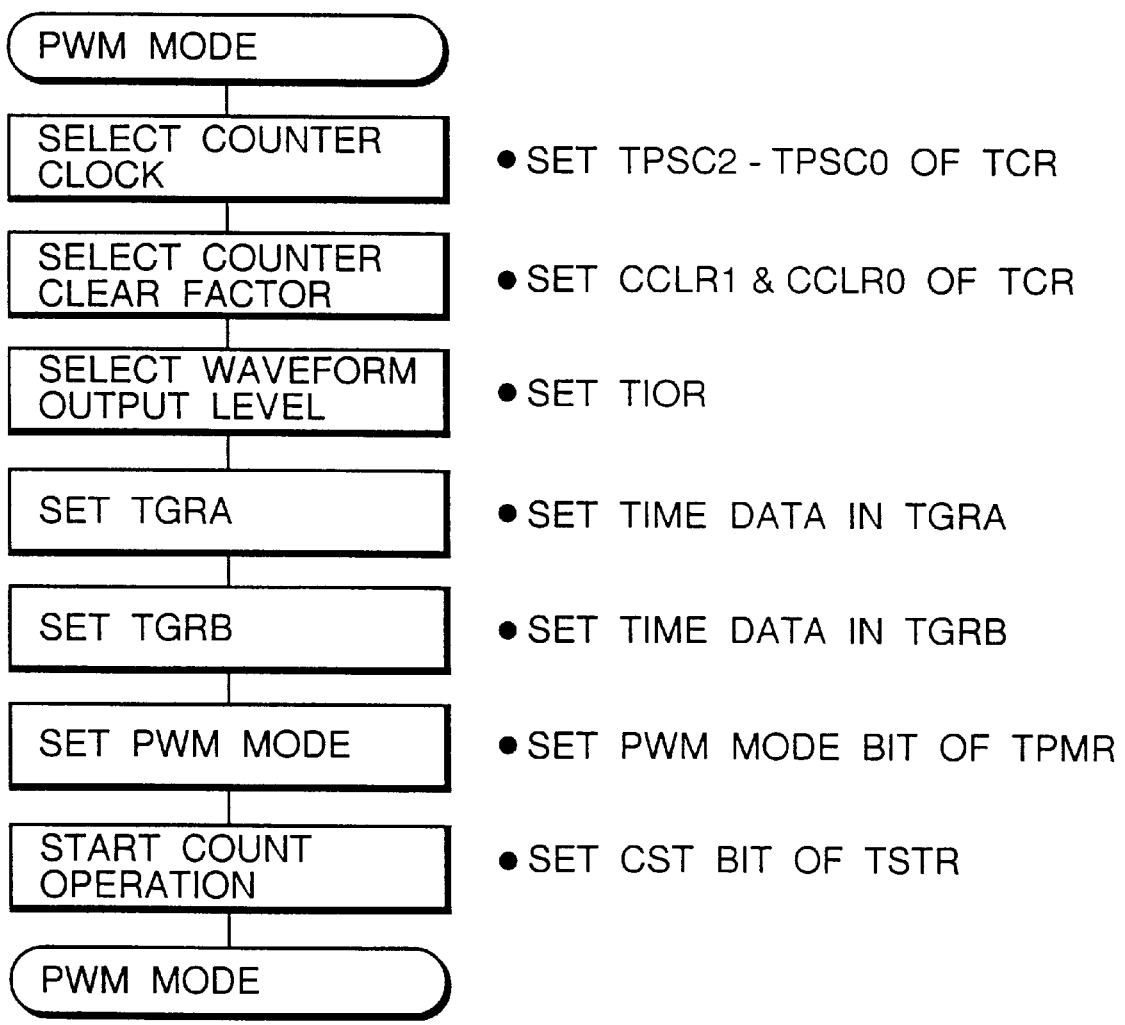
FIG. 13 is a flow chart for explaining a procedure for setting a PWN mode according to the present invention.

FIG. 13 is a flow chart for explaining the procedure of setting the PWM mode. At first step, the TPSC2 to TPSC0 bits of the TCR are set to select the counter clocks. At second step, the CCLR1 and CCLR0 bits of the TCR are set to select the counter clear factors. At third step, the TIOR is set to select the waveform output levels. At fourth step, the time data are set in the TGRA. At fifth step, the time data are set in the TGRB. AT sixth step, the PWM mode bit of the TPMR is set. At seventh step, the CST bit of the TSTR is set to start the count operation. These individual bits are set by the central processing unit.

FIG. 14 is an operation waveform diagram for explaining the operations of the PWM mode. If the PWM mode is set, the TIOCA to TIOCD terminals are the output terminals to output the waveforms designated by the compare match of the TGR. In FIG. 14, the counter clear factor of the TCNT is the compare match of the TGRA, and the TGRB has an initial value 1 and an output 1 in the compare match. In this case, the value set in the TGRA is the period, and the value set in the TGRB is the duty.

Figure 16:
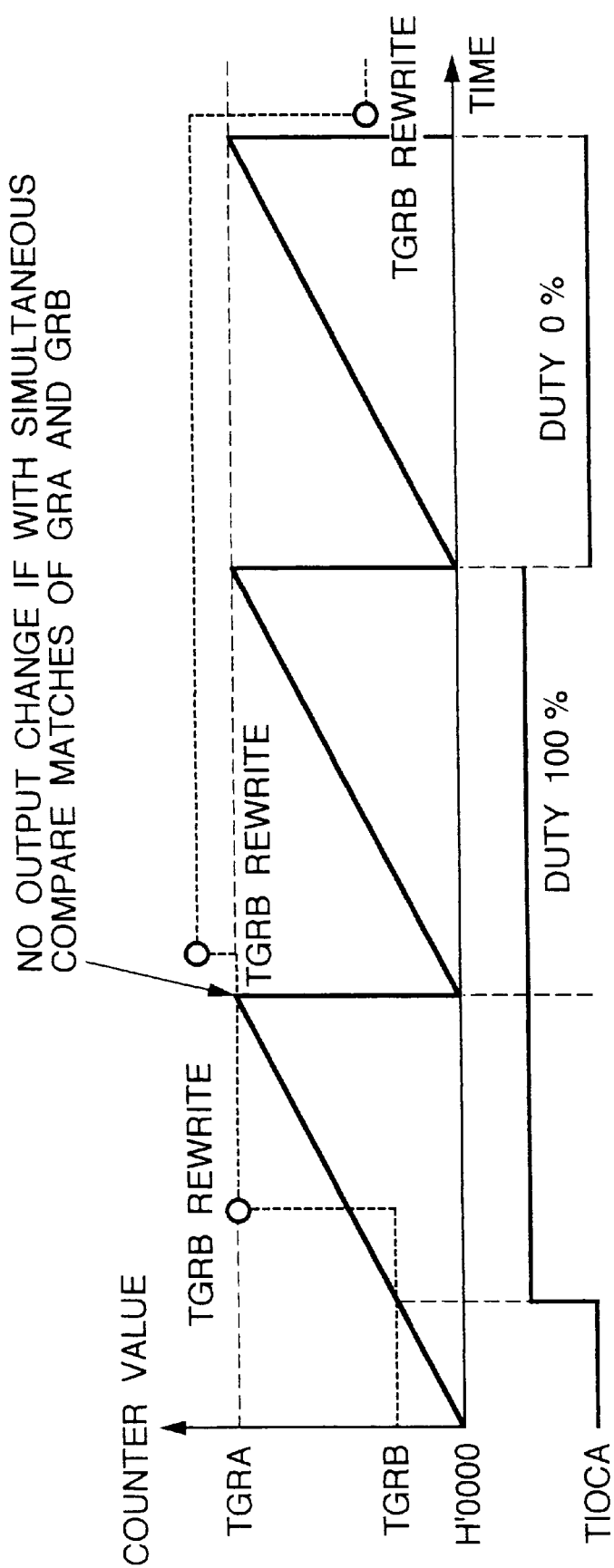
FIG. 16 is an operation waveform chart for explaining another operation in the PWM mode according to the present invention.

FIGS. 15 and 16 are operation waveform diagrams for explaining other operations of the PWM mode. In FIG. 15(A), the counter clear factor of the TCNT is the compare match of the TGRA, and the TGRB has the initial value 0 and the output 1 in the compare match. In this case, the value, set in the TGRA, is the period, and the value, set in the TGRB, is the duty. An output of duty of 0% is generated if TGRA<TGRB is established by rewriting the TGRB. In FIG. 15(B) the output will not change if the compare matches of the TGRA and TGRB are simultaneously caused by the, aforementioned rewrite of the TGRB. As a result, an. output of duty of 100% is outputted even if TGRB<TGRA is established by the rewrite. In FIG. 16, the output does not change if the compare matches of the TGRA and TGRB simultaneously occur by the rewrite of the TGRB. As a result, an output of duty of 100% is outputted even if TGRB<TGRA is established by the rewrite. If, moreover, TGRB>TGRA is established by the repeated rewrite, the duty of 100% changes to the duty of 0% for the next period.

In the phase count mode, the phase difference between the two external clock inputs is detected to bring the TCNT into the up/down count operation. This mode can be set in the channels 1 and 2. When this phase count mode is set, the counter clock takes the external clock irrespective of the setting of the TPSC bit of the TCR, and the TCNT acts as the up/down counter. However, the function of the TIOR is effective, and the input-capture/compare-match functions and the interrupt function can be used. These functions can be used for processing the inputs of the two-phase encoder pulses. The procedure of the phase count mode is set by designating the MD2 to MD0 bits of the TMDR.

Figure 17:
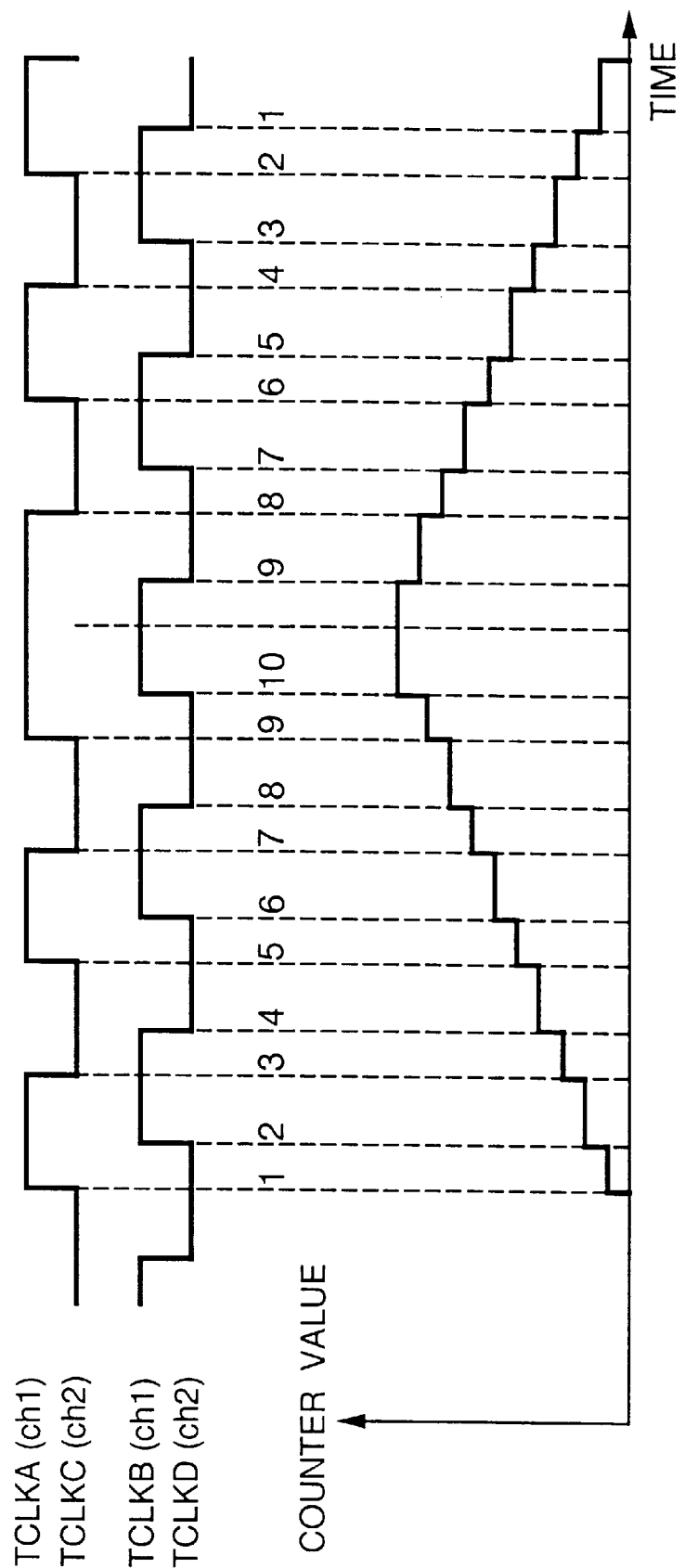
FIG. 17 is a timing chart for explaining one example of a phase count mode according to the present invention.

FIG. 17 is a timing chart for explaining one example of the operation in the phase count mode. FIG. 17 shows the phase count mode 1. According to the count-up condition of this mode, the count-up is effected in the channel 1 (2) if the TCLKB (TCLKD) rises to the high level when the TCLKA (TCLKC) is at the high level. The count-up is effected if the TCLKB (TCLKD) drops to the low level when the TCLKA (TCLKC) is at the low level. On the other hand, the count-up is effected if the TCLKA (TCLKC) rises to the high level when the TCLKB (TCLKD) is at the low level. The count-up is effected if the TCLKA (TCLKC) drops to the low level when the TCLKB (TCLKD) is at the low level. In short, the count-up operation is executed when the phase of the TCLKA (TCLKC) leads the phase of the TCLKB (TCLKD).

According to the count-down condition of this mode, the count-down is effected in the channel 1 (2) if the TCLKB (TCLKD) drops to the low level when the TCLKA (TCLKC) is at the high level. The count-down is effected if the TCLKB (TCLKD) rises to the high level when the TCLKA (TCLKC) is at the low level. On the other hand, the count-down is effected if the TCLKA (TCLKC) rises to the high level when the TCLKB (TCLKD) is at the low level. The count-down is effected if the TCLKA (TCLKC) drops to the low level when the TCLKB (TCLKD) is at the low level. In short, the count-down operation is executed when the phase of the TCLKA (TCLKC) lags behind that of the TCLKB (TCLKD).

In the phase count mode 2, although not shown, the count-up is effected if the TCLKA (TCLKC) drops to the low level when the TCLKB (TCLKD) of the channel 1 (2) is at the high level, and the count-down is effected if the TCLKA (TCLKC) drops to the low level when the TCLKB (TCLKD) is at the low level.

In the phase count mode 3, the count-up is effected if the TCLKB (TCLKD) rises to the high level when the TCLKA (TCLKC) is at the high level, or if the TCLKB (TCLKD) drops to the low level when the TCLKA (TCLKC) is at the low level. The count-down is effected if the TCLKB (TCLKD) drops to the low level when the TCLKA (TCLKC) is at the high level, or if the TCLKB (TCLKD) rises to the high level when the TCLKA (TCLKC) is at the low level.

In the phase count mode 4, the count-up is effected if the TCLKA (TCLKC) drops to the low level when the TCLKB (TCLKD) of the channel 1 (2) is at the high level, and the count-down is effected if the TCLKb (TCLKD) drops to the low level when the TCLKA (TCLKC) is at the high level.

In the reset synchronized PWM mode, the three phases of the PWM waveform (in positive/negative phases) having one shared waveform change point are outputted by combining the channels 3 and 4. When the reset synchronized mode is set, the TIOC3A, TIOC3B, TIOC4A, TIOC4C, TIOC4B and TIOC4D terminals automatically act as the PWM terminals so that the timer counter TCNT3 functions as the up-counter.

Figure 18:
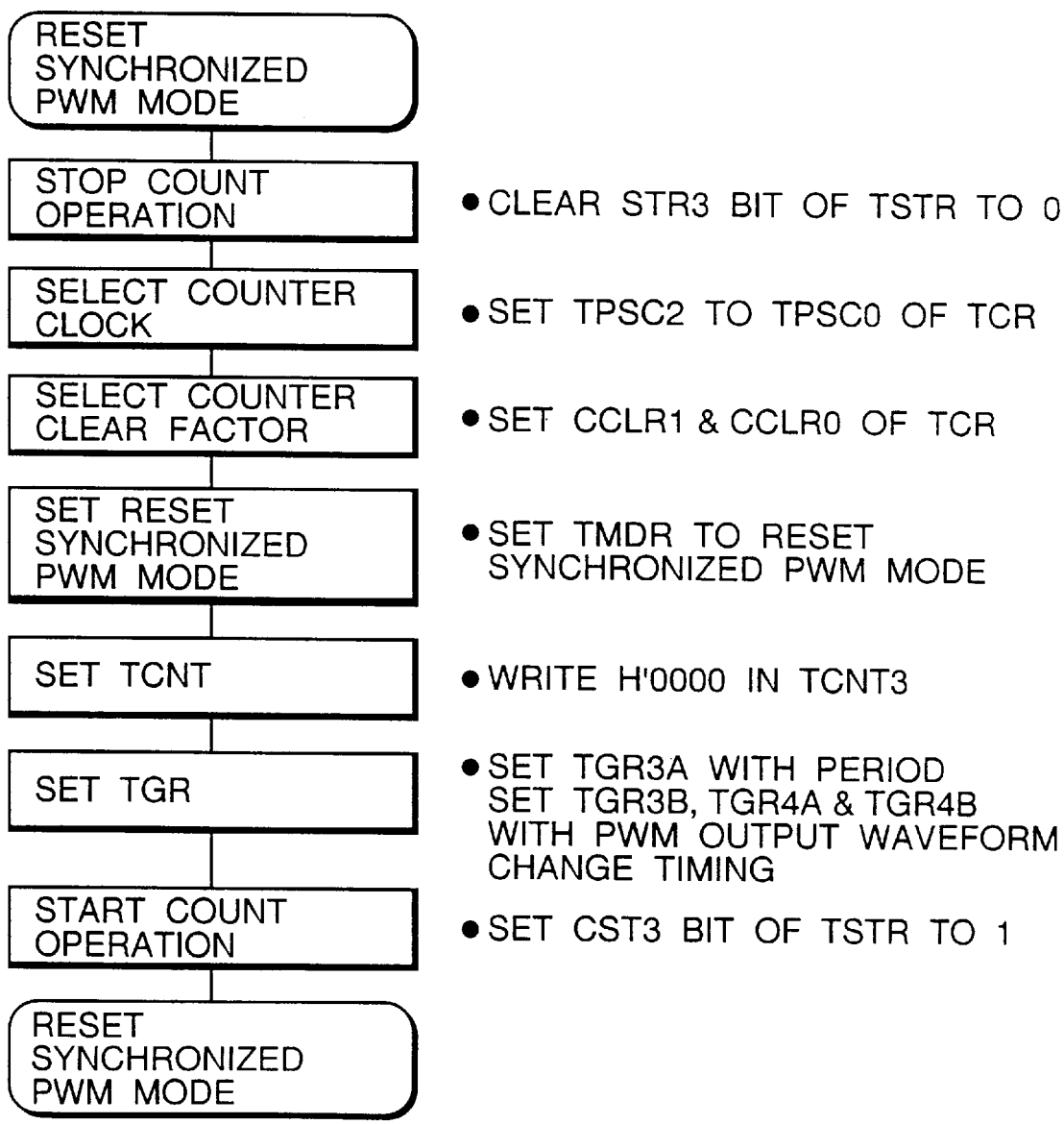
FIG. 18 is a flow chart for explaining a procedure for setting a reset synchronized PWM mode according to the present invention.

FIG. 18 is a flow chart for explaining the procedure of setting the reset synchronization PWM mode. This reset synchronization PWM mode is set in the following procedure. At a first step, the STR bit of the register TSTR is cleared to 0 to stop the count operation. At a second step, the TPSC2 to TPSC0 bits of the register TCR are set to select the counter clocks. At a third step, the CCLR1 and CCLR0 bits of the register TCR are set to select the count clear functions. At a fourth step, the register TMDR is set to the reset synchronization PWM mode. At a fifth step, the H'0000 is written in the counter TCNT3 to set the counter. At a sixth step, a period is set in the register TGR3A to set the PWM output waveform change timing in the TGR3B, TGR4A and TGR4B. At seventh step, moreover, the CST3 bit of the register TSTR is set to 1 to start the count operation.

Figure 19:
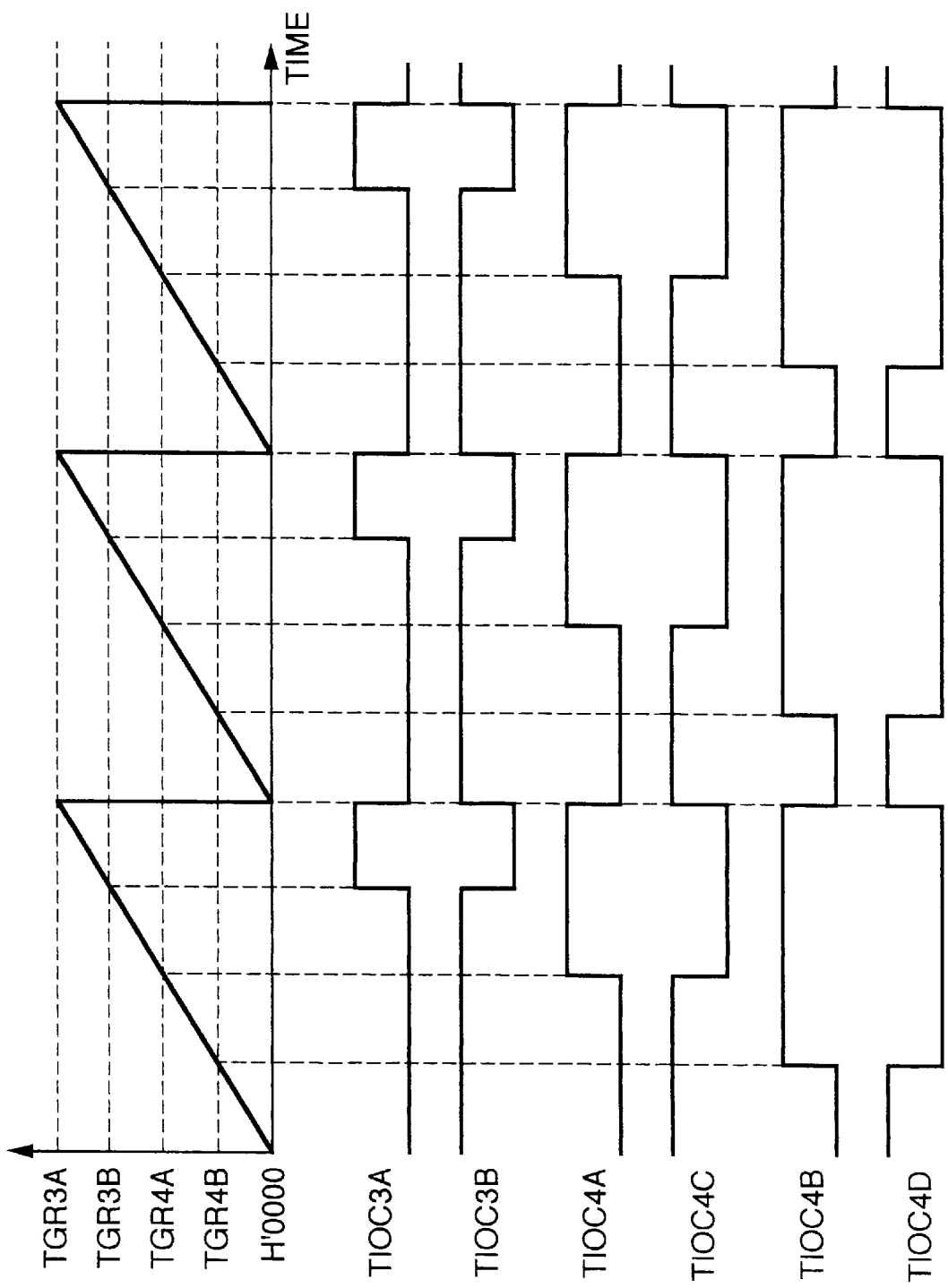
FIG. 19 is a timing chart for explaining the operation in the reset synchronized PWM mode according to the present invention.

FIG. 19 is a timing chart for explaining the operation of the reset synchronization PWM mode. In this reset synchronization PWM mode, the counter TCNT3 acts as the up-counter. At this time, the counter TCNT4 acts independently. The counter TCNT3 is cleared when its count value makes the compare match with the value of the register TGR3A, to restart the count-up from H'0000. The PWM terminal makes the toggle output at every compare match between the registers TGR3B, TGR4A and TGR4B and the counter TCNT3 and at every counter clear. The pulse output from each PWM output terminal can be enabled or fixed by using the aforementioned TGCR.

In the complementary PWM mode, the three phases of the PWM waveform having a non-overlapped relation between the positive and negative phases are outputted by combining the channels 3 and 4. If the complementary PWM mode is set, the TIOC3B, TIOC3D, TIOC4A, TIOC4B, TIOC4C and TIOC4D terminals can be automatically set as the PWM output terminals, and the TIOC3A terminal can be set as the toggle output synchronized with the PWM period whereas the TIOC3B can be set as the external trigger input terminal for cutting off the PWM output. Moreover, the counters TCNT3 and TCNT4 function as the up/down counters.

Figure 20:
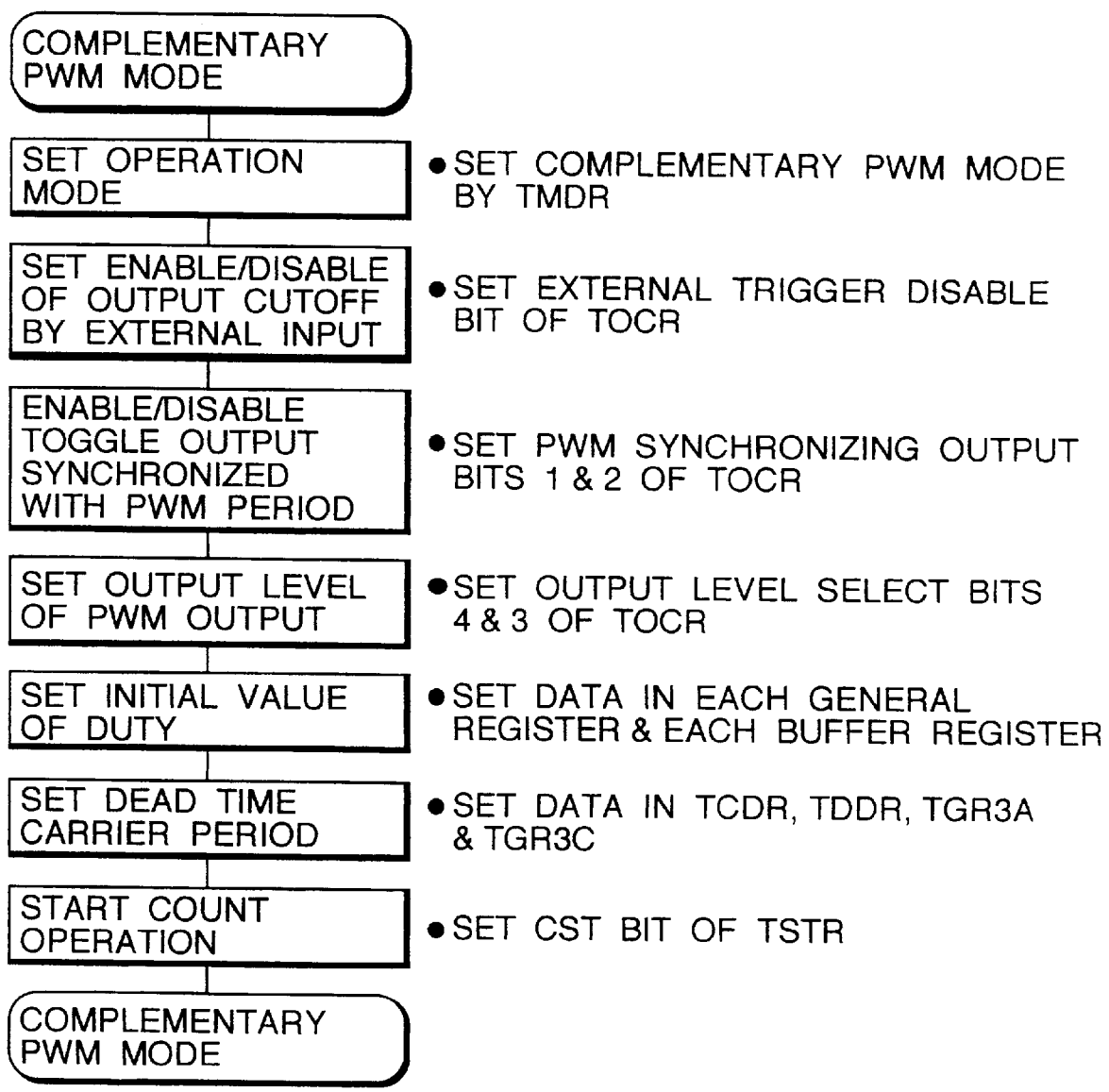
FIG. 20 is a flow chart for explaining a procedure for setting a complementary PWM mode according to the present invention.

FIG. 20 is a flow chart for explaining the procedure of setting the complementary PWM mode. The complementary PWM mode is set according to the following procedure. At a first step, the complementary PWM mode is set by the register TMDR. At a second step, the external trigger enable bit of the register TOCR is set to set the enable/disable of the output cutoff by the external input. At a third step, the PWM synchronizing outputs 2 and 1 of the register TOCR are set to set the enable/disable of the toggle output which is synchronized with the PWM period. At a fourth step, the output level select bits 4 and 3 of the register TOCR are set to set the PWM output level. At a fifth step, in the individual general registers TGR and the individual buffer registers, data are set to set the initial value of the duty. At a sixth step, in the registers TCDR, TDDR, TGR3A and TGR3C the data are set to set the dead time and the carrier period. At a seventh step, moreover, the CST bits of the register TSTR are set to start the count operation.

Figure 21:
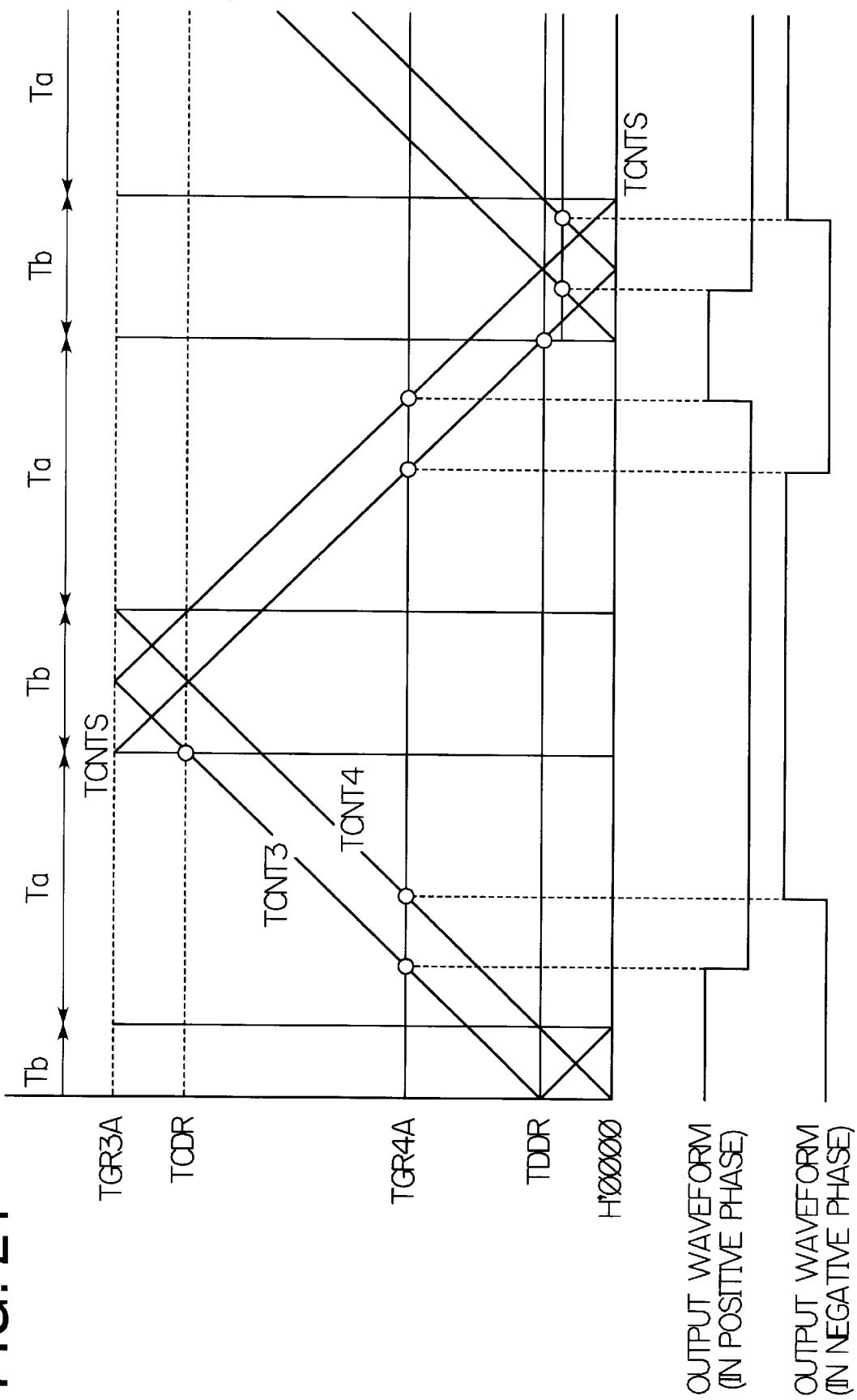
FIG. 21 is a waveform chart for explaining the complementary PWM mode according to the present invention.

FIG. 21 is a waveform chart for explaining the operation of the complementary PWM mode. By setting up the modes 3 to 0 of the timer mode register TMDR, the channels 3 and 4 are set to be in the complementary PWM mode. By setting the output level selects 4 and 3 to select the active level of the PWM pulses, and the outputs are the level outputs resulting from the matching of the individual counters TCNT3 and 4 and the register TGR. The dead time is set in the timer dead time register TDDR by adding the ½ of the carrier period to the timer period data register TDCR and the ½ of the carrier period and the dead time to the TGR3A. The PWM duty value to be outputted is set in the duty registers of the registers TGR3B, TGR4A and TGR4B. Then, the timer start register TSTR is set to start the count operations of the TCNT3 and TCNT4.

For the period Ta, as shown in FIG. 21, the comparator compares the two counters TCNT3 and TCNT4. For the period Tb, the comparator compares the three counters TCNT3, TCNT4 and TCNTS. At the up-count time, as shown in FIG. 21, the value 0 with the positive phase is outputted when the register TGR4A makes a compare match with the counter TCNT3, and the value 1 with the negative phase is outputted when the register TGR4A makes a compare match with the counter TCNT4. At the down-count time, the value 0 with the negative phase is outputted when the register TGR4A makes a compare match with the counter TCNT4, and the value 1 with the positive phase is outputted when the register TGR4A makes a compare match with the counter TCNT3. For the period Tb, the existing data (of the old value) of the TGR4A and the new duty of the subsequent period are simultaneously compared to change the duty while the dead time is being held in the sub-counter TCNTS. In short, when the new duty is set to a value not larger than the TDDR, the value 0 with the positive phase is outputted by the compare match between the new value of the TGR4A and the sub-counter TCNTS. On the other hand, the value 1 with the negative phase is outputted by the compare match between the new value of the TGR4A and the TCNT4. The output waveforms with the positive/negative phases, as shown, correspond to the U/U, V/V or W/W of FIG. 1.

Figure 22:
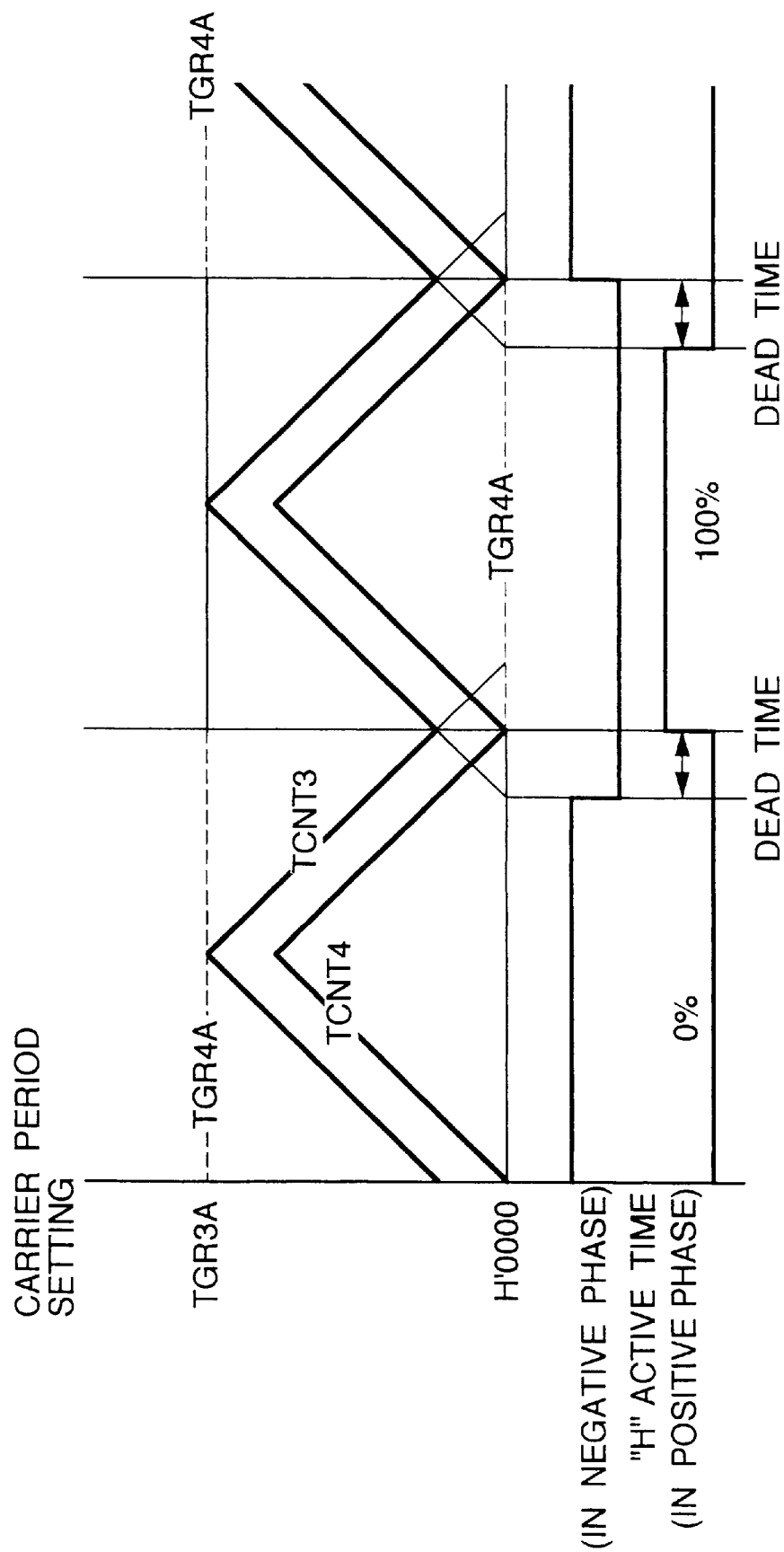
FIG. 22 is a waveform chart for explaining output examples of 0% and 100% in the complementary PWM mode according to the present invention.

FIG. 22 is a waveform chart for explaining the output examples of 0% and 100% in the aforementioned complementary PWM mode. In this complementary PWM mode of the invention, the duties of 0% and 100% can be outputted. FIG. 22 shows the waveforms at the outputs of 0% and 100% and the register set values at that time. The duty of 100% can be outputted by setting the same value as that of the TGR3A in the general register TGR4A. On the other hand, the duty of 0% can be outputted by setting H'0000 in the general register TGR4A. When the duty is changed from 100% to 0%, as shown in FIG. 22, the period of the high level is shortened by the dead time.

Figure 23:
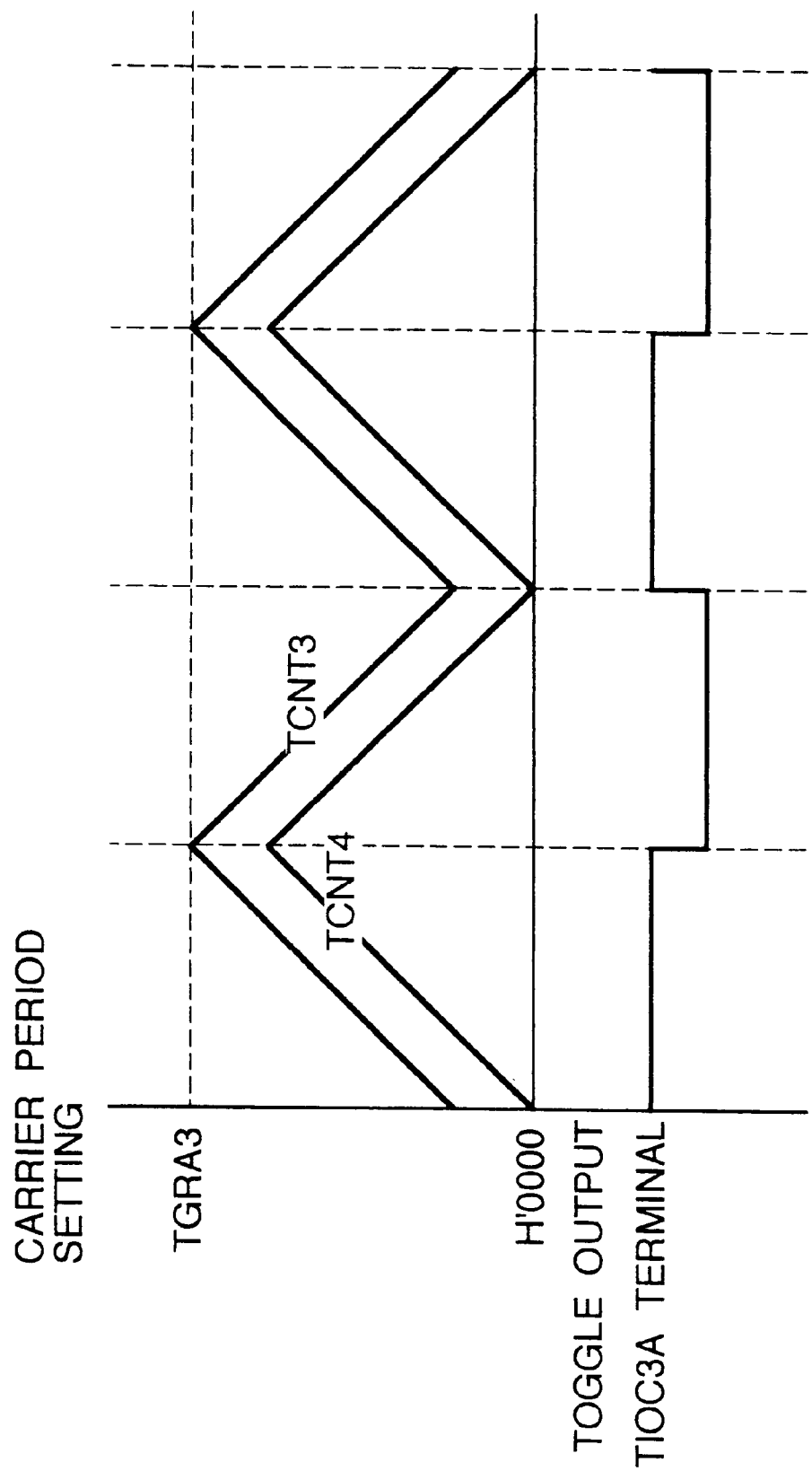
FIG. 23 is a waveform chart for explaining a toggle output function in the complementary PWM mode according to the present invention.

FIG. 23 is a waveform diagram for explaining the toggle output function in the aforementioned complementary PWM mode. In this complementary PWM mode of the invention, the toggle output synchronized with the carrier period, can be made by setting the PSYN1 and PSYN0 bits of the output control register TOCR. At this time, the TIOC3A terminal automatically acts as the synchronization output terminal, so that the output waveform shown in FIG. 23 can be achieved. In short, the initial value of the synchronizing output is the output 1. Moreover, this output is enabled by the trigger of the external cutoff signal input of the PWM output to determine whether the output level at that time is held or whether the synchronizing output is continued until the counters TCNT3 and TCNT4 are stopped.

Figure 24:
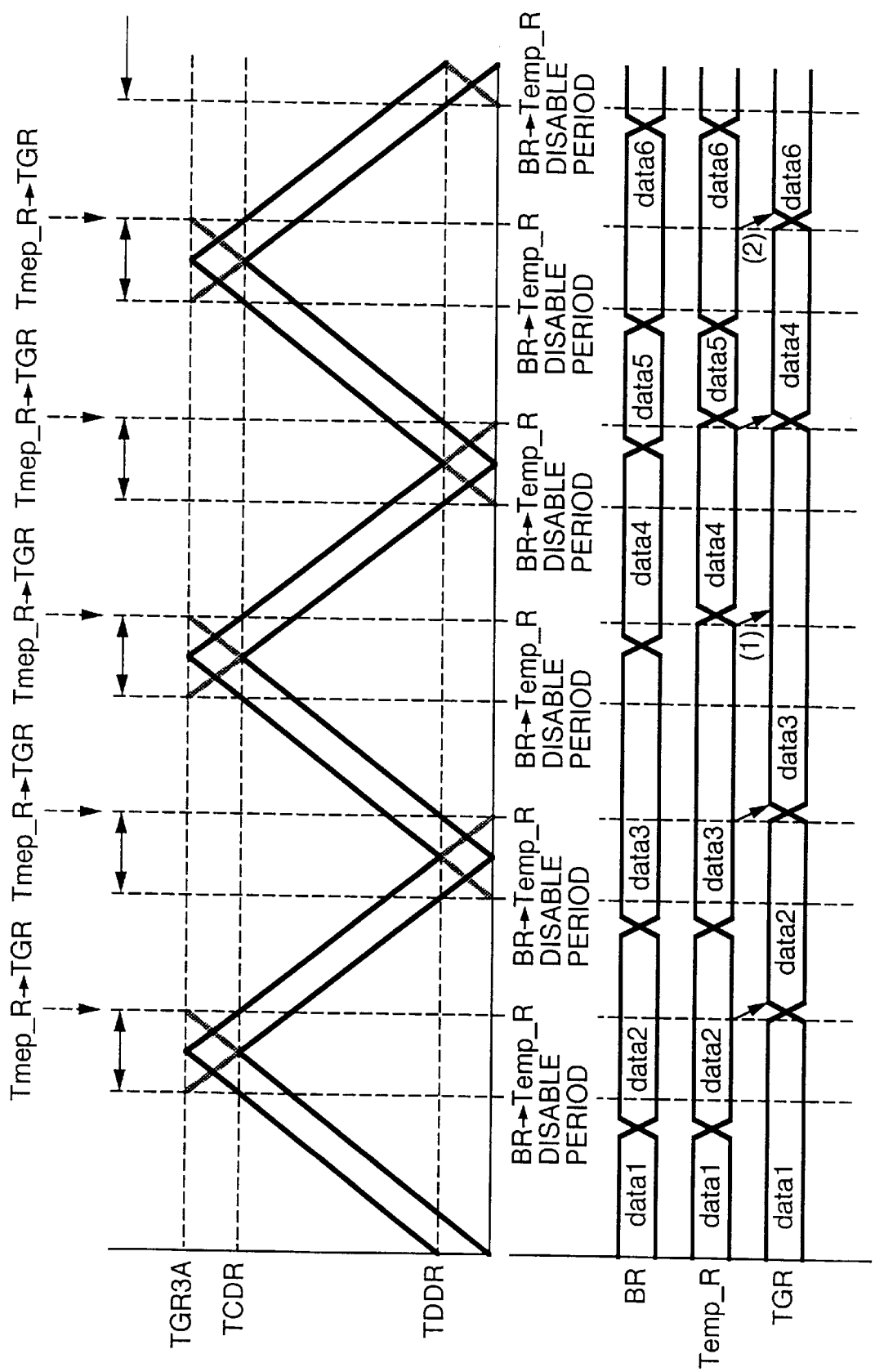
FIG. 24 is a waveform chart for explaining a PWM duty data transfer timing in the complementary PWM mode according to the present invention.
Figure 41:
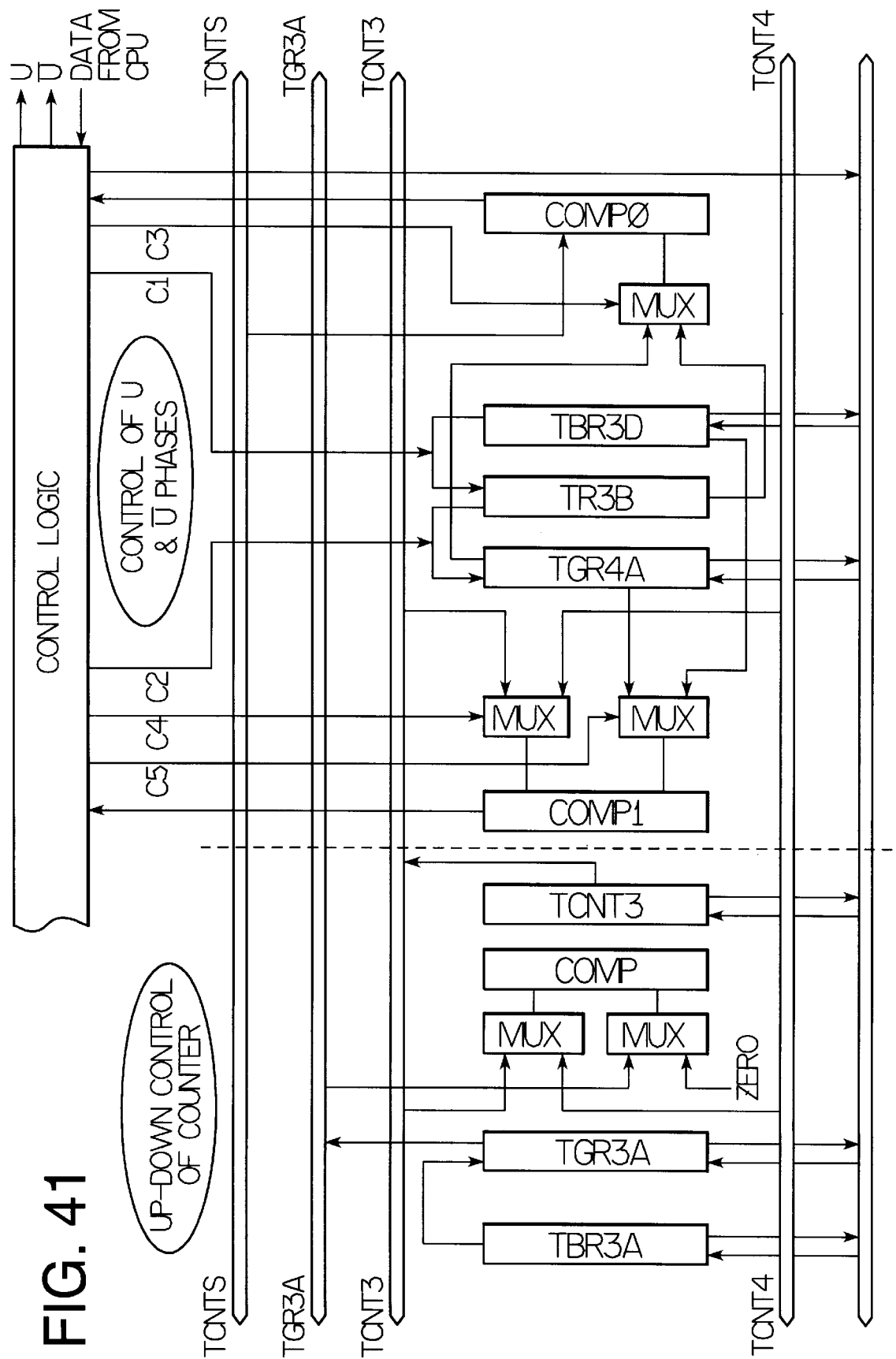
FIG. 41 is a block diagram showing still another embodiment of the up-down control unit according to. the present invention.

FIG. 24 is a waveform diagram for explaining the PWM duty data transfer timing in the aforementioned complementary PWM mode. In this complementary PWM mode of the invention, the timing for the transfer from the buffer register to the general register is set when the mode is selected by the timer mode register TMDR. FIG. 24 shows an example of the operation of the case that the data are transferred for each ½ PWM period. The transfer from the buffer register (TBR3D in FIG. 41) to the temporary register (temp_R: TR3B in FIG. 41) is always executed while the sub-counter TCNTS is inactive. On the other hand, the transfer from the temporary register to the general register (TGR3B in FIG. 41) is executed at the two timings, at which the TCDR and the TCNT3 generate the compare match at the down-count time and at which the dead time register TDDR and the TCNT4 generate the compare match at the up-count time. As a result, the value of the general register does not change for one PWM period, as shown in FIG. 24(1), if no rewrite of the buffer register is performed for the ½ period. On the other hand, the data 5 are eliminated, as shown in FIG. 24(2), if the buffer register is rewritten twice for the ½ PWM period. The data transfer between the registers in FIG. 24 is controlled by the control logic. The hardware construction of the operations shown in FIG. 24 is shown in FIG. 41.

In the complementary PWM mode, a designated trigger is inputted by clearing the external trigger disable bit of the timer output control register TOCR. Then, the output value is automatically changed from the PWM output to the value of the timer output cutoff register TOSR. The external trigger can be inputted to the TIOC3C terminal to designate the edge as by the capture input.

Figure 27:
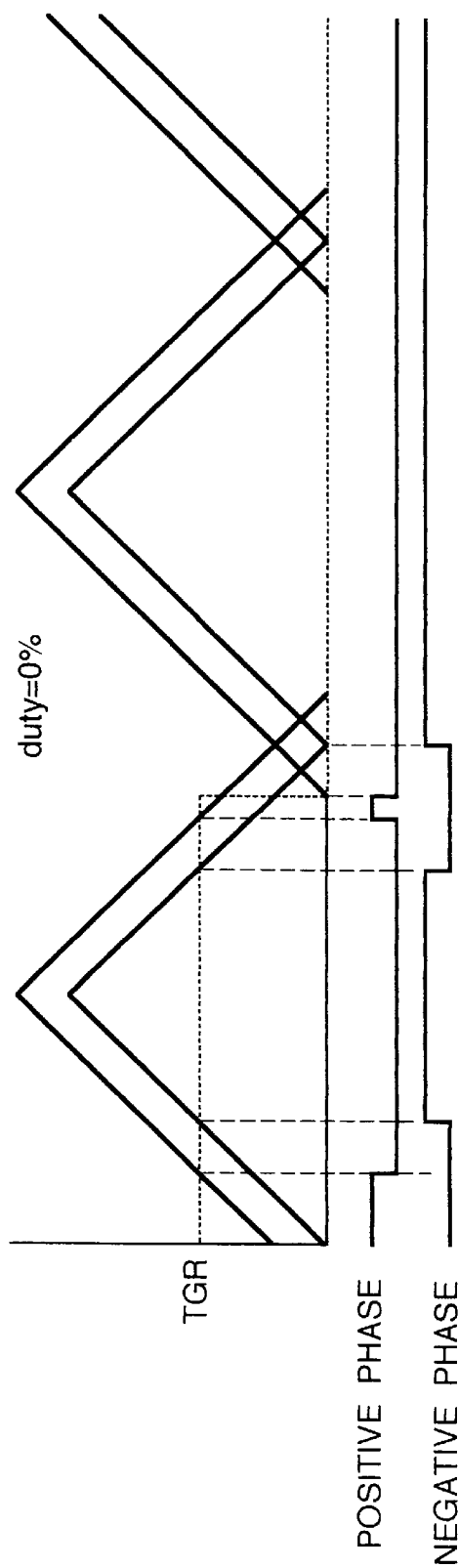
FIG. 27 is a waveform chart for explaining an output example in the complementary PWM mode according to the present invention.

FIGS. 25 to 27 are waveform diagrams for explaining the individual output examples of 100% to 0% in the aforementioned complementary PWM mode. The rewrite to the TGR is executed at a constant timing, as shown in FIG. 24, but the compare value to be used in the actual compare match is indicated by TGR for simplification of description. FIG. 25(A) shows an example in which the duty of 100% is outputted by setting the same value as that of the TGR3A in the register TGR for setting the duty. FIG. 25(B) shows an example in which the output is made within a range of 100<duty≦100−Td. In this range, the lower inverted output is left at the low level. The value Td is determined by the difference between the data held by the register TGR3A and the data held by the register TCDR.

FIG. 26(A) shows an example of the range of 100−Td<duty<Td, and an example of the range of Td<duty<0. Moreover, FIG. 27 shows an example in which the duty of 0% is outputted by setting H"0000 in the register TGR for setting the duty. In the complementary PWM mode according to the present invention, it is possible to achieve the complementary PWM output of which the upper and lower positive/negative phases are symmetric with respect to the duty of 50%.

Figure 28:
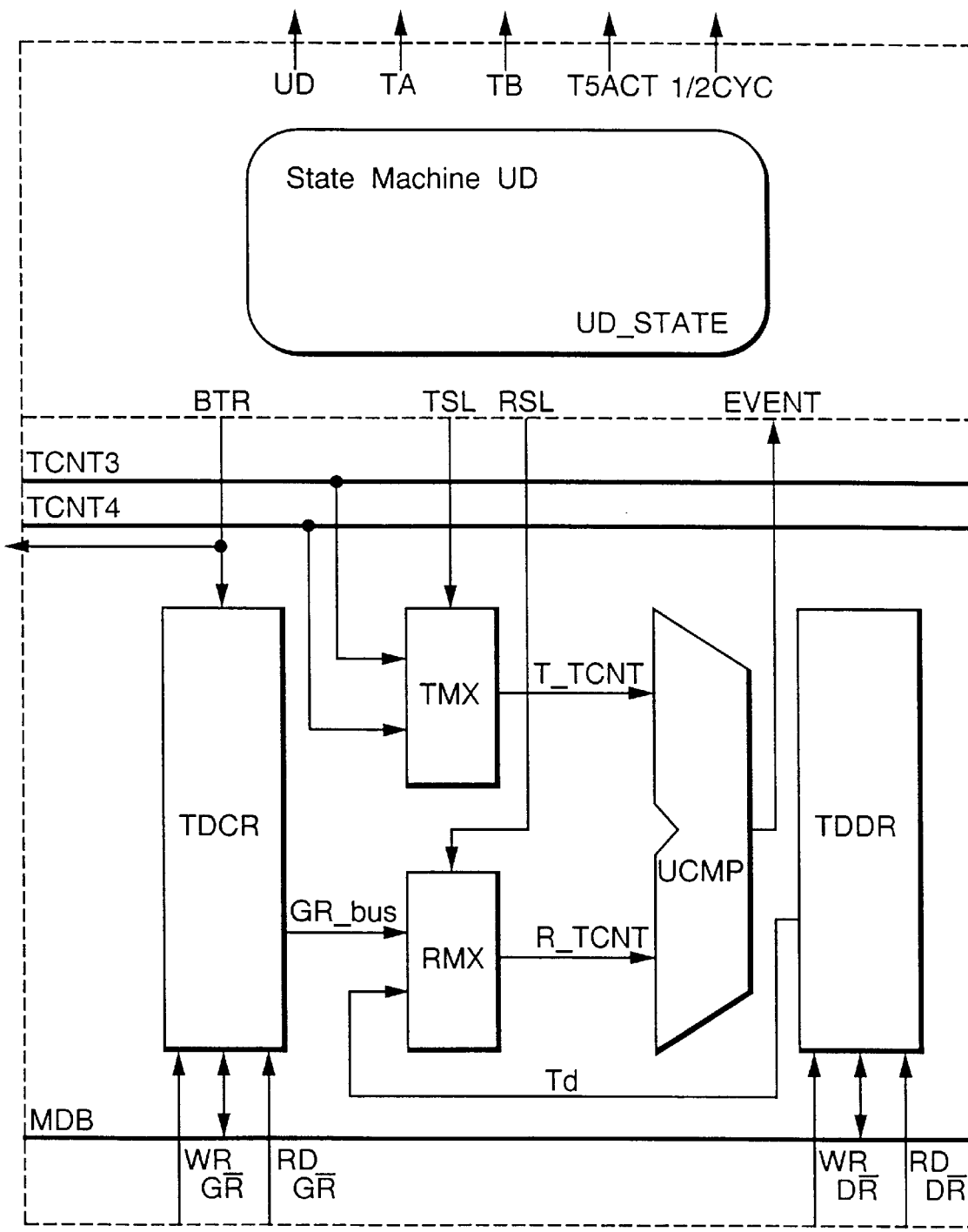
FIG. 28 is a block diagram showing one embodiment of an up-down control unit in a timer according to the present invention.

FIG. 28 is a block diagram of one embodiment of the up/down control unit. The upper portion of FIG. 28 is the up/down control unit, and included in the control logic of FIG. 2. The lower portion of FIG. 28 is a unit for executing the complementary PWM. The basic functions of the up/down control unit will be described with reference to the status transition diagram of FIG. 29 and the schematic waveform diagram of FIG. 30.

The basic functions of the up/down control unit are:
(1) Generation of an up/down switch signal UD;
(2) Generation of a double compare period signal TA for setting old and new values at a crest;
(3) Generation of a double compare period signal TB for setting old and new values at a valley;
(4) Generation of a buffer transfer signal BTR;
(5) Generation of a load signal T5ACT of the sub-counter (TCNTS);

(6) Generation of a reload value select signal of the sub-counter;

(7) Generation of a switch signal TSL for selecting a counter to be compared with a register, so as to realize the aforementioned generations;

(8) Generation of the switch signal SL for selecting the register to be compared with the counter, so as to realize the aforementioned generations; and (9) Generation of a ½ PWM period output signal (½ CYC).

Figure 29:
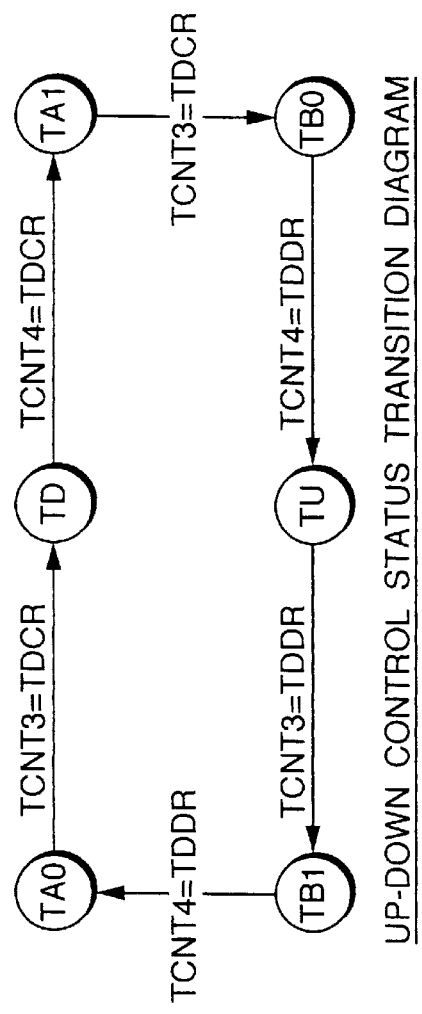
FIG. 29 is a status transition diagram for explaining the operations of the up-down control unit in the timer according to the present invention.
Figure 30:
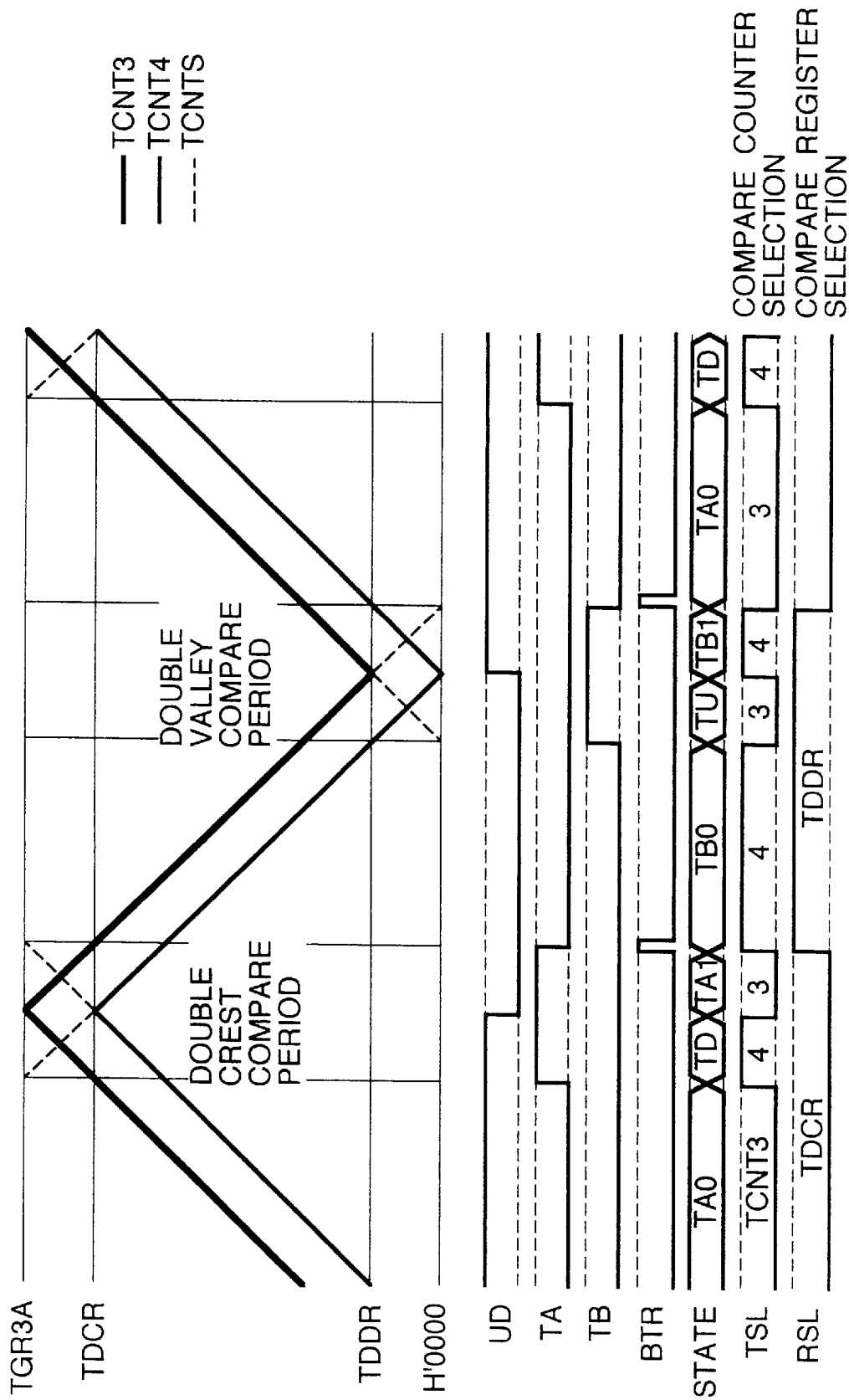
FIG. 30 is a schematic waveform diagram for explaining the operations of the up-down control unit in the timer according to the present invention.

As seen from the schematic waveform diagram of FIG. 30, the up/down control unit generates all the signals in the individual six states which are classified into the six states TA0, TD, TA1, TB0, TU and TB1 by combining the aforementioned individual signals UD, TA and TB. This status transition is shown in FIG. 29.

(1) Operation in State TA0

Simultaneously with the transition to the state TA0, the state TB is reset to release the double comparisons at the valley. In the state TA0, basically, UD=1, TA=0, and TB=0. The awaited event is TCNT3=TDCR to output signals TSL and RSL (TSL=0 and RSL=0) for selecting the TCNT3 and the TDCR. For TCNT3=TDCR, the state TA is set to 1, and the transition to the state TD is made.

(2) Operation in State TD

In the state TD, basically, UD=1, TA=1, and TB=0. The awaited event is TCNT4=TDCR to output signals TSL and RSL (TSL=1 and RSL=0) for selecting the TCNT4 and the TDCR. For TCNT4=TDCR, the state UD is set to 0, and the transition to the state TA1 is made.

(3) Operation in TA1

In the state TA1, basically, UD=0, TA=1 (by the double count at the crest), and TB=0. The awaited event is TCNT3=TDCR to output signals TSL and RSL (TSL=1 and RSL=0) for selecting the TCNT3 and the TDCR. For TCNT3=TDCR, the transition to the state TB0 is made without any operation.

(4) Operation in TB0

Simultaneously with the transition to the state TB0, the state TA is reset to 0. In the state TB0, basically, UD=0, TA=0, and TB=0. The awaited event is TCNT4=TDDR to output signals TSL and RSL (TSL=1 and RSL=1) for selecting the TCNT4 and the TDDR. For TCNT4=TDDR, the state TB is set to 1, and the transition to the state TU is made.

(5) Operation in TU

In the state TU, basically, UD=0, TA=0, and TB=1. The awaited event is TCNT3=TDDR to output signals TSL and RSL (TSL=0 and RSL=1) for selecting the TCNT3 and the TDDR. For TCNT3=TDDR, the state UD is set to 1, and the transition to the state TB1 is made.

(6) Operation in TB1

In the state TB1, basically, UD=1, TA=0 and TB=1. The awaited event is TCNT4=TDDR to output signals TSL and RSL (TSL=1 and RSL=1) for selecting the TCNT4 and the TDDR. For TCNT3=TDDR, the transition to the state TA0 is made without any operation.

Figure 31:
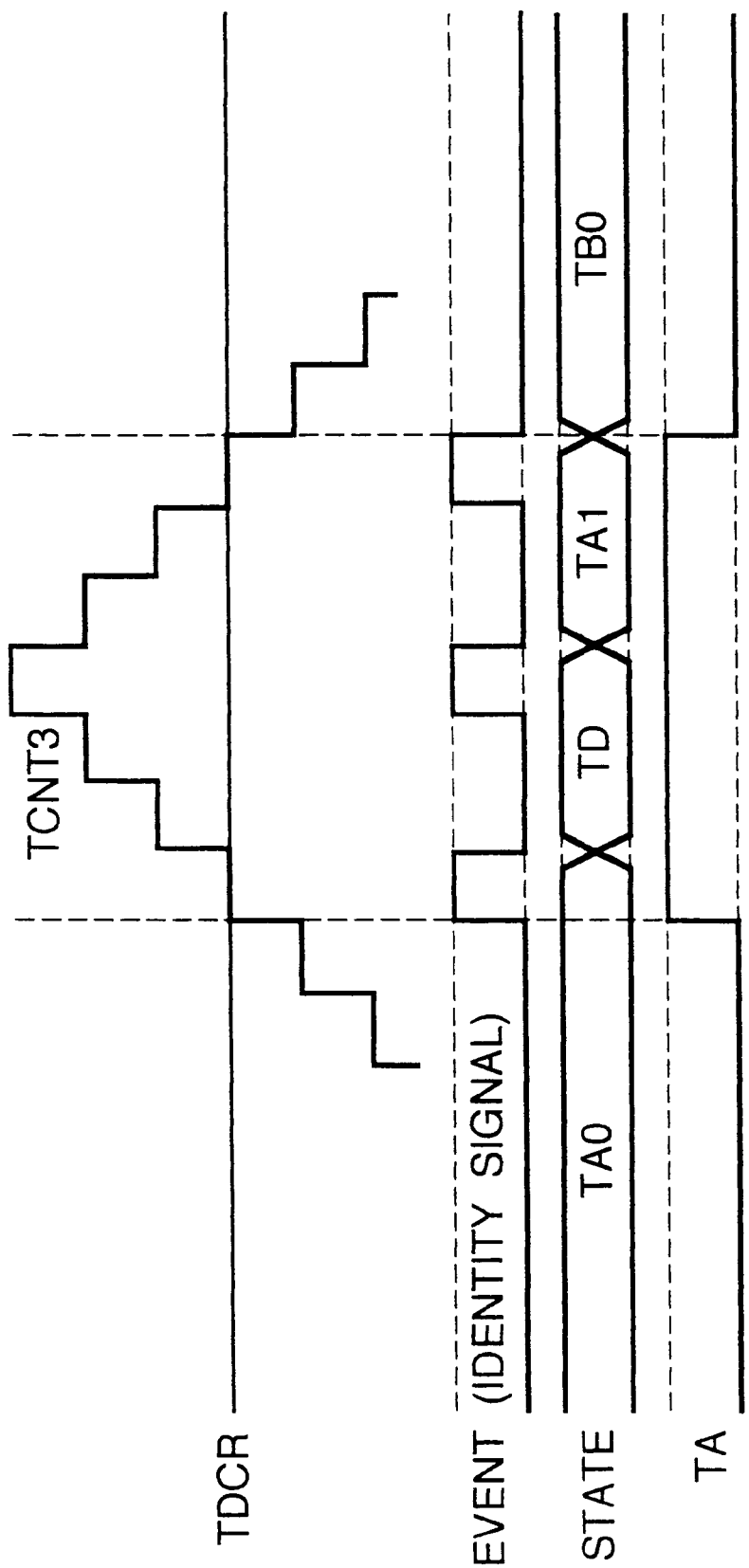
FIG. 31 is a schematic waveform diagram for explaining the difference in setting/resetting TA and TB in the aforementioned up-down control unit.

The difference in operation between the set/reset times of the aforementioned states TA and TB will be supplementarily described with reference to the schematic waveform diagram of FIG. 31. The states TA and TB designate the double compare period signals of the old and new set values. Since the comparison between the new set value and the counter value is started immediately after TCNT3=TDDCR or TCNT4=TDDR, the states TA and TB are set before the states change to the next states, i.e., immediately after the event has occurred. On the other hand, the resetting is performed after the states change to the next states.

Figure 32:
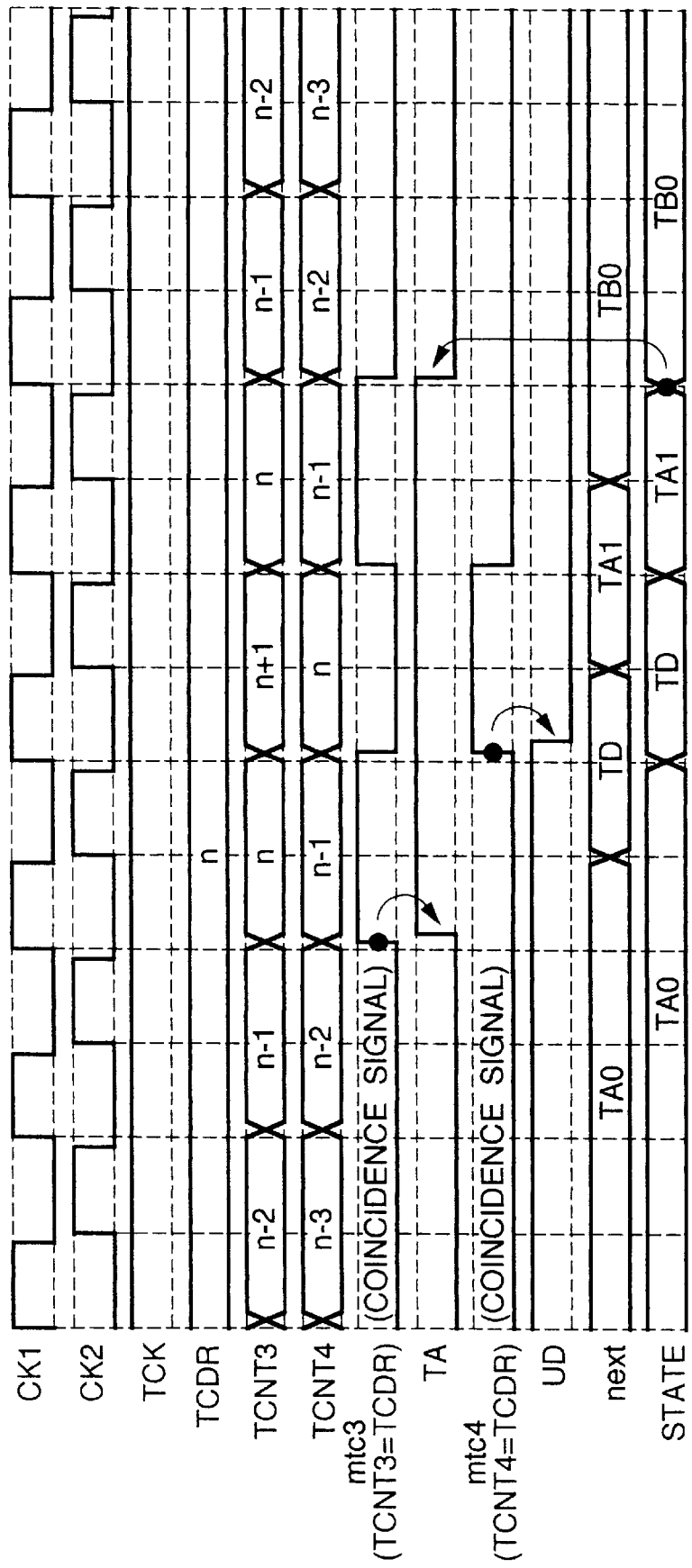
FIG. 32 is a waveform diagram for explaining the switching timings of setting TA and TB and resetting UD in the aforementioned up-down control unit.
Figure 33:
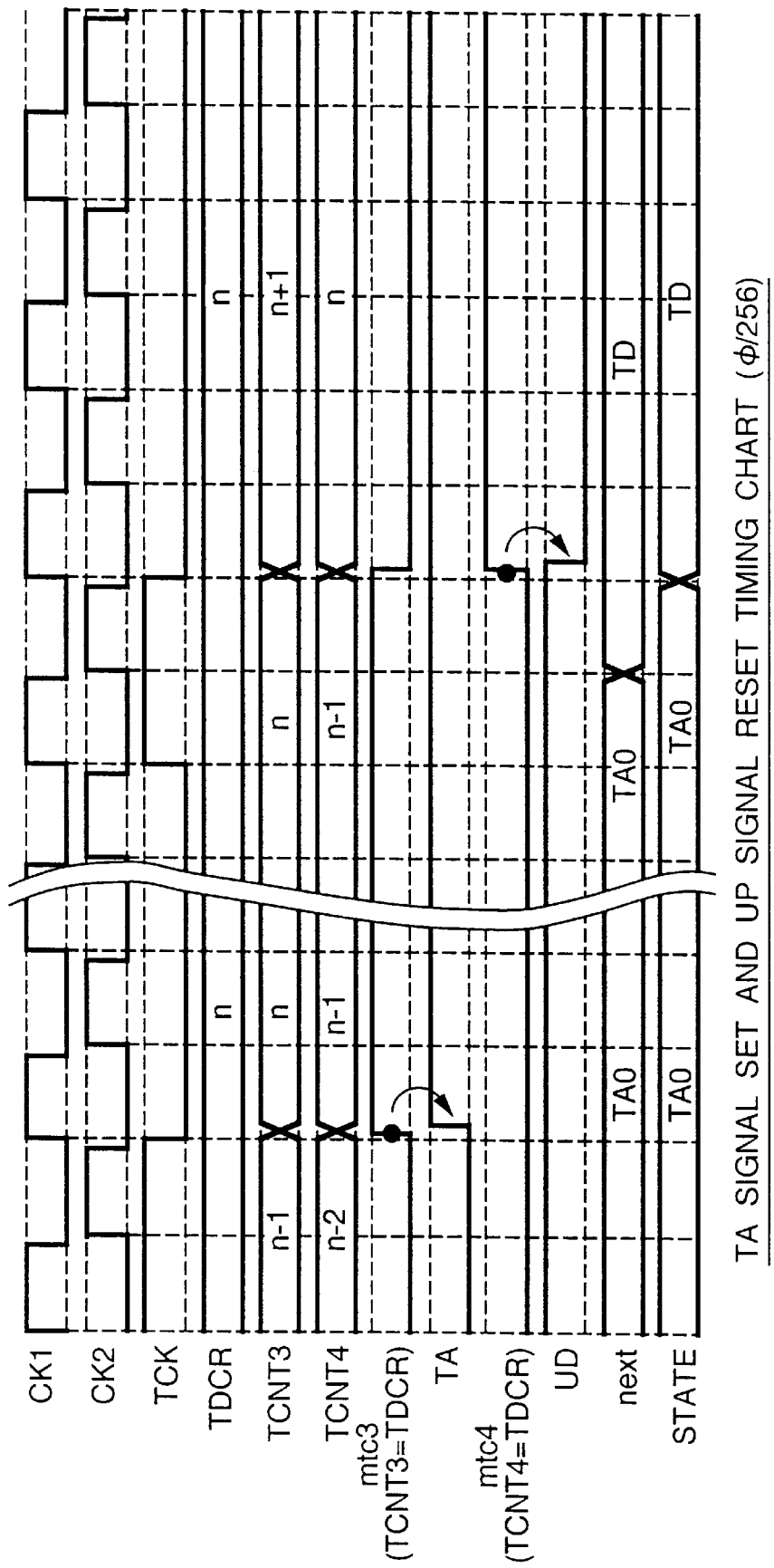
FIG. 33 is a waveform diagram for explaining the switching timings of setting TA and TB and resetting UD in the aforementioned up-down control unit.

FIGS. 32 and 33 are waveform diagrams for explaining the timings of setting the TA and TB and switching the UD. The setting of the TA and TB and the switching of the UD are executed by the state machine not after the transfer to the subsequent state but immediately after occurrence of an event. FIG. 32 shows the case in which the count clock is at the highest rate of φ, and FIG. 33 shows the case in which the count clock is at the lowest rate of φ/256. In these individual cases, the dead time Td is 1, and reference symbols mct3 and mct4 designate internal identity signals. Incidentally, symbols CK1 and CK2 designate the so-called "two-phase no-overlap clocks" generated from the system clock φ. Symbol TCK designates the count-up clock of the counter. The dead time is for the case of H'0001.

From the above, the TA, TB and UD are expressed by the following logical formulas:

$$TA = TA0 * mct3 + TD + TA1 \quad (1);$$

$$TB = TB0 * mct4 + TU + TB1 \quad (2);$$

and $$UD = TA0 + /mct4 * TD + mct3 * TU + TB1 \quad (3).$$

Here, symbol mct3 designates an identity signal with the TCNT3, and symbol mct4 designates an identity signal with the TCNT4. Moreover, symbol "*" designates the logical product, symbol "+" the logical sum, and symbol "/" an over-bar for raising the low level to the active level.

An even in the state transition is detected at the rising edge of CK2*TCK for "next" and CK1*(TCK↑CK2) for "STATE". Here, symbol ↑TCK2 indicate that one cycle is delayed with the rising edge of the CK2.

The buffer transfer signal BTR is a signal for writing a new set value in the period setting register, the old setting register and the new setting register. This signal BTR is enabled to select the buffer transfer at the crest of the counter, the buffer transfer at the valley of the counter and the buffer transfer at the crest/valley of the counter by setting the bits MD0 to MD3 of the timer mode register TMDR. This method for the buffer transfer at both the crest and valley of the counter can be called the "double period rewrite".

Figure 34:
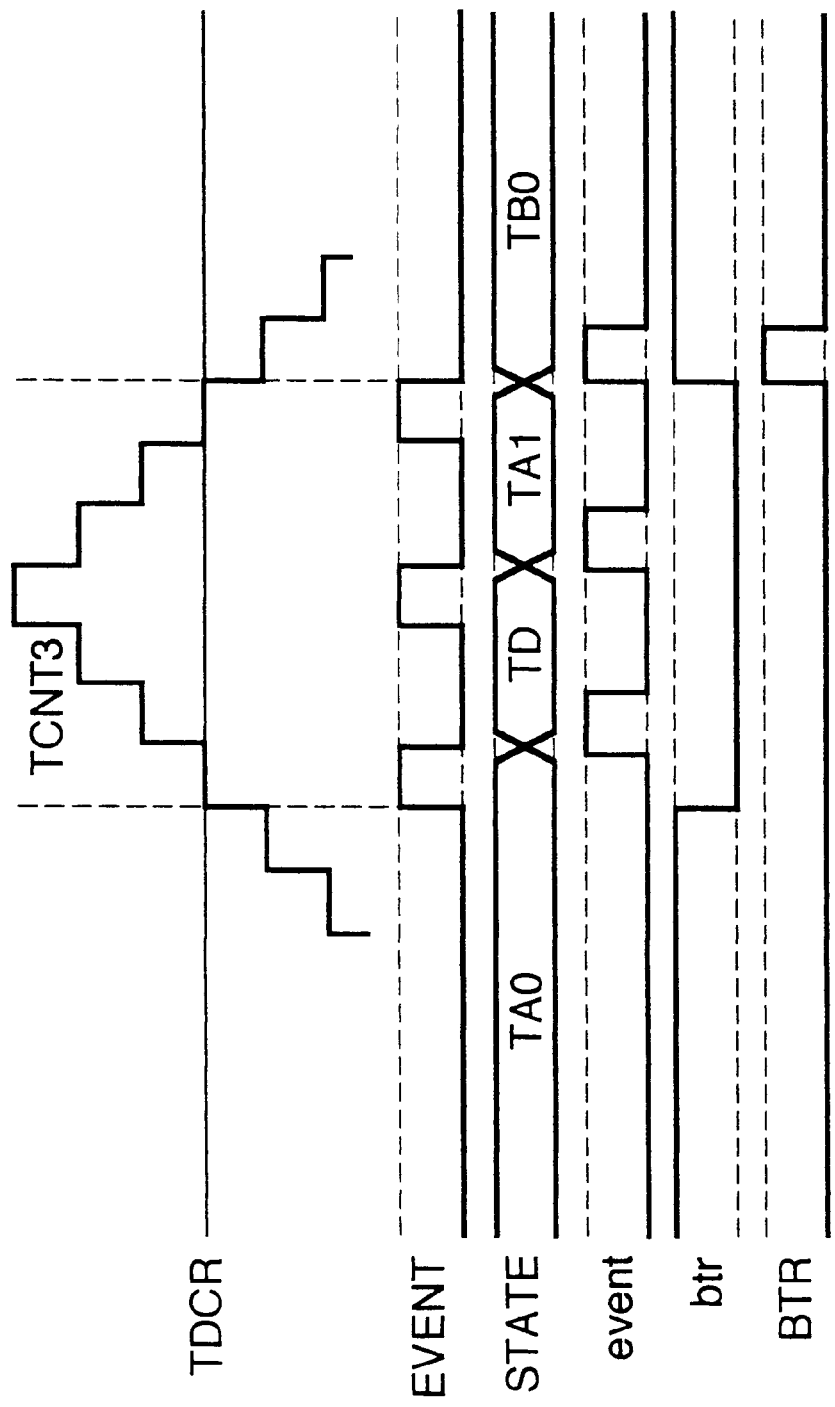
FIG. 34 is a schematic waveform diagram for explaining generation of the buffer transfer signal BTR in the aforementioned up-down control unit.

As shown in the schematic waveform diagram of FIG. 34, one cycle of buffer transfer signal BTR is generated immediately after the end of the double compare period of the crests in the case of the transfer with the crests of the counter, that is, at the time of TB=0. In the case of the transfer with the valleys of the counter, although not shown, the buffer transfer signal BTR is generated at TA=0 doubly at the aforementioned double period rewrite time.

Figure 35:
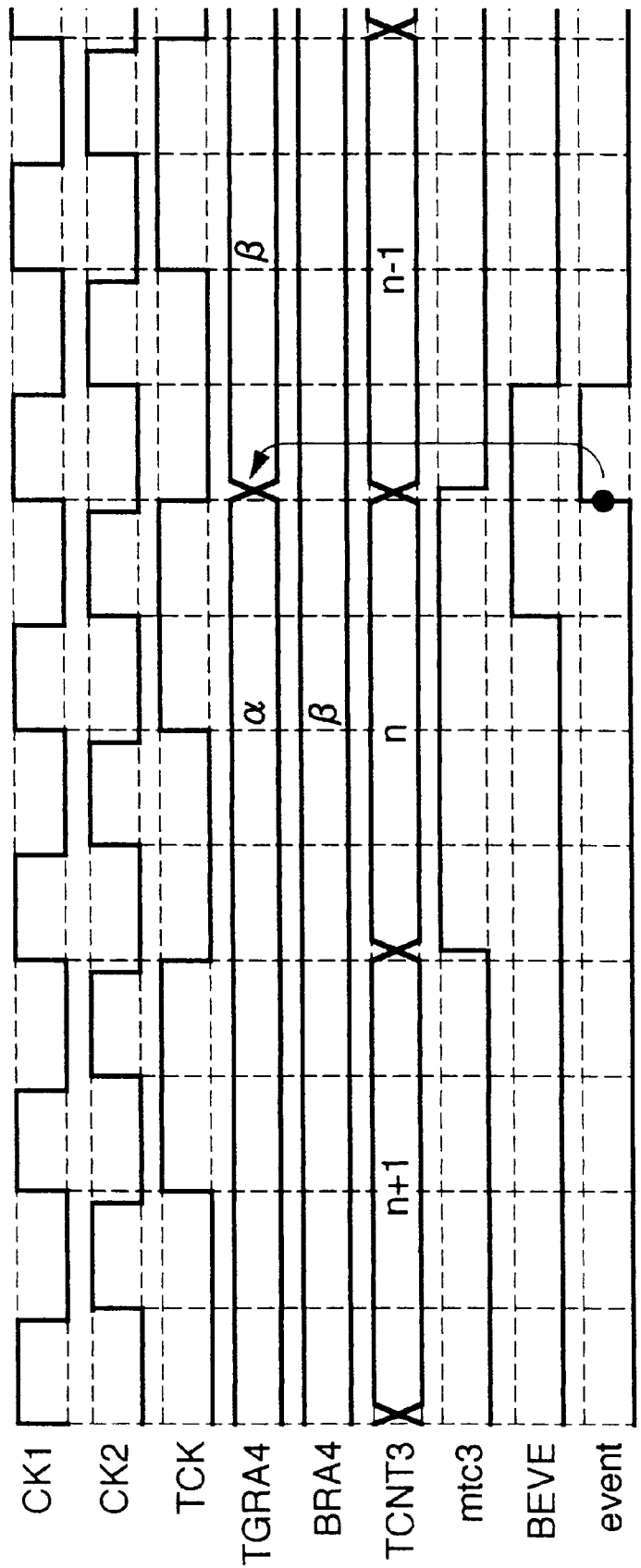
FIG. 35 is a timing chart diagram for generating the buffer transfer signal in the aforementioned up-down control unit.

FIG. 35 is a timing chart for generating the buffer transfer signal. The internal signal, which is delayed by a half cycle from the logical product of the EVENT and the TCK of FIG. 34, is named BEVE, and the logical product of the BEVE and the CK1 is named "event". The TA0 is the STATE indicating the start of the double compare period at the crest, and the TB0 is the STATE indicating the start of the double compare period at the valley. The condition for the TMDR is referred to simultaneously with the entrance to the STATE. If the buffer transfer at the valley is selected, the "btr" is generated at a predetermined timing. In other words, the TA0 is the STATE indicating the end of the double compare period at the valley, and the TB0 is the STATE indicating the end of the double compare period at the crest. The aforementioned "btr" is reset to 0 irrespective of the condition for the TMDR if an event occurs in this STATE. The buffer transfer signal BTR is generated by the logic product of the internal signals "event" and "btr".

Figure 36:
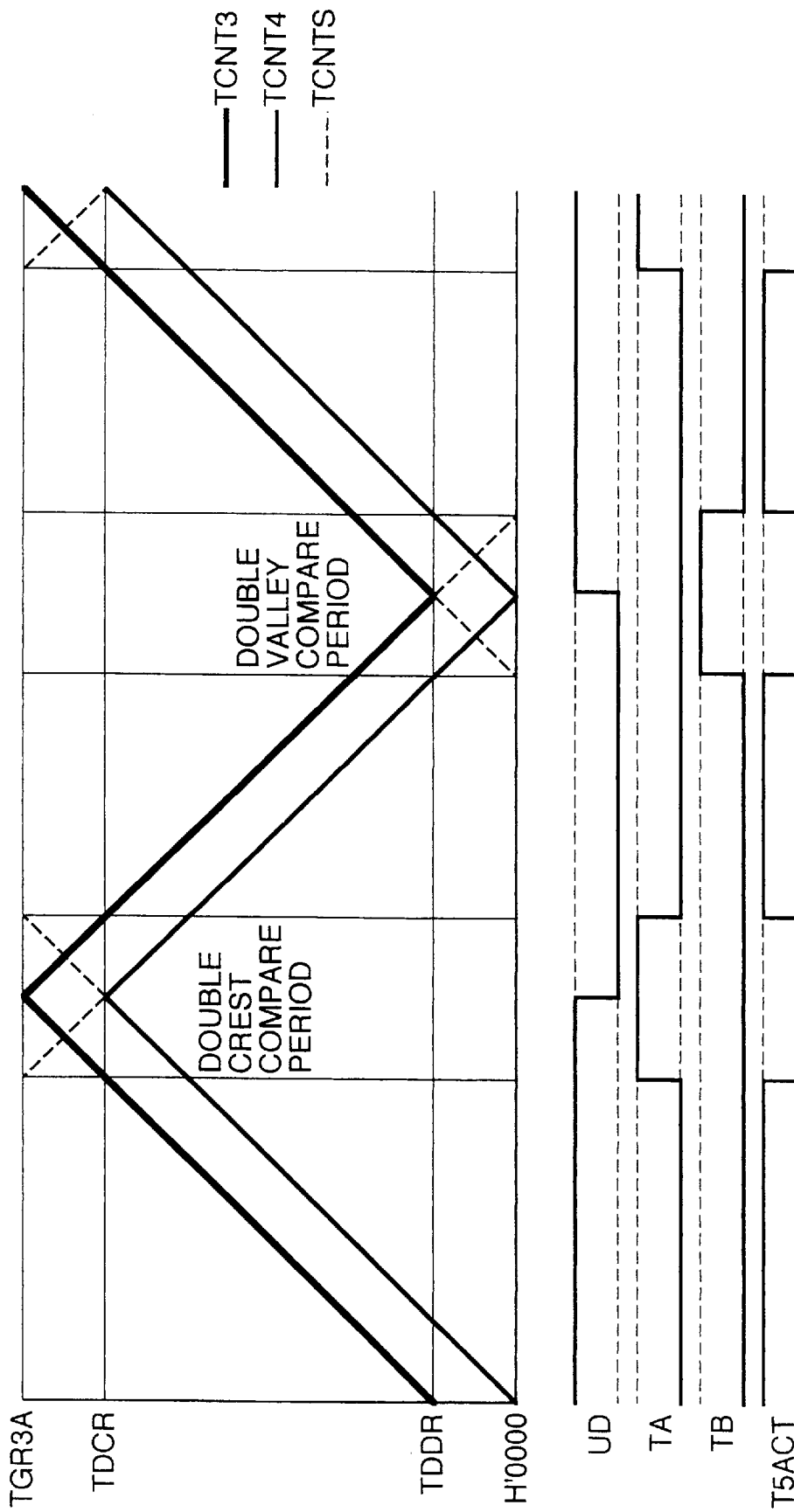
FIG. 36 is a schematic waveform diagram for supplementarily explaining generation of a sub-counter relation signal according to the present invention.

FIG. 36 is a schematic waveform diagram for supplementarily explaining the generation of the sub-counter relation signal. The sub-counter TCNTS is a counter which is active only for the double compare period of the crest and valley. Therefore, the sub-counter is made to perform the writing action with the load signal and the counting action for the other periods. Thus, the load signal is generated by negating the logical sum of the TA and TB T5ACT=/(TA +TB).

The re-load value select signal of the sub-counter is generated in the following manner. The initial value at the time of starting the count operation of the sub-counter is made different between the double compare periods of the crest and the valley and is stored in the re-load register 1 and the load register 2. This makes it necessary to select one of the two registers before the write of the sub-counter. For the re-load value select signal, the UD (or its inverted signal) is used.

Figure 37:
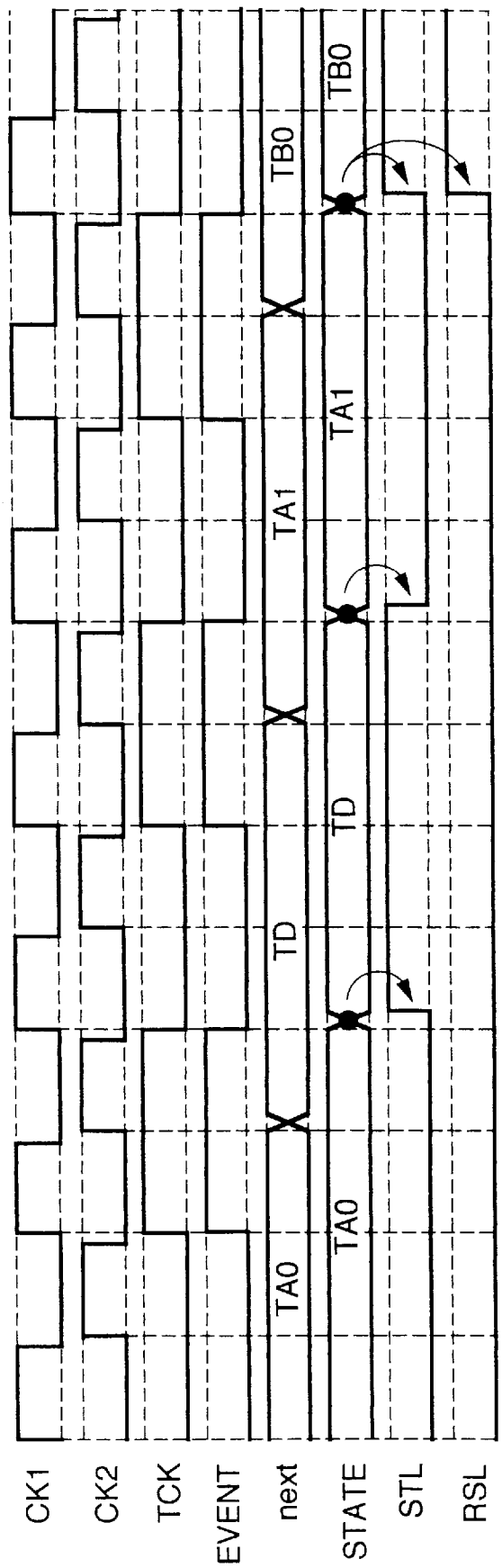
FIG. 37 is a schematic waveform diagram for explaining generation of a counter/register select signal in a counter according to the present invention.

FIG. 37 is a schematic waveform diagram for explaining the generation of the counter/register select signals. The counter select signal TDL and the register select signal RSL are set/reset according to the transition of the status. Hence, these signals are set/reset in synchronism with the CK1 or the transition timing of the STATE. The counter select signal TSL and the register select signal RSL are expressed by the following logical formulas:

$$TSL=TD+TB0+TB1 \qquad (4);$$

and $$RSL=TB0+TU+TB1 \qquad (5).$$

The 1/PWM period output signal ½ CYC is generated in the following manner. In the complementary PWM mode, each time the compare match, i.e., TGR3A=TCNT3, between the period set register and the counter TCNT3 occurs or each time the compare match, i.e., TCNT4=0, between the re-load value set register (H'0000) and the counter TCNT4 occurs, the signal synchronized with the ½ PWM period for repeating the toggle actions can be outputted from the TIOC3A, and this output is named the ½ CYC. When the complementary PWM mode is setup, ½ CYC=0. After the settings relating to the complementary PWM mode and after the STR3 and STR4 bits have been set to 1 by the timer start register, the output is ½CYC=1 by the first count clock, and the toggle operations described above are repeated after this.

Figure 38:
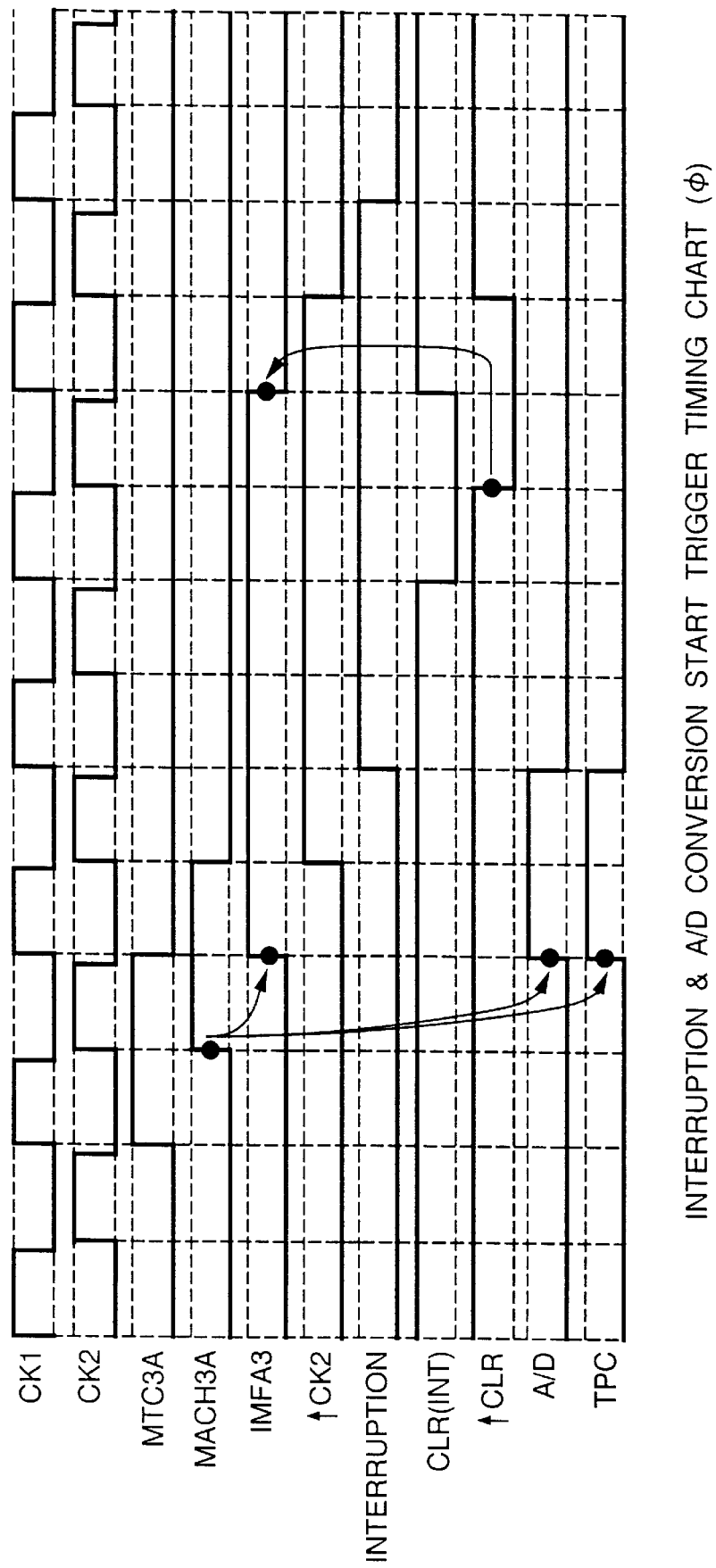
FIG. 38 is a timing chart of an interruption & A/D conversion start trigger according to the present invention.

FIG. 38 is a timing chart of the A/D conversion start trigger according to the present invention. In the complementary PWM mode, it is possible to generate the interruption by the compare match between the period setting register and the counter TCNT3, i.e., TGR3A=TCNT3 and the underflow of the counter, TCNT4, i.e., the TCNT4=0. This interruption is enabled by setting the timer interrupt enable register TIER.

In the complementary PWM mode, it is possible to generate the A/D conversion start trigger by the compare match between the period setting register and the counter TCNT3, i.e., TGR3A=TCNT3 and the underflow of the counter TCNT4, i.e., the TCNT4=0. This A/D conversion start trigger is enabled by setting the TTEG bit of the timer interrupt enable register TIER.

The comparator performs the comparison at any time so that it outputs an identity signal even if the selected counter and register are in the status of the initial value. Since this identity signal is used as the EVENT signal, the up/down control unit does not properly operate if the status is changed by the identity signal of the initial status. Therefore, the identity signal has to be activated only when the STR3 and STR4 bits of the timer start registers TSTR are 1 and count operation is performed. Specifically, the EVENT signal is generated by taking the logical product between the internal identity signal and the start bit, as expressed by the following formula (6):

$$EVENT=STR3*mtc3+STR4*mtc4 \qquad (6).$$

Figure 39:
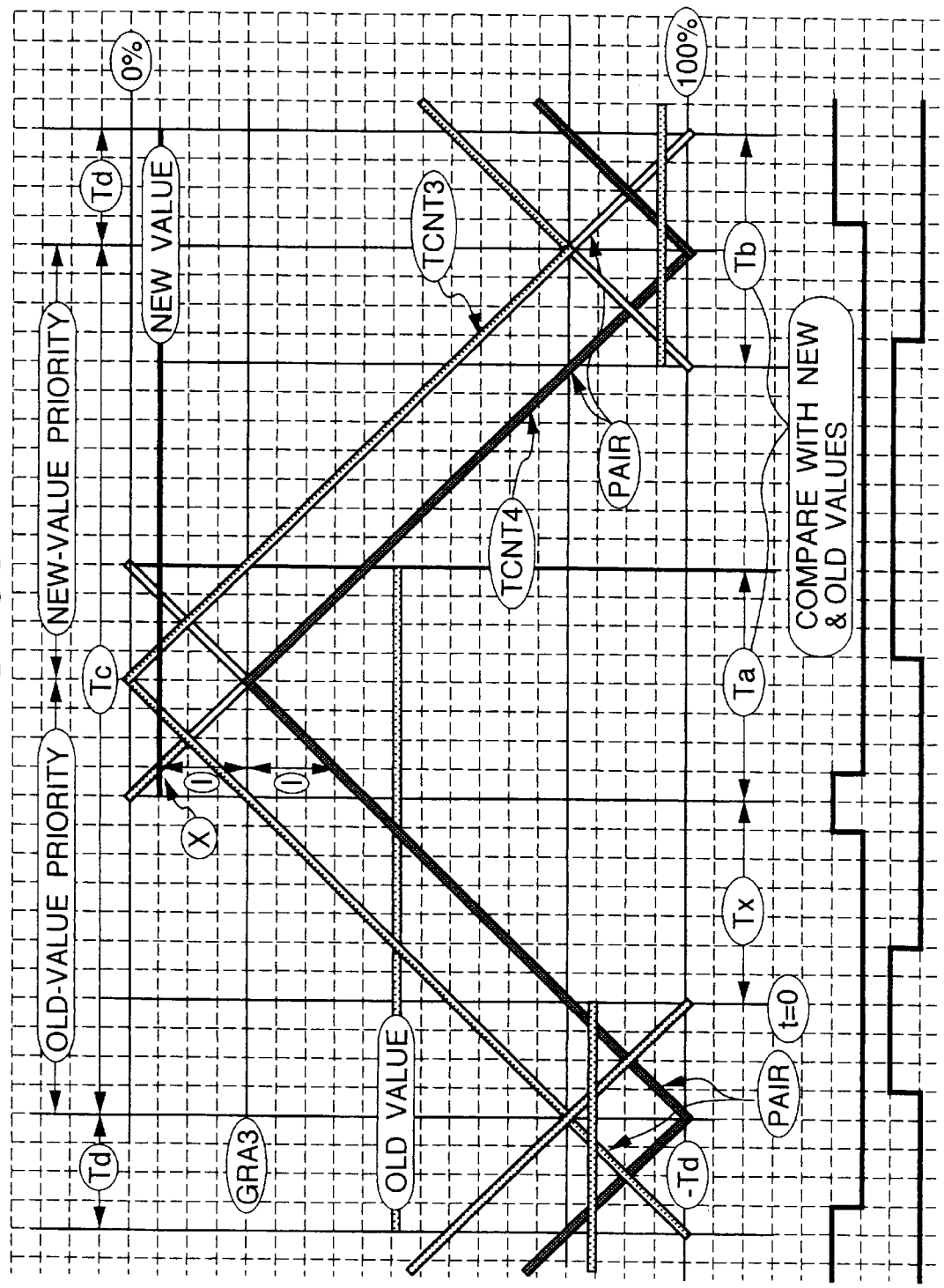
FIG. 39 is a diagram for explaining a complementary PWM control according to the present invention.

FIG. 39 is a construction diagram for explaining the aforementioned complementary PWM control.

According to the basic concept of the complementary PWM control of the present invention, two parallel lines in an identical count direction are treated as a pair for ensuring the dead time so that the output waveform is generated by not the toggle type but the set/reset type.

(1) At the DOWN count time, the positive phase is turned on with the matching between the set value and the TCNT3, and the negative phase is turned off with the matching between the set value and the TCNT4.

(2) At the UP count time, the positive phase is turned off with the matching between the set value and the TCNT4, and the negative phase is turned on with the matching between the set value and the TCNT3.

Here, the value of point x can be determined from the following formulas (7) to (10) if the difference between the TCNT4 and the TGR3A is 1:

$$1 = TGR3A - TCNT4; \qquad (7)$$

$$\begin{aligned} x &= TGR3A + 1 \\ &= 2*TGR3A - TCNT4; \end{aligned} \qquad (8)$$

$$\begin{aligned} y &= x \\ &= 2*TGR3A - TCNT4; \end{aligned} \qquad (9)$$

and $$TCNT4 = 2*TGR3a - y. \qquad (10)$$

By these formulas, therefore, the re-calculations are not executed at the time of updating the counters, but the calculations are executed only when the set value y is rewritten, and the complementary PWM output can be made by storing the calculation results in the registers. Similar processings for the valley portion are made. This calculations with the constants are executed by utilizing the comparator which is not busy for the period Tx requiring no comparison between the new and old values.

As in the timer described in the foregoing "H/3003 Hardware Manual" issued by HITACHI, March 1993, for example, the identity is detected in the prior art by determining the missing portion, counted by the sub-counter TCNTS, and by comparing the counted value with the new and old values for the periods of not only the one cycle Tc but also the 2*Td because the one cycle is basically the period of -Td-(Tc/2) to +Td+(Tc/2).

Figure 40:
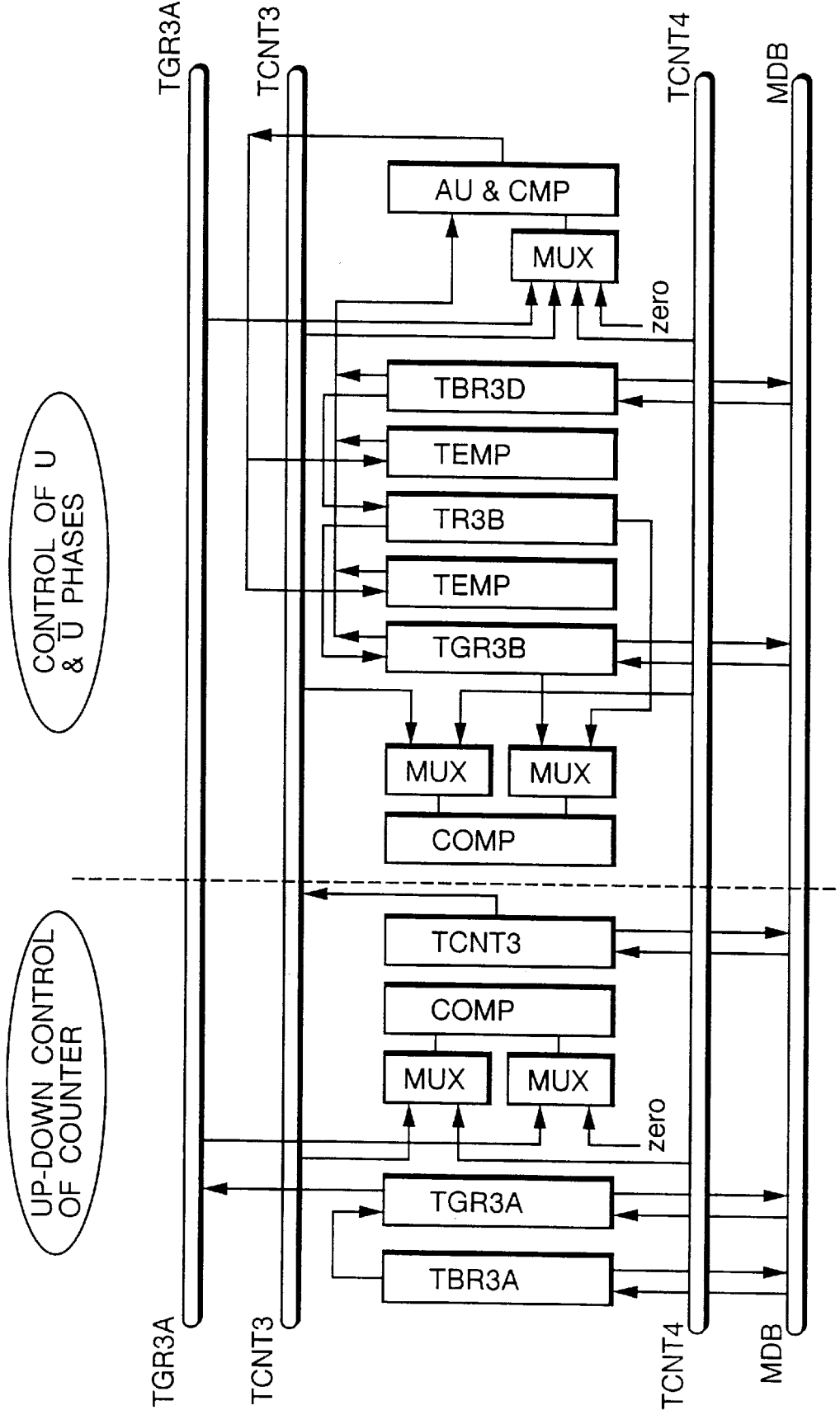
FIG. 40 is a block diagram showing another embodiment of the up-down control unit according to the present invention.

FIG. 40 is a block diagram of the up/down control unit corresponding to the aforementioned calculation system. For the control by this calculation system, the following hardware source is newly required in addition to the timer of the prior art.

(1) Add/Subtract Function Comparator AU&CMP

This add/subtract function comparator AU&CMP is required for comparing the new and old set values with the individual counted values for the periods Ta and Tb and for calculating the value of the portion having no counter.

(2) Temporary Register TEMP

In order to make comparisons with the individual counter values with the new and old values, the user register rewrite disable period occurs for the periods Ta and Tb. In order to avoid this rewrite disable period, there is provided the temporary register TEMP for storing the values of the buffer registers temporarily.

(3) General Registers TGR# and TBR#

These general registers are provided for temporarily storing the calculated values of the TGR and the TBR to be compared for the aforementioned periods Ta and Tb.

(4) Selector MUX

This selector selects the individual register values suitably for executing the comparisons and the calculations for the aforementioned periods Ta and Tb.

The aforementioned system shown in FIG. 40 is required to have the arithmetic unit and the temporary registers for the calculations. As described with reference to FIGS. 2 to 38, therefore, the complementary PWM can be realized without any calculation to reduce the logical scale. FIG. 41 is a diagram specifically showing a portion of the channels 3 and 4 of FIG. 3. Specifically, the dedicated counter TCNTS for counting the V-shaped portions of the crest and valley is provided, as shown in the block diagram of FIG. 41. By using this counter TCNTS, the arithmetic unit and the temporary register of FIG. 40 can be eliminated. Moreover, this counter TCNTS may be used as another channel. The data from the central processing unit CPU are stored in the register TBR3D through the control logic. The data thus stored in the register TBR3D are transferred to and stored in the registers TR3B and TGR3B in accordance with control signals C1 and C2 from the control logic. The comparator COMP0 compares the count value of the sub-counter TCNTS and the data of one of the registers TR3B and TGR3B. Moreover, the comparator COMP1 compares the count value of one of the counters TCNT3 and TCNT4 and the data of one of the registers TBR3D and TGR3B. On the basis of the comparison results sent from the comparators COMP0 and COMP1, the control logic generates the output waveforms of the positive and negative phases, as shown in FIG. 21, and output them from the input/output port IOP7.

As described above, the complementary PWM mode according to the present invention is required to have two up-counts and two down-counts which have a constant time (i.e., dead time) interval. The method of realizing these counter operations specifically can be modified in various manners. For example, the construction can also be made of the two up-counters and the two down-counters. Alternatively, the construction can be made of the three up/down counters, as in the foregoing embodiment, or can be made by calculations.

The lower limit of the operation range of the counter does not need to be set to 0. For example, the upper and lower symmetric axis of duty of 50% may be set to 0. Moreover, the construction of the comparator can also be modified in various manners. Since one compare register is compared with all the counters, the number of comparators may be one corresponding to the counters. At the time of setting the initial time, it is advisable to write the dead time in the TCNT3 and H'0000 in the TCNT4. The TDDR does not need to be independently set if the value of the TCNT3 is transferred to the TDDR at the standby time (CST=0).

Figure 42:
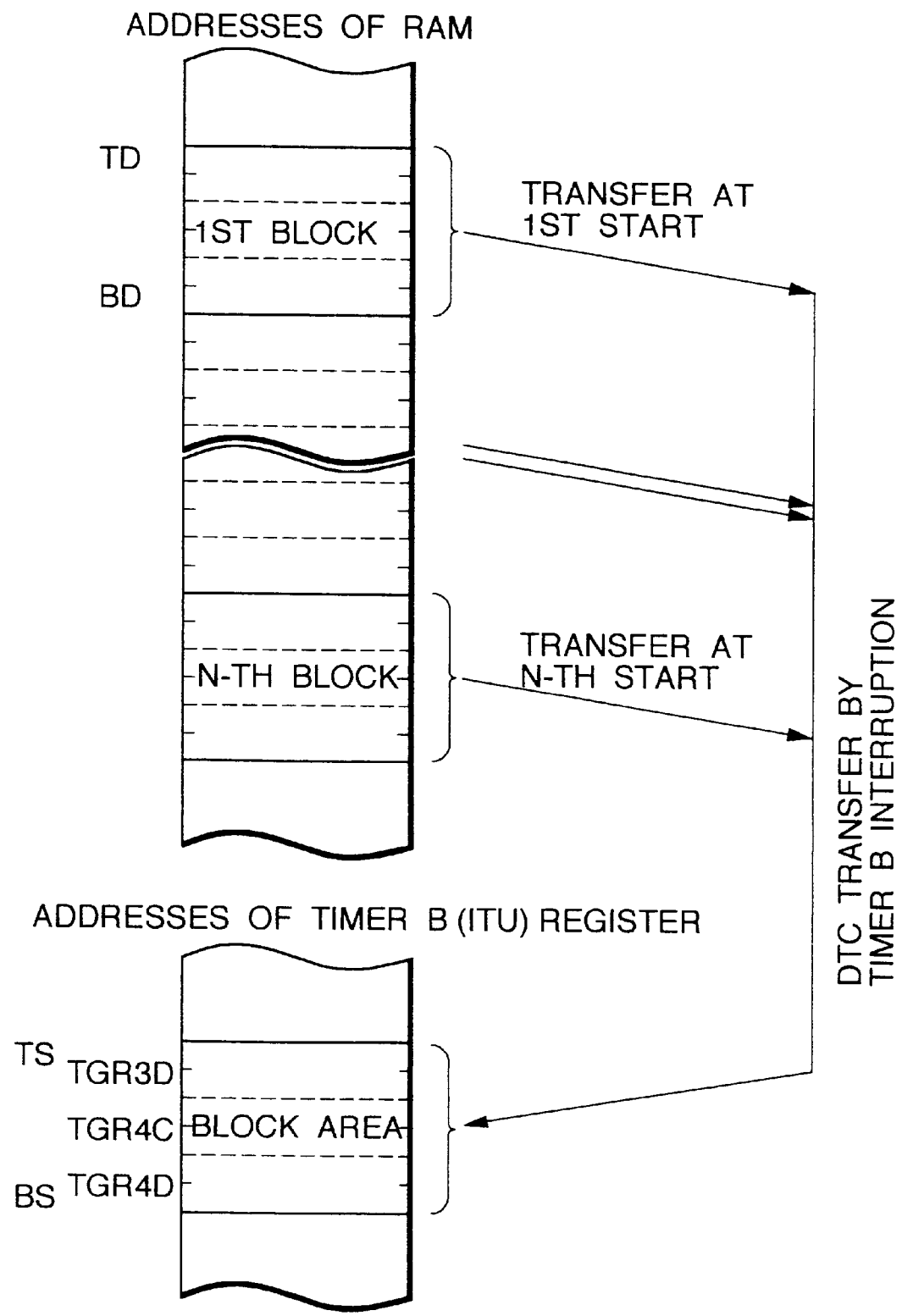
FIG. 42 is an address map diagram for explaining the complementary PWM mode of the timer B according to the present invention and one example of the operation of a data transfer controller DTC.
Figure 43:
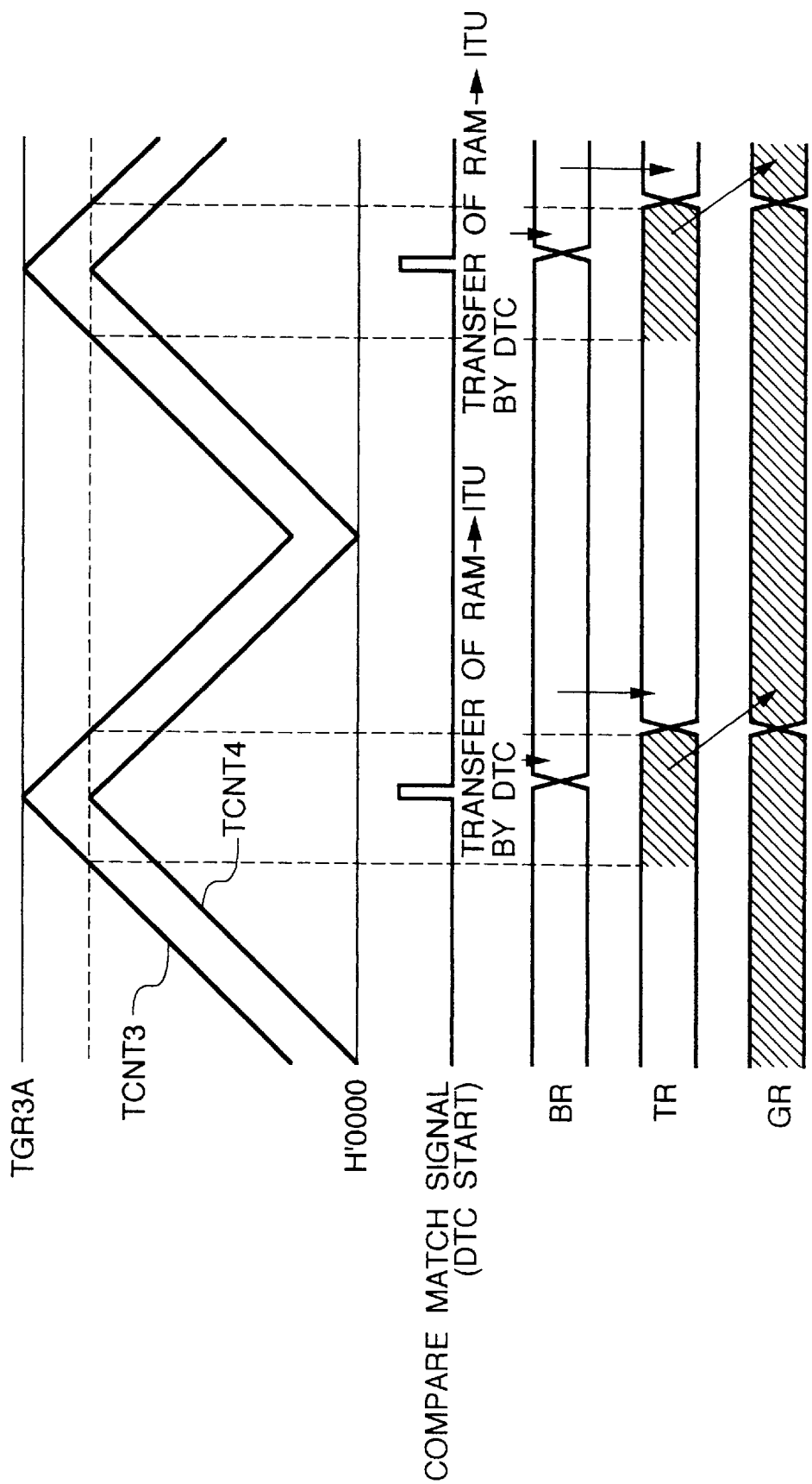
FIG. 43 is an address map diagram for explaining the complementary PWM mode of the timer B according to the present invention and another example of the operation of a data transfer controller DTC.

FIG. 42 is an address map diagram for explaining one example of the complementary PWM mode according to the present invention and the operations of the data transfer controller (data transfer unit) DTC, and FIG. 43 is an operation timing chart of the example.

In the case of the complementary PWM mode 1, the data transfer controller DTC is started by the interruption of the compare match TGR3A (crest) of the timer B. By this DTC, the compare value on the RAM is transferred to the buffer registers (TGR3D, TGR4C and TGR4D). These registers are arranged so that the areas thereof are continuous with each other. This data transfer uses the so-called "block transfer mode". In other words, three words are transferred in the aforementioned case by the single start by designating the transfer source address register, the transfer destination address register, the block size and the number of transfers. These three words (TGR3D, TGR4C and TGR4D) are a series of addresses, as described above, so that they can be serially written by the aforementioned DTC. The block transfer mode is disclosed in the aforementioned "H8/3003 Hardware Manual" issued by HITACHI, June 1993, or in Japanese Patent Application No. 137954/1992.

When the interruption of the compare match TGR3A occurs, as described above, the data transfer controller DTC is started. This DTC transfers the block from the aforementioned RAM to the buffer registers. The transfer from the buffer registers to the TR is not effected in the crest dead time region, as described before. When the dead time region is passed, the content latched in the TR is transferred to the TGR, and the content of the BR is transferred to the TR. The hatched portions in FIG. 43 indicate the periods to be used for the compare. The case of the complementary PWM mode 2 is similar to that of FIGS. 42 and 43, with the exception that the DTC is started by the underflow (TCNT4=0) interruption of the timer. Moreover, the reset synchronization PWM mode is also schematically similar to that of FIGS. 42 and 43.

Figure 44:
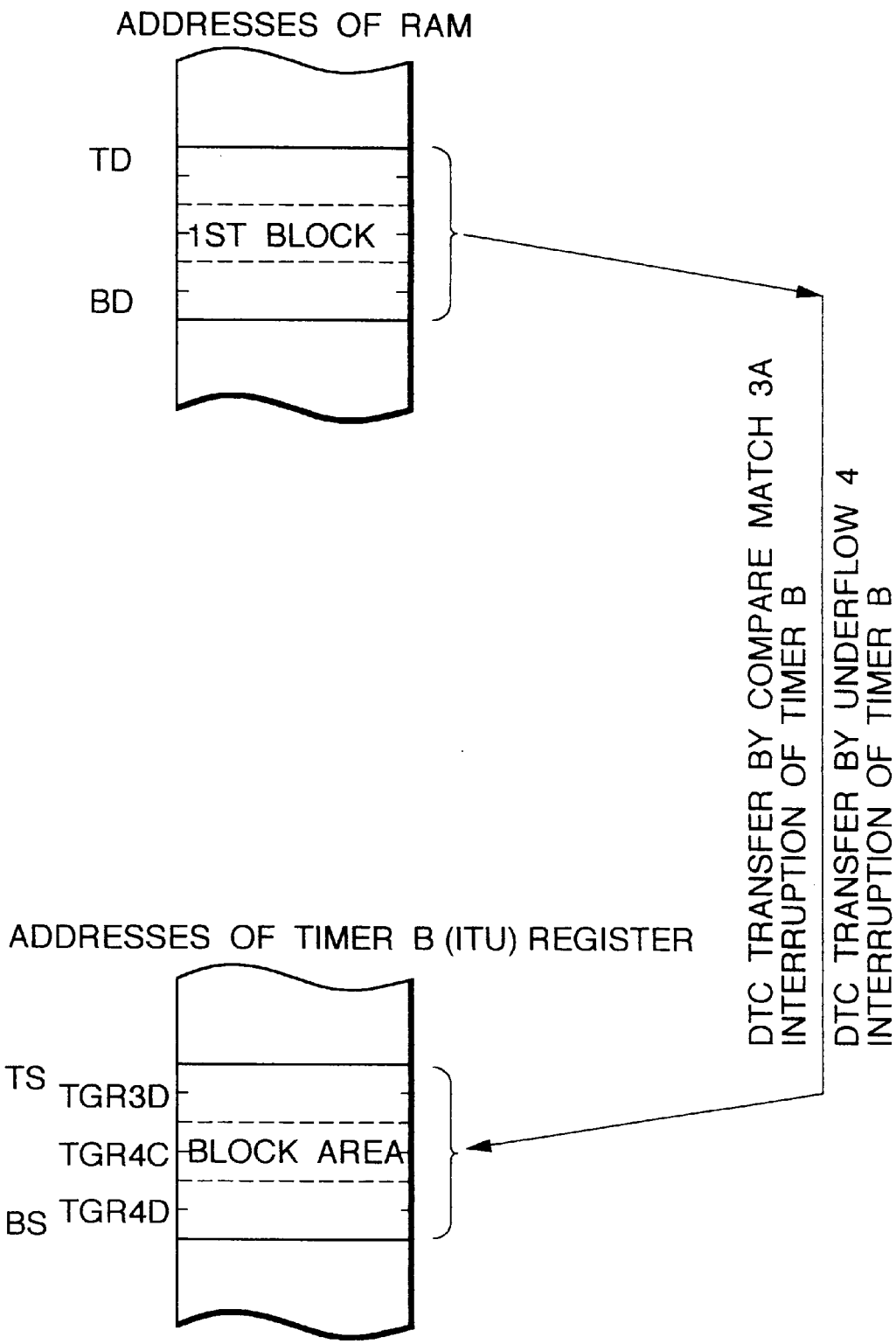
FIG. 44 is an address map diagram for explaining the complementary PWM mode of the timer B according to the present invention and another example of the operation of a data transfer controller DTC.

FIG. 44 is an address map diagram for explaining another example of the complementary PWM mode of the timer B and the operations of the data transfer controller DTC. When a motor is driven, the compare value may be set while the driven state of the motor is being monitored. In this case, the compare value is not set in advance in the RAM, as shown in FIG. 42. The latest compare value is stored in a predetermined RAM so that it is transferred at each time from the same RAM address to the buffer register of the ITU by the aforementioned DTC. In this case, the transfer counter of the DTC is set to 1. If an interruption occurs, the compare value of one block in the RAM is transferred. At the instant when this data transfer ends, the central processing unit CPU is requested to interrupt so that preparation for the subsequent compare value and reset for the registers of the DTC are performed.

In the complementary PWM mode 3, when the data are to be updated at the crest/valley, it is convenient to make common the leading address (or exceptional processing vector) of the exceptional processing routine by the interruptions of the compare match TCNT3=TGR3A (crest) and the underflow TCNT4=0 (valley) of the timer. The central processing unit CPU does not need to decide whether or not the timer counters TCNT3 and TCNT4 are in the up-count state or in the down-count state, that is, whether the data are updated at the crest or at the valley. What is needed is to write the latest compare value at a predetermined address in the RAM. The data can be rewritten (double period rewrite) at the crest/valley to improve the control accuracy.

Figure 45:
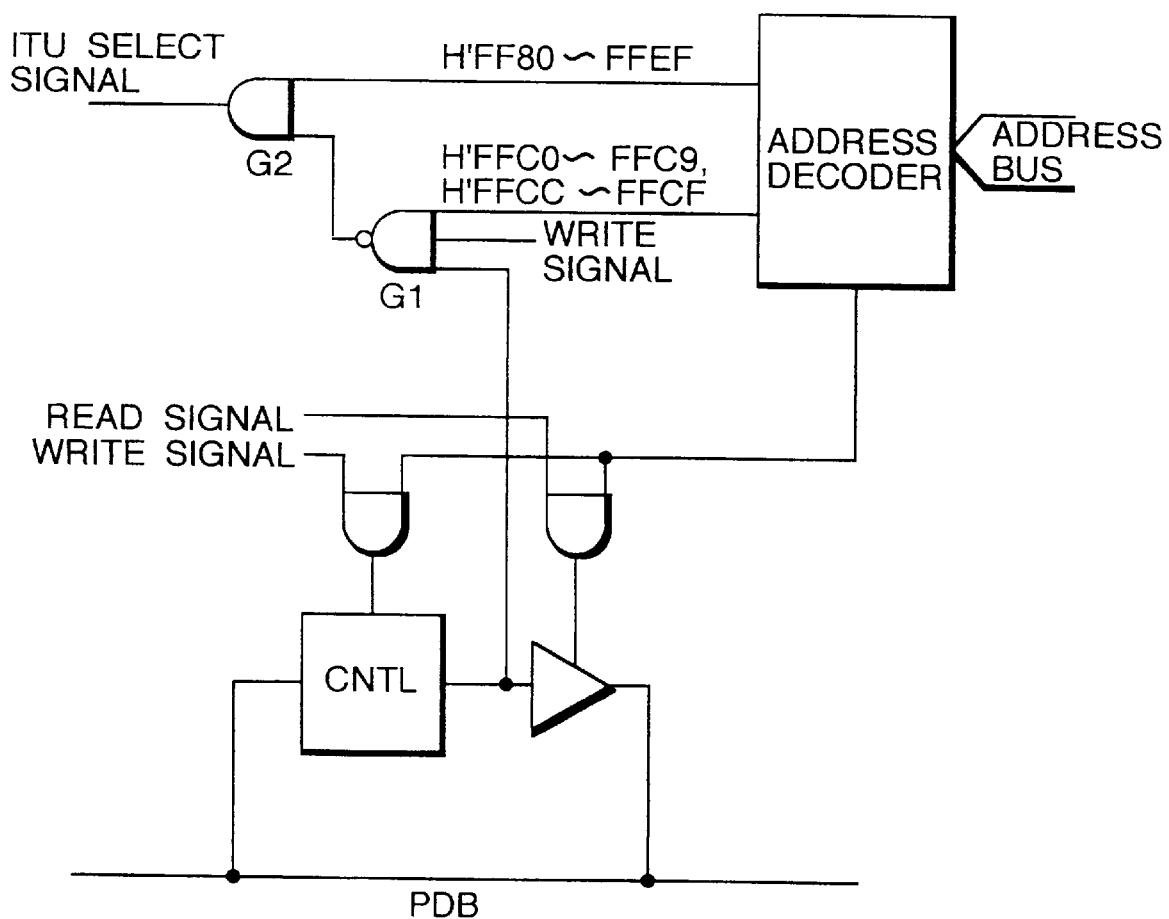
FIG. 45 is a block diagram showing one embodiment of a read/write control circuit of the timer B according to the present invention.

FIG. 45 is a block diagram of one embodiment of the read/write control circuit of the timer B (ITU). A CNTL bit is provided as a bit for disabling the rewrite of registers necessary only for the initial setting. This CNTL bit is set in the rewrite enable state, when cleared to 0, and in the rewrite disable state when set to 1. The rewrite disable registers include TCR3, TCR4, TIOR3H, TIOR3L, TIOR4H, TIOR4L, TIER3, TIER4, TOER, TOCR, TOSR and TGCR. The addresses are arranged at B'FFC0 to B'FFC9 and at B'FFCC to B'FFCF. The TSR is excluded. The timer is provided in its entirety at addresses B'EF80 to B'FFEF.

The addresses are detected by the address decoder circuit. By this address decoder, the signal having detected the addresses B'FFC0 to B'FFCF is inputted to a NAND gate G1. The other input of this NAND gate G1 is the CNTL bit and the write signal. The inversion of the output of the NAND gate G1 is inputted to an AND gate G2. The output of this AND gate G2 is the select signal of the timer B (ITU). Specifically, when the addresses B'FFC0 to B'FFC9 and B'FFCC to B'FFCF are selected and when the CNTL bit is set to 1 and in the write operation, the NAND gate G1 has the output 0, and the AND gate G2 also has the output 0 level so that the selection of the ITU is disabled. other words, the write operation of the ITU is disabled. Under the other conditions, the NAND gate G1 has the output 1, and the ITU is selected to effect the read/write operations when the addresses B'FF80 to B'FFEF are selected. Erroneous operation due to erroneous write can be suppressed by disabling the write operation of the control registers which require only the initial setting, as described above.

Figure 46:
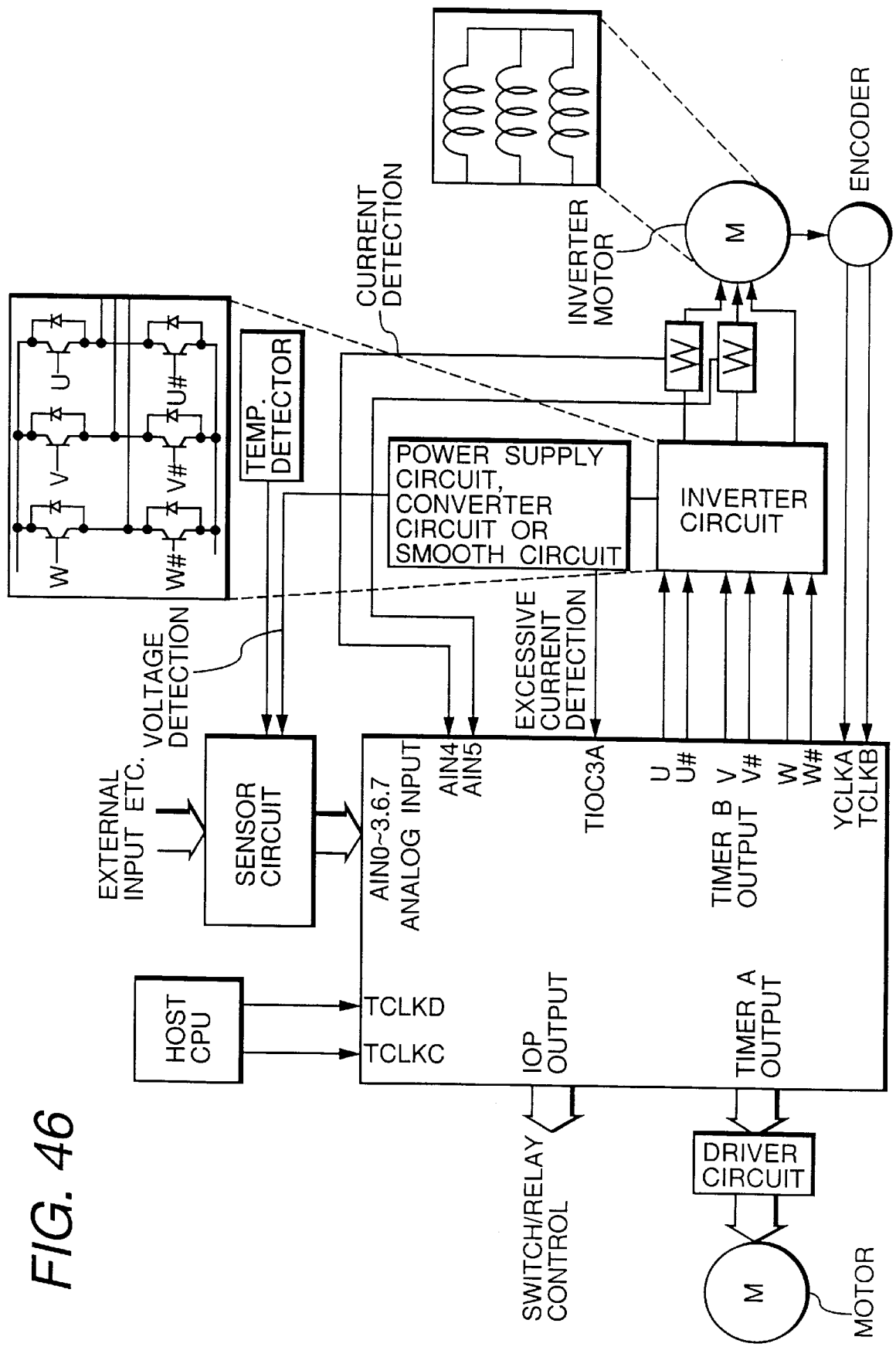
FIG. 46 is a schematic block diagram showing one embodiment of a control system using a single-chip microcomputer to which the present invention is applied.

FIG. 46 is a schematic block diagram of one embodiment of a control system using a single-chip microcomputer according to the present invention. This embodiment is directed to the control of a motor such as an AC induction servomotor. This motor is driven through a buffer circuit such as an inverter circuit by using the complementary three-phase PWM outputs (TIOC3B[U], TIOC3D[U#], TIOC4A[V], TIOC4C[V#], TIOC4B[W] and TIOC4D [W#]) of the timer B (ITU). The buffer circuit can be connected with the front stage of the inverter circuit. The output polarity can be selected according to the number of stages of the buffer circuit.

These positive/negative phase outputs are inputted to the gate of the series connected transistors of the inverter circuit. Since the dead time can be inserted into the positive/ negative phase change point of the complementary three-phase PWM output by the 16-bit timer, as described above, the series connected transistors of the inverter circuit are simultaneously turned on to generate no undesired through current. Moreover, since the time period for which both the positive/negative phases are off is less than two times of the dead time, the series connected transistors of the inverter circuit are simultaneously turned off to establish the disable state for an undesired long time period.

The output of this inverter circuit drives the motor. When the output of the inverter circuit is fed to the inside of the motor, e.g., to the "Y-connected (or star-connected)" stator winding to set the two outputs to the high level and one output to the low level, two thirds of the power supply voltage are generated by resistance division. Likewise, when the one output is set to the high level whereas the two outputs are set to the low level, one third of the power supply voltage is generated by resistance division. The output voltage can be changed by PWM-controlling the periods of that high level. The output, which is made to approximate the desired sinusoidal signal by the pulse signal, can be generated by using the frequency of the counter in the complementary PWM mode of the timer B (ITU) as the carrier wave. The width of the high level of the pulse is made to correspond to the width of the desired sinusoidal signal or the like.

The inverter circuit is supplied with the voltage from the power source circuit, the converter circuit or the smoothing circuit. These power source circuit, converter circuit and smoothing circuit may be partially or wholly integrated with the inverter circuit. When this output current is detected to exceed the desired value, this overcurrent detection signal is inputted as a cutoff input to the TIOC3A. This overcurrent is detected by clearing the XTGD bit of the TOCR to 0. When the cutoff input is received, the contents designated by the OS4D, OS4C, OS3D, OS4B, OS4A and OS3B bits of the TOSR can be outputted individually as W#, V#, U#, W, V and U to stop the inverter motor. In addition to this hardware-like output stop, the aforementioned overcurrent detection signal may be inputted to the interrupt input MNI if a software processing is necessary. Alternatively, the input capture TGR3A interrupt may be used. The output can be cut off by using the cutoff input function for a shorter time period than by fixing the output value by the software processing of the central processing unit CPU. Moreover, a similar processing can be effected by detecting a drop in the voltage or the like.

The two-phase inverter drive current is detected and inputted to the analog inputs AIN4 and AIN5 of the A/D converter. These analog inputs are started by the compare match A of the TCNT3 of the aforementioned timer B (ITU) and/or by the underflow of the TCNT4 so that the two channels are simultaneously or continuously A/D-converted.

The two-phase encoder pulses (of an optical encoder or rotary encoder connected with the motor) are inputted as the count clock inputs (TCLKC and TCLKD) to the 16-bit timer channel 1 through a waveform shaper. In this case, the channel 1 operates in the phase count mode. As a result, the position and speed of the motor can be detected so that commutation is effected to switch the phases of the motor control.

Other various methods can be adopted to detect the location of the motor. For example, the position can be detected by detecting the induction voltage of the motor with the A/D converter to determine the positions of the magnetic poles of the motor. Moreover, the three outputs of the Hall element of the motor are inputted to the input capture inputs (TIOC0A, TIOC0B and TIOC0C) of the 16-bit timer channel 0. The magnetic pole location and rotational speed of the motor can be detected. The channel 0 has four registers, which can be effectively utilized.

A command of speed or the like is fed from the host CPU or microcomputer. This command is inputted as a pulse train different from the output of the encoder to the count clock inputs (TCLKA and TCLKB) of the 16-bit timer channel 2. In this case, the channel 2 operates in the phase count mode. The command may be the encoder signal which is outputted by not only the host CPU but also a volume. The value of the timer counter, counted up/down by the encoder pulses, can be understood as the parameter for the command of the speed. The microcomputer performs the PWM output control on the basis of the rotational speed detector result in a manner to match the speed command.

The SCI performs other communications with panels EEPROM, and so forth. This EEPROM can be stored with intrinsic parameter information. Alternatively, the SCI communicates with another CPU or microcomputer. The other output (TIOC0A) of the timer B (ITU) and the output of the timer A drive another Dc motor such as a fan motor or a stepping motor through another driver circuit. The outputs of the IOP1 to IOP3 control the various switches and relays.

By the compare match TCNT3=TGR3A of the channel 3 and the underflow TCNT4=4 of the channel 4, the A/D converter is started to detect the two-phase inverter drive current (I1 and I2). At the conversion end interruption, the detected current value is processed by the CPU, and this processed value is reflected on the setting of the subsequent compare values (TGR3D, TGR4C and TGR4D) of the channels 3 and 4. When the stator winding in the motor is the so-called "Y-connection (or star-connection)" or the delta-connection, the sum of the current values is 0 so that the current flowing through the third phase can be determined by the calculation of −(I1+I2) and indirectly detected. By detecting such a current and performing the PWM control (Pulse Width Modulation), the output torque of the motor can be controlled to reduce the torque ripple, for example.

The output of the sensor circuit is inputted to the analog inputs AIN0 to AIN3, AIN6 and AIN7 of the A/D converter. The sensor circuit can include the temperature detection of the motor drive section, the voltage detection and the current detection of the power source circuit. The analog inputs AIN0 to AIN3 are started by the compare match of the timer A and converted in the group mode/single mode, for example. The compare match of the timer A is generated at intervals of 1 millisecond, for example, to sample the sensor information at constant time intervals. Moreover, the operating state of the sensor circuit is outputted and inputted to the external trigger (ADTRG). By this external trigger, the conversion of the analog input AIN6 is started, for example. This is detected at constant time intervals and subjected to a desired processing so that the processed result is reflected upon the subsequent setting of the compare value of the complementary PWM mode.

Figure 47:
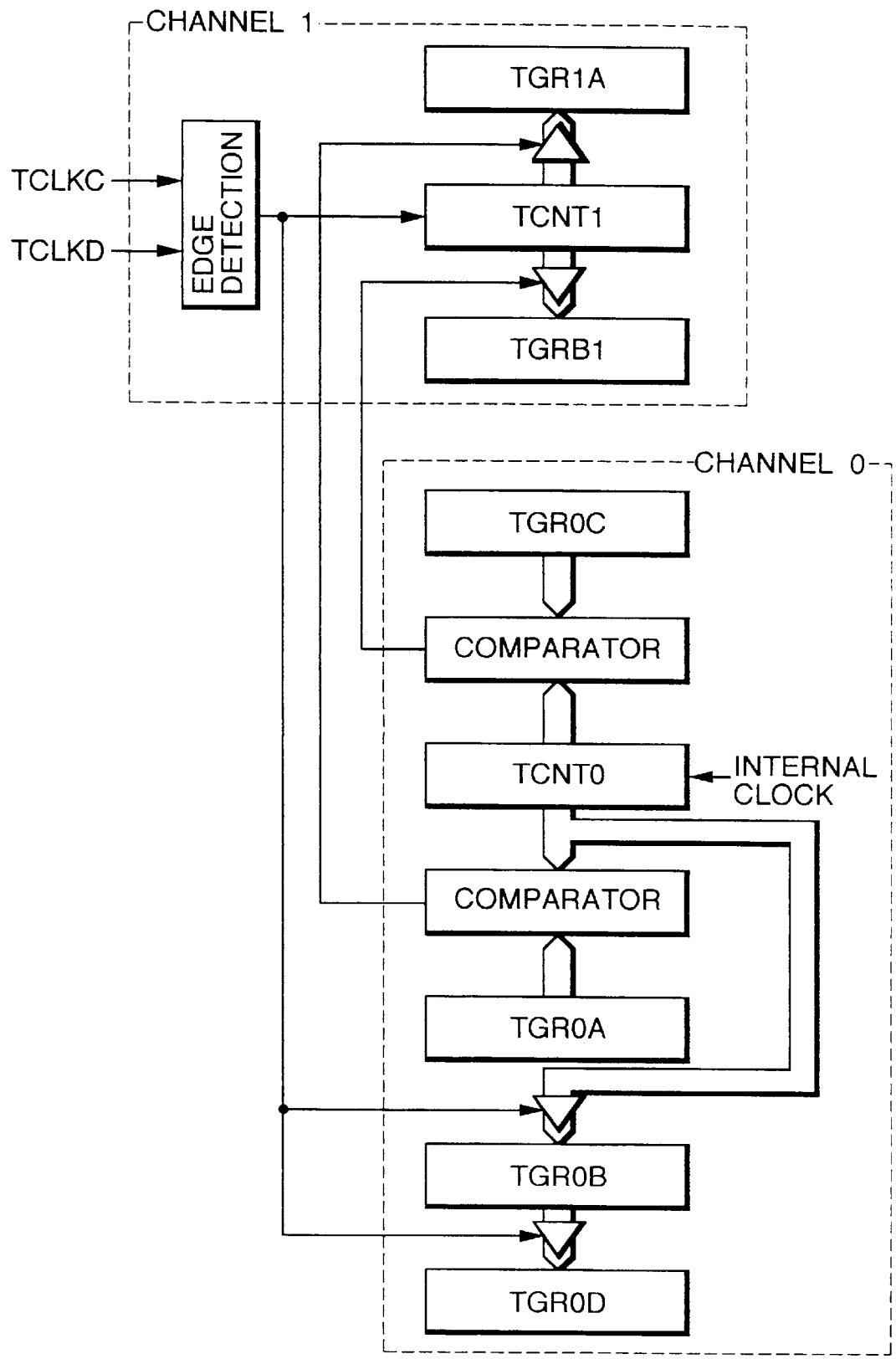
FIG. 47 is a block diagram for explaining an example of connection between the channels 0 and 1 of a timer circuit according to the present invention.

FIG. 47 is a block diagram for explaining an example of the connection between the channel 0 and the channel 1 of the timer circuit according to the present invention. The two-phase encoder pulses, connected with the motor, are inputted as the count clock inputs (TCLKC and TCLKD) of the 16-bit timer channel 1 through the waveform shaper. This channel 1 is set to the aforementioned phase count mode by the MD3 to MD0 bits of the aforementioned register TMDR.

The counter TCNT0 measures the absolute time by setting the internal clock to the count-up clock. In short, the counter TCNT0 performs the free-running operation. By the IOB3 to IOB0 bits of the register TIOR0A, as described before, the clock of the channel 1, i.e., the count up-down clock of the counter TCNT1, generated by the TCLKC and TCLD, is inputted to the input capture signal B of the channel 0.

The BFB bit of the aforementioned register TMDR is set to 1 to cause the aforementioned registers TGR0B and TGR0D to perform the buffer operation. Specifically, when the count up/down clock of the TCNT1 is generated, the content of the TCNT0 is transferred to the aforementioned TGR0B. Moreover, the content, held by the TGR0B, is transferred to the TGR0D. By taking the difference between the contents of the TGR0B and TGR0D, the pulse width of the encoder pulses can be measured. Moreover, the speed of the encoder, namely, the inverter motor can be measured.

By the IOA3 to IOA0 bits and IOB3 to IOB0 bits of the aforementioned register TIOR1, the compare match signals A and B of the channel 0 are inputted as the input capture signals of the channel 1. By generating the compare match signals at constant time intervals, the count values of the two-phase encoder are transferred to the aforementioned registers TGR1A and TGR1B at the constant time intervals which is set by the aforementioned registers TGR0A and TGR0C. For example, in the TGR0C, a half time period half that of the TGR0A is set. At each compare match of the TGR0A, the count value of the encoder is achieved in the TGR1A so that the rotational position of the motor, i.e., the encoder or the inverter motor can be determined. Moreover, since the count value of the encoder at the time of the previous compare match TGR0C is stored in the TGR1B, the encoder has rotated by the count value of TGR1A−TGR1B for the time period of TGR0A—TGR0C, so that the rotational speed of the encoder and accordingly the motor can be measured. By thus detecting the rotational speed of the motor, the slip factor of the motor can be measured and utilized for controlling the motor so that the optimum control signal can be fed to the motor by detecting the motor position.

Figure 48:
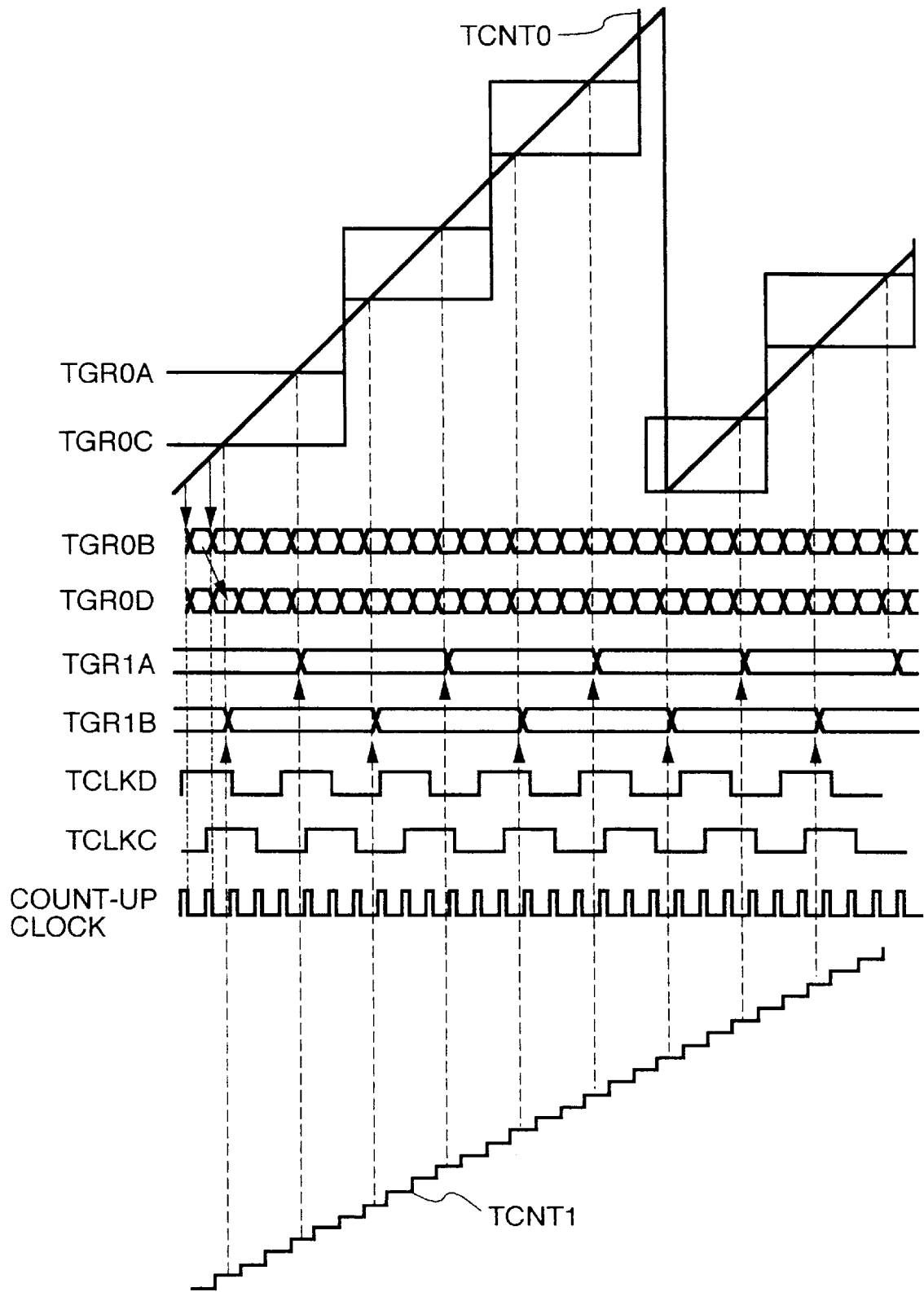
FIG. 48 is a timing chart for explaining the operation of the embodiment of FIG. 47.

FIG. 48 is a timing chart for explaining the operation of the embodiment of FIG. 47. The counter TCNT0 performs the free-running operation, as described above, to effect the count operation of H'0000 to H'FFFF. By using the count signal of the counter TCNT1 as the capture signal, the content of the TCNT0 is transferred to the TGR0B. When a subsequent capture signal is generated, the content of the TGR0B is transferred to the TGR0D, and the content of the TCNT0 is transferred to the TGR0B. The count intervals of the TCNT1 can be measured by the difference of TGR0D−TGR0B.

The TCNT0, TGR0A and TGR0C are compared, and a value corresponding to a desired constant time is added, if they match, to the TGR0A and TGR0C by the processing of the central processing unit CPU. In short, the compare match signal of the TGR0A and TGR0C is generated at the aforementioned constant time intervals. By using the compare match signal of the TGR0A as the capture signal, the content of the TCNT1 is transferred to the TGR1A. By using the compare match signal of the TGR0C as the capture signal, the content of the TCNT1 is transferred to the TGR1B. The position of the encoder can be detected by measuring the value of the TCNT1 at each constant time interval, e.g., at each compare match of the TGR0A. By the difference of TGR1A—TGR1B, moreover, the change in the TCNT1 for the time period of another constant time period of TGR0A—TGR0B can be measured to measure the change/speed of the encoder. As a result, the position and speed of the motor can be measured. The count-up clock of the TCNT1 is generated by the TCNTC and TCNTD.

Figure 49:
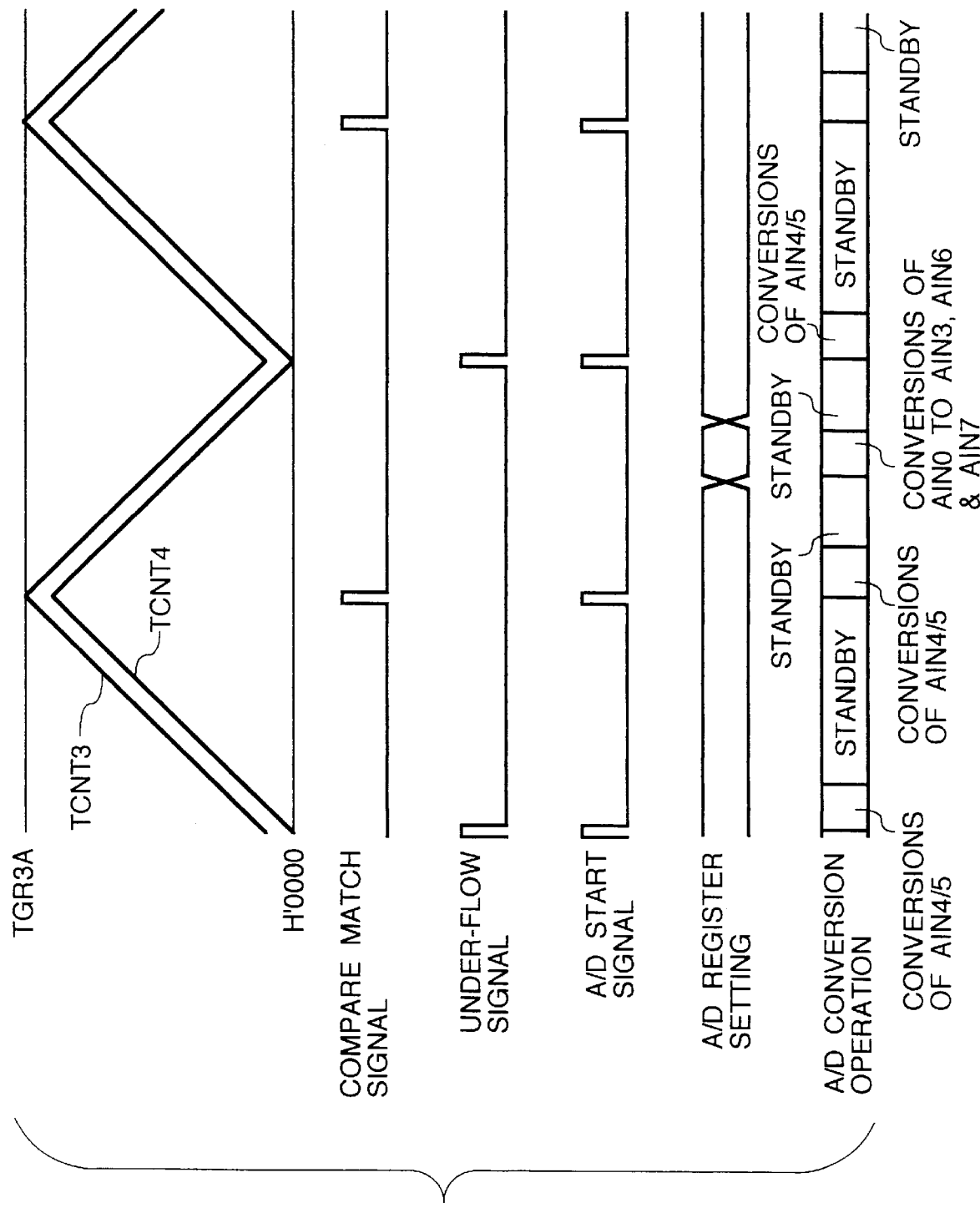
FIG. 49 is a timing chart for explaining the operation timing of an A/D converter in the case of a complementary PWM mode according to the present invention.

FIG. 49 is a timing chart for explaining the operation timing of the A/D converter in the aforementioned complementary PWM mode 3. By setting the TTGE bit of the aforementioned register TIER3 and the TTGE bit of the aforementioned register TIER4 to 1, the A/D converter is started with both the compare match A of the channel 3 and the underflow of the channel 4. The A/D converter is set in the input channels AIN4 and AIN5 by the control register to hold the state in which the start by the timer is selected. The A/D converter is in a standby state if no start factor occurs. The logical sum of the compare match TGR3A of the channel 3 and the underflow of the channel 4 is fed as the start signal of the A/D converter from the timer to the A/D converter.

Only the compare match TCNT3=TGR3A of the channel 3 in the case of the complementary PWM mode 1, only the underflow TCNT4=0 of the channel 4 in the case of the complementary PWM mode 2, and both the compare match of the channel 3 and the underflow of the channel 4 in the case of the complementary PWM mode 3 are selected and fed as the start signal of the A/D converter from the timer to the A/D converter.

When the selected start signal is generated, the A/D converter is started, and the analog signals, inputted from the input terminals AIN4 and AIN5, are converted and stored in the data register. As a result, the drive current of the motor can be measured. In addition, when the A/D converter or another input channel is converted at each constant time interval, the central processing unit CPU is interrupted by the compare match of the timer A so that it can reset the control register of the A/D converter to convert the desired analog input and to input the other sensor information. This result is used as the parameter information by the central processing unit CPU, for example, and is reflected upon the setting of the subsequent compare values (TGR3C, TGR4C and TGR4D) of the channels 3 and 4 for the desired processing.

After the end of those conversions, the input channels are set to the AIN4 and AIN5 by the control register to hold the state in which the start by the timer is selected. When the compare match TCNT3=TGR3A (crest) of the channel 3 or the underflow TCNT4=0 of the channel 4 occurs again, the aforementioned AIN4 and AIN5 are converted to measure the drive current of the motor. Thus, it is possible to measure the motor current in synchronism with the PWM output. Since the A/D converter can be started by the hardware, the time period from the instant of the crest/valley to the instant of measuring the drive current of the motor can be shortened to improve the detection accuracy. By sampling the two-phase currents simultaneously, the current accuracy can be improved to improve the PWM control accuracy.

Figure 50:
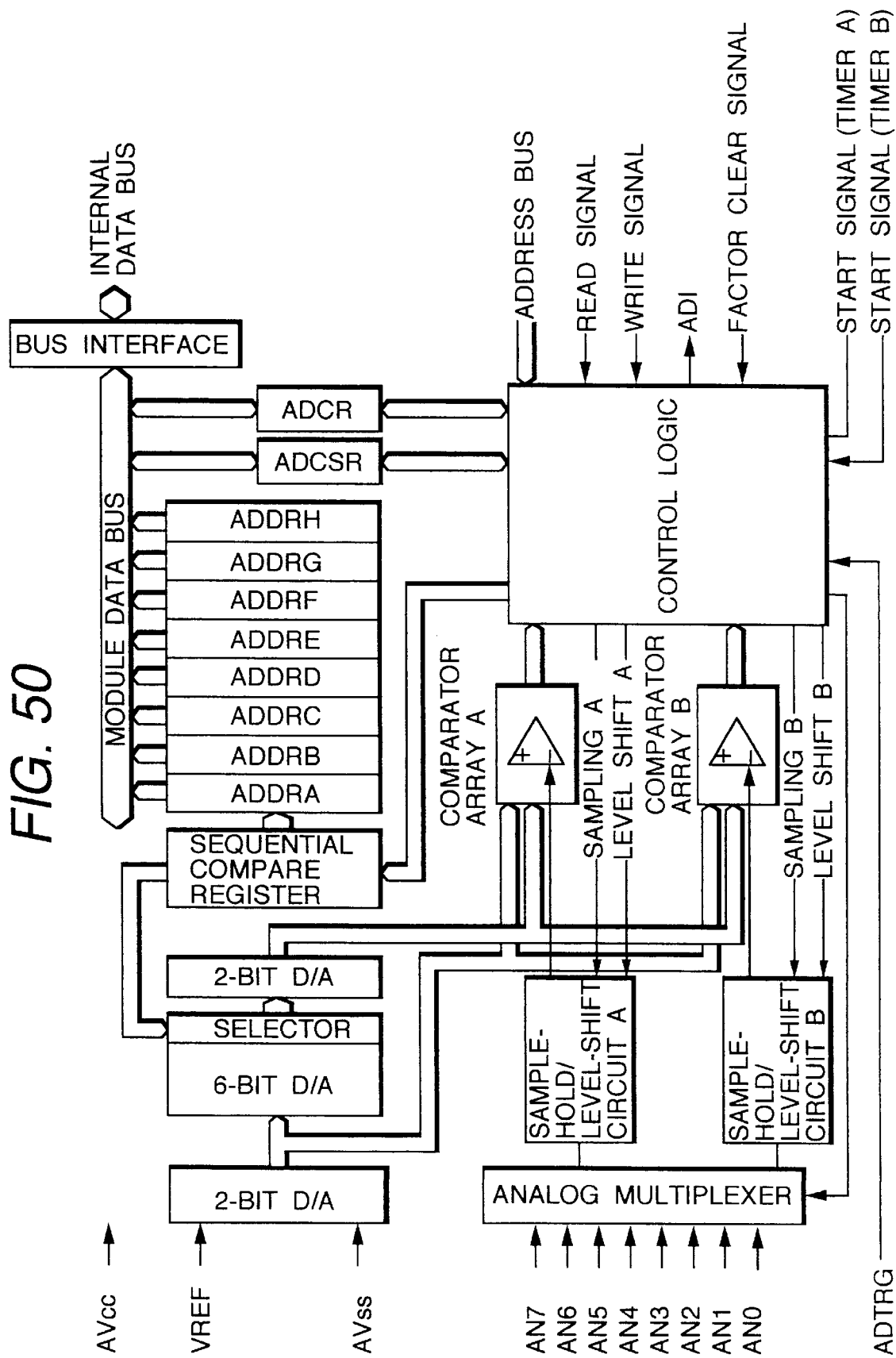
FIG. 50 is a block diagram showing one embodiment of the A/D converter according to the present invention.

FIG. 50 is a block diagram of one embodiment of the aforementioned A/D converter. This A/D converter is constructed to include a control logic, a bus interface, control registers ADCSR and ADCR, data registers ADDRA to ADDRH, resistor voltage dividers (D/A conversion) for 2-bit, 6-bit and 2-bit voltage (divisions, an analog multiplexer, sample-and-hold/level-shift circuits A and B, comparator arrays (differential amplifiers) A and B, and a sequential compare register. The paired analog inputs by the paired sample-and-hold/level-shift circuits A and B can be simultaneously sampled.

The external inputs of the A/D converter include the power sources (Vcc, Vss, AVcc, AVss and VREF), analog inputs AIN0 to AIN7 and an external trigger signal ADTRG. The internal signals of the single-chip microcomputer include the start signals from the timers A and B, an address bus, a read signal, a write signal, a bus size signal and a factor clear signal, and the data are inputted/outputted between the microcomputer and the internal data bus through a bus interface. The microcomputer also outputs an interrupt signal ADI. This interrupt signal ADI is fed to the interrupt controller INT so that it acts as the start signal of the aforementioned data transfer controller DTC or the interrupt request of the central processing unit CPU.

On the basis of the address signal from the address bus, the read signal and the write signal, fed from the central processing unit CPU, the control logic exchanges the data with the control registers ADCSR and ADCR and the data registers ADDRA to ADDRH through the internal data bus and the bus interface. The control logic is fed with the external trigger signal ADTRG and the start signals from the timers A and B. On the basis of the contents of the control registers ADCSR and ADCR, the control logic controls the analog input operation. Moreover, the control logic outputs the aforementioned interrupt signal ADI.

The control registers ADCSR and ADCR are read/written by the central processing unit CPU through the internal data bus and the bus interface to instruct the operations of the control logic and to indicate the status of the aforementioned analog input. In short, the control registers selects the input channels and the conversion modes. These A/D conversion modes include not only the select mode for conversion of one channel and a group mode for conversions of a plurality of channels but also a single mode for a single conversion and a scan mode for repeated conversions.

TABLE 16

| | bit | | | | | | | |
|---|---|---|---|---|---|---|---|---|
| | 7 | 6 | 5 | 4 | 3 | 2 | 1 | 0 |
| | ADF | ADIE | ADST | CKS | GRP | CH2 | CH1 | CH0 |
| Initial value | 0 | 0 | 0 | 0 | 0 | 0 | 0 | 0 |
| R/W | R/(W)* | R/W | R/W | R/W | R/W | R/W | R/W | R/W |

A control register ADCSR is an A/D control/status register capable of performing read R or write W of 8 bits to control the operation of the A/D conversion and to indicate the status. This register ADCSR is initialized to B'00 at the reset time, and its bit construction is tabulated in Table 16.

The ADF of the bit 7 is a status flag indicating the end of the A/D conversion. The clear condition is satisfied when the value 0 is written in the ADF flag with ADF=1 after the ADF flag has been read or when the data transfer unit DTC or DMAC is started by the ADI interruption. The set condition is satisfied when the A/D conversion ends after the conversion of all the designated channels and when all the designated channels are converted by one cycle in the scan mode.

The ADIE of the bit 6 selects the enable/disable of the interrupt request at the end of the A/D conversion. The interrupt (ADI) request at the end of the A/D conversion is disabled (to the initial value) if ADIE=0 but is enabled if ADIE=1.

The ADST of the bit 5 selects the start and stop of the A/D conversion. The ADST is held at 1 during the A/D conversion. This ADST is set to 1 of the trigger signal of the A/D external trigger input terminal (ADTRG) or the timer. The A/D conversion is stopped for ADST=0 but is started if in the single mode for ADST=1, so that clearance to 0 is automatically effected when the conversion of a designated channel ends. The A/D conversion is started if in the scan mode for ADST=1 and is continued till clearance to 0 is effected by the central processing unit.

The CKS of the bit 4 is a clock select signal for setting the A/D conversion time. This conversion time is switched during the conversion. This conversion time takes a 20-stage (to select the reference clock φ) for CKS=0 and a 40-stage (to select the reference clock φ/2) for CKS=1.

The GRP of the bit 3 is a group mode signal for designating the selection of the A/D conversion channel to the select mode or the group mode. This setting of the GRP bit is effected while the A/D conversion stops. The select mode is selected for GRP=0, and the group mode is selected for GRP=1.

The bits 2 to 0 are channel select signals for selecting the analog input channel together with the aforementioned GRP bit. The input channel is set while the A/D conversion stops. For GRP=0 and in the select mode, one of the AN0 to AN7 is selected by combining the aforementioned three bits CH2 to CH0. For GRP=1 and in the group mode, only the AN0 is selected if the aforementioned three bits CH2 to CH0 are B'000. In other cases, the AN1 to AN7 are selected together with the AN0 by combining the AN0 and the bits CH1 and CH2.

The control register ADCR is an A/D control register capable of performing read R or write W of 8 bits for controlling the operation of the A/D conversion. This register ADCS is initialized to B'00 at the reset time, and its bit construction is tabulated in Table 17.

TABLE 17

|  | bit | | | | | | | |
| --- | --- | --- | --- | --- | --- | --- | --- | --- |
|  | 7 | 6 | 5 | 4 | 3 | 2 | 1 | 0 |
|  | INF | PWR | TRGS1 | TRGS2 | SCAN | DSMP | BUFE1 | BUFE2 |
| Initial value | 0 | 0 | 0 | 0 | 0 | 0 | 0 | 0 |
| R/W | R/(W) | R/W | R/W | R/W | R/W | R/W | R/W | R/W |

The INF of the bit 7 is an interval bit for designating an interval operation. In this interval operation, any new A/D conversion is not started when a BUSY signal is active. The new A/D conversion can be started by clearing the ADF flag to 0 to activate the BUSY signal. The normal operation is established for INF=0, and the interval operation is established for INF=1.

The PWR of the bit 6 is a power source bit for setting a conversion start mode. This conversion start mode is composed of a high speed conversion mode and a low power consumption mode.

The TRGS1 and TRGS0 of the bits 5 and 4 are timer trigger select bits for selecting the enable/disable of the A/D conversion start by the trigger signal. The TRGS1 and TRGS0 are set while the A/D conversion stops. The following four patterns can be selected by combining the TRGS1 and TRGS0 of the aforementioned two bits: (1) Only the A/D conversion start is enabled by the central processing unit; (2) The A/D conversion start is enabled by the timer trigger (timer B). Which of the signals of the timer B is to be triggered can be selected by the TTGE bit of the TIER. A plurality of triggers, for example, the compare match of the TGR3A and the underflow of the TCNT4, can be used; (3) The A/D conversion start is allowed by the timer trigger (timer A); and (4) The A/D conversion start is allowed by the external trigger terminal.

The SCAN of the bit 3 is a scan mode for selecting the single mode or the scan mode of the operation mode for the A/D conversion. One conversion is effected in the single mode for SCAN=0. The scan mode is effected for SCAN=1 so that the conversions are repeated.

The DSMP of the bit 3 is a simultaneous sampling mode for enabling/disabling the simultaneous sampling operation of two channels. This simultaneous sampling mode will be detailed hereinafter. For DSMP=0, normal sampling operation is effected. For DSMP=1, simultaneous sampling operation is effected so that a pair of analog inputs are simultaneously inputted to and held in the sample-and-hold/level-shift circuits A and B at a predetermined timing.

The BUFE1 and BUFE0 of the bits 1 and 0 are buffer enables for selecting whether or not the data registers ADDRA to ADDRD are to be used as the buffer registers.

The registers ADDRA to ADDRH can be read/written from the central processing unit CPU through the internal data bus and the bus interface to store the analog input data, i.e., the A/D conversion results. These data registers ADDRA to ADDRH are individually composed of 16 bits, of which the less significant eight bits are transferred to and stored in the less significant bytes (bits 7 to 0) whereas the more significant two bits are transferred to and stored in the more significant bytes (bits 9 and 8), if the A/D converted data are 10 bits, although not especially limited thereto. The bits 15 to 10 of the more significant bytes are not used, but the value 0 is always read out. In this embodiment, the data are read out in the form of bytes or words. Specifically, the A/D conversion output of the resolution of 10 bits is read out in the word mode, and the A/D conversion output of the resolution of 8 bits is read out as the more significant eight bits (bits 9 to 2) in the byte mode.

The analog multiplexer selects the analog inputs AIN0 to AIN7 on the basis of the select signal outputted from the control logic and takes in the corresponding analog signal. This analog multiplexer may be included in the aforementioned input/output port IOP9 of FIG. 1.

The sample-and-hold/level-shift circuit samples and holds (stores) the analog input signal, selected by the analog multiplexer, on the basis of the sampling signal outputted from the control logic. This embodiment is equipped with the two sample-and-hold circuits A and B which are individually fed with independent sampling signals A and B. Therefore, the sample-and-hold/level-shift circuit can effect the sampling at an independent timing or simultaneously with the aforementioned sampling signals A and B. For the system of FIG. 46, it is convenient to sample the two analog input channels AIN4 and AIN5 simultaneously. The motor drive currents can be simultaneously detected to improve the accuracy of the mutual current values, when another third current is calculated, thereby to improve the accuracy of the motor drive.

The level shift circuits A and B shift the levels of the aforementioned held input signals by the level shift signals A and D. These level shifting operations are effected on the basis of the first A/D conversion results. For example, the held input signals are shifted within the sub-ranges VREF/4 to VREF/2 defined by dividing the analog input range corresponding to the reference voltage VREF into four voltage ranges.

The comparator arrays A and B are individually composed of five differential amplifiers. These comparator arrays A and B compare the input signals, which are held in the sample-and-hold circuits A and B, with a plurality of (or five) reference voltages, established by the local resistor voltage-dividing circuit, to output the comparison results. In short, the comparator arrays A and B can compare two bits simultaneously. The comparison results are converted into binary signals by the control logic until they are stored in a sequential compare register.

A first comparison is made with the more significant two bits of the resistor voltage divider. On the basis of this comparison results, the level shift signals A and B are generated to shift the aforementioned input signals held in the sub-ranges, as described above, by the level shift circuits A and B. The second and subsequent conversions are effected such that a $\frac{1}{64}$-division voltage is generated by the local voltage divider (of 6 bits) so that their two bits are selected through the selector and so that the voltage divided by the two-bit voltage division is fed to the aforementioned comparator array A or B. The conversions are extended till the least significant bit by repeating those operations. At the end of the A/D conversions, the converted data, as held in the control logic (sequential compare register), are transferred to any of the data registers ADDRA to ADDRH.

For resolution of 10 bits, for example, the resistor voltage divider (D/A conversion) is required to generate the divided voltages which are obtained by 1,024 resistors between the reference voltage Vref and the analog ground voltage AVss. This method increases the number of resistors. In this embodiment, therefore, the number of resistors is drastically decreased by providing three voltage dividers for the more significant two bits, six bits and less significant two bits, as described above. In other words, the resistor voltage divider of this embodiment is composed of the more significant 2-bit voltage divider and the local voltage dividers for the 6 bits and 2 bits. The more significant two-bit voltage divider generates VREF, 3 REF/4, VREF/2, VREF/4 and 0 V and feed them to the register shift circuit and the comparator array.

The 6-bit local voltage divider generates sixty four divided voltages by dividing the aforementioned range of VREF/4 to VREF/2 into 1/64 voltages and outputs the divided voltages corresponding to two bits sequentially from the higher order such that the selectors are controlled on the basis of the designations of the content of the sequential compare register. These divided voltage outputs are further divided by the less significant two bits and fed to the comparator array so that they are used for the A/D conversions. The analog voltages AVcc and AVss are used as the power sources of the analog units (the multiplexer, the sample-and-hold circuit and the comparator array).

Figure 51:
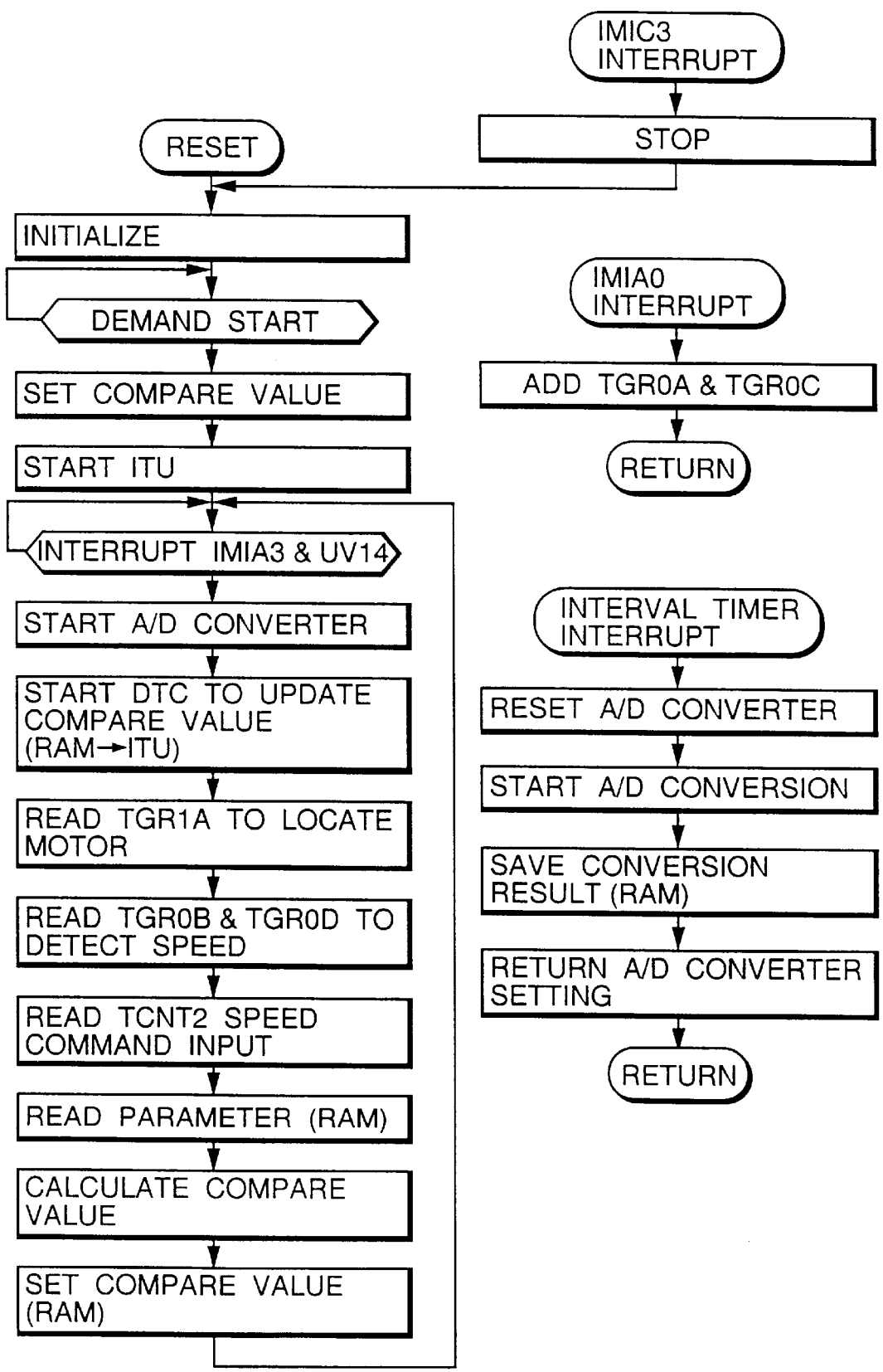
FIG. 51 is a flow chart for explaining one example of the operation of a single-chip microcomputer according to the present invention.

FIG. 51 is a flow chart for explaining one example of the operations of the single-chip microcomputer according to the present invention. By releasing the reset, the microcomputer is initialized. This includes the initializations of the aforementioned timers ITU and DTC and the A/D converter. This A/D converter is set to convert the input channels AIN4 and AIN5 in response to the trigger of the ITU. The timer A operates as the interval timer to start the operations.

When these initial settings are ended, the routine awaits the request for starting the motor. A motor starting request is fed from the host CPU through the input/output port, for example. When the motor starting request is inputted, the compare value is calculated according to the desired processing and is arranged in the first region of the RAM.

Next, the ITU is started to effect the complementary PWM output and to establish the interrupt standby status. At the interruption (crest) of the compare match TCNT3= TGR3A (IMIA3) or the interruption (valley) of the underflow TCNT4=0 (UVI4), the start signal is fed to the A/D converter ]so that the input channel signals AIN4 and AIN5 are A/D-converted automatically or in a hardware manner in accordance with the initial settings. By the aforementioned interruption (crest) of the IMIA3 or the interruption (valley) of the UNI4, moreover, the DTC is started to transfer the compare value from a predetermined address on the aforementioned RAM to the buffer registers TGR3D, TGR4C and TGR4D of the ITU thereby to change the duty of the PWM.

In the interrupt processing routine of the CPU, the TGR1A is read to confirm the motor position. Moreover, the TGR0B and TGR0D are read, and their difference (TG0B to TGR0D) is calculated to confirm the motor speed. The A/D conversion result is read to generate the motor drive current for the two phases thereby to calculate the motor drive current for the third phase.

The TCNT2 is read to confirm the speed command. In addition, the input value of the sensor circuit, stored in advance in the second region in the RAM, is read. A new compare value is calculated by the desired processing referring to the position/speed of the motor, the motor drive current and other sensor input values and is written in the first region in the EAM. For example, the motor speed and the speed command are compared, and the torque of the motor is increased if the motor speed is low. At this time, the torque ripple can be decreased by changing the torque while monitoring the current value for the motor drive.

Then, the aforementioned interrupt standby status is restored. On the other hand, when the interruption of the input capture (IMIC3) by the TIOC3A terminal occurs, the output value is automatically cut off so that the value of the TOSR is outputted to fix the PWM output value. In the interrupt routine of the CPU, the motor is stopped. After this, the routine takes the standby status for starting the motor.

When the interval timer interruption of the timer A occurs, the setting of the A/D converter is changed so that the sensor input value other than the motor drive current is A/D-converted by starting the central processing unit. The conversion results are held in the second region in the RAM. Then, the routine is returned by returning the setting of the A/D converter.

When the interruption of the compare match TCNT0= TGR0A (IMIA0) occurs, the routine is returned by adding a desired constant value to the values of the TGR0A and TGR0C.

The modulation functions of the individual phases are:

$$u=(\tfrac{1}{2})(m\times\sin(\omega t)+1);$$

$$v=(\tfrac{1}{2})(m\times\sin(\omega t-2\pi/3)+1);$$

and $$w=(\tfrac{1}{2})(m\times\sin(\cot+2\pi/3)+1).$$

Specifically, the duty is increased for the larger amplitude of the sinusoidal wave in the positive direction, but decreased for the smaller amplitude in the negative direction. At this time, the voltage wave between the lines demodulated is expressed for the voltage E by the following formula:

$$U-V=(\tfrac{3}{2})\tfrac{1}{2}\times E\times m\times\sin(\omega t+\pi/6).$$

The voltage waves between the other lines are expressed by the sinusoidal waves having the phase difference of 120 ($2\pi/3$) from the above. By the current flowing through the coil according to that voltage, the motor can be driven. The compare value is so set by making the period of the complementary PWM sufficiently smaller than the period ($1/\omega$) of that function that the PWM duty may be established in proportion to the amplitude of the aforementioned modulation function at each instant corresponding to the crest/valley of the PWM.

Figure 52A:
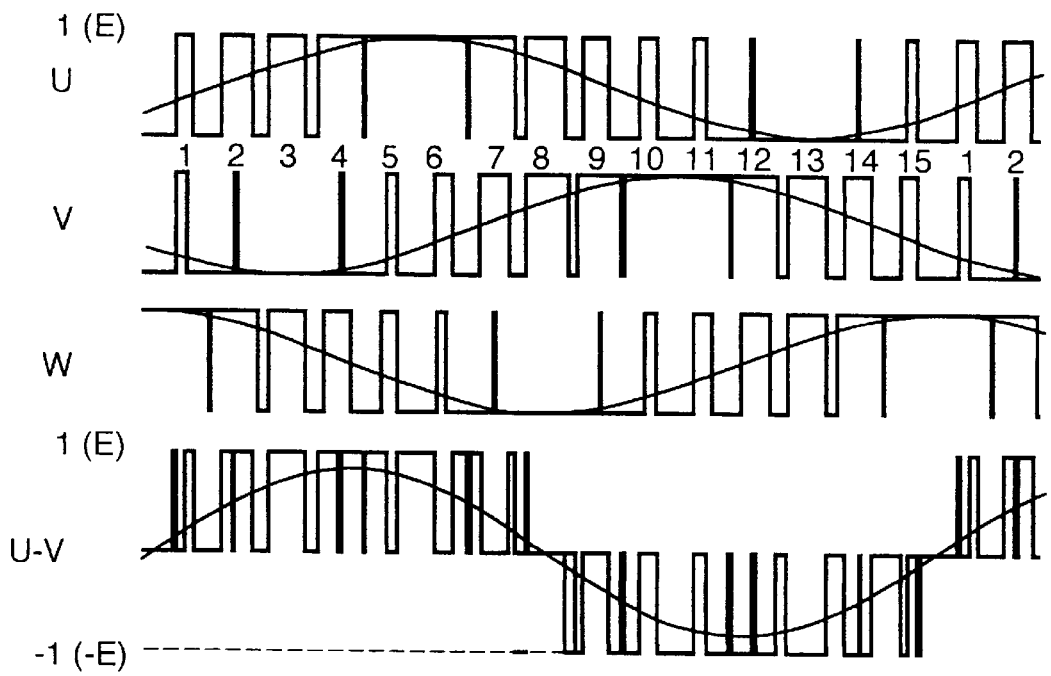
FIGS. 52(A) and 52(B) are a waveform chart of the PWM for explaining the present invention.
Figure 52B:
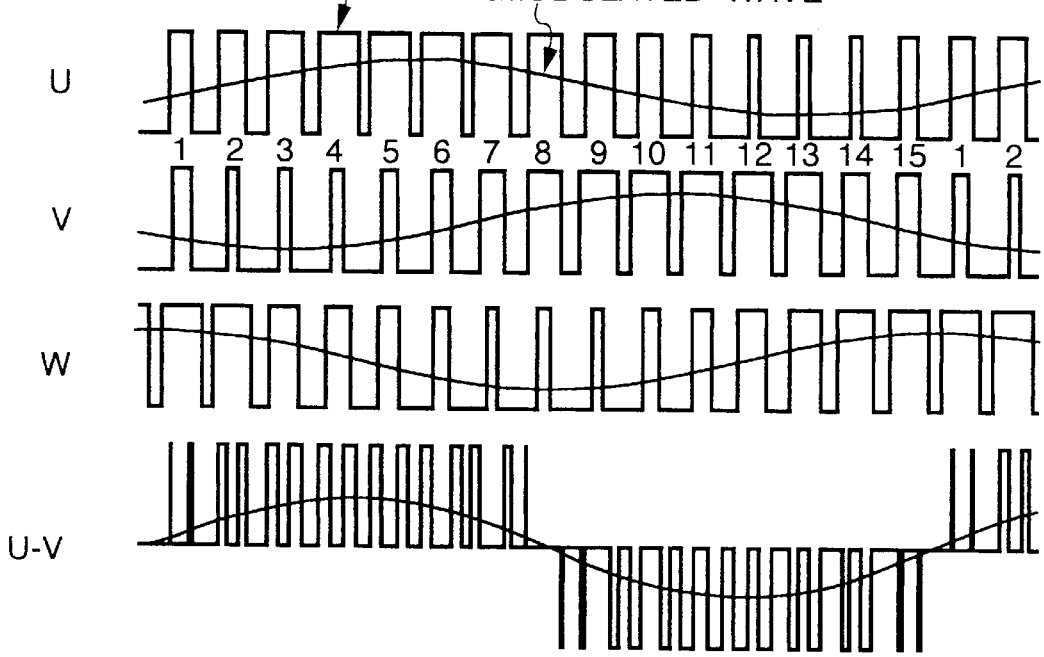

FIG. 52 is a waveform chart of the aforementioned PWM. The sinusoidal PWM waveform, in which one cycle is divided into fifteen, is illustrated in FIG. 52; in FIG. 52(A), the modulation factor m=1 whereas in FIG. 52(B) the modulation factor m=0.6. This modulation factor m takes a value from 0 to 1.

As described above, the motor speed and the speed command are compared so that the torque is calculated on the basis of the comparison results. The torque control has to give the torque for acceleration or deceleration and the torque matching the motor load on the motor. On the basis of the results of the torque control, the current and the phase required for establishing the necessary torque are calculated. The aforementioned functions m and ω are determined while monitoring the motor position (e.g., the magnetic pole position) by making a comparison with the monitor results of the motor drive current value by the A/D converter, so that the compare value and accordingly the PWM duty may be achieved. In the ITU (timer B) of this embodiment, it is possible to generate the PWM output of an arbitrary duty of 0% to Td and 100%–Td to 100%. Thanks to this output of 0% to Td and 100% Td to 100%, it is possible to prevent the drop of the maximum/minimum voltages between the lines i.e., the drop of the amplitude. Since the duties of 0% and 100% can be synchronously outputted, it is possible to prevent the drop of the maximum/minimum voltages between the lines, i.e., the drop of the amplitude.

Figure 53:
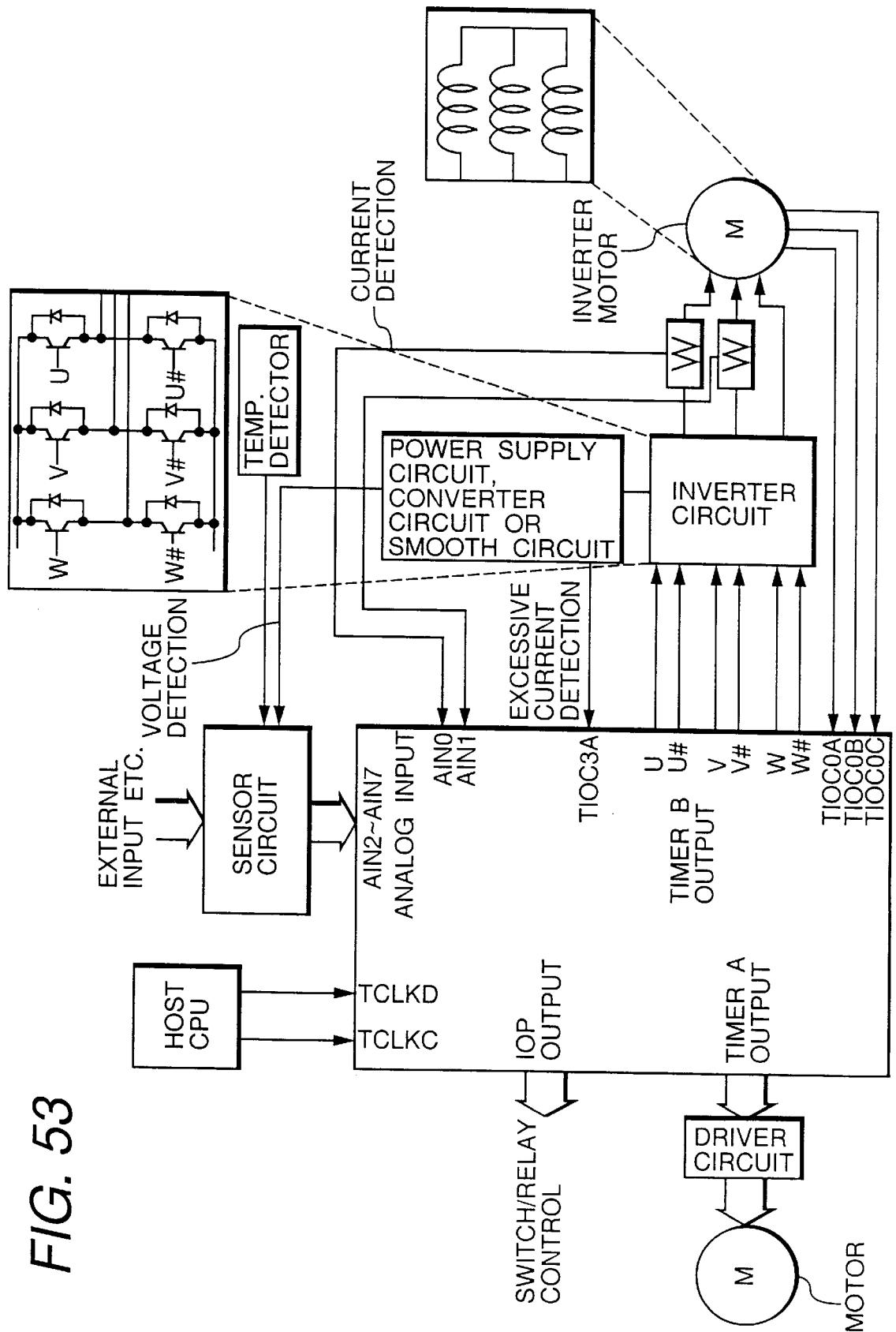
FIG. 53 is a schematic block diagram showing another embodiment of the control system using the single-chip microcomputer according to the present invention.

FIG. 53 is a schematic block diagram of another embodiment of the control system using a single-chip microcomputer according to the present invention. The control system of FIG. 53 is directed to a control system of a brushless DC motor, although not especially limited thereto.

In this embodiment, the complementary three-phase PWM outputs (TIOC3B[U], TIOC3D[U#], TIOC4A[V], TIOC4C[V#], TIOC4B[W] and TIOC4D[W#]) are used to drive the motor through the inverter circuit. In this case, the reset synchronization PWM mode is used.

The output of the Hall elements, mounted in the brushless DC motor, are inputted to the input capture inputs (TIOC0A, TIOC0B and TIOC0C) of the timer B. The position of the motor is detected by this input capture operation. Assume that the Hall elements be arranged at intervals of 60 degrees. By this input capture, it is possible to determine the positions of the Hall elements, i.e., the position of the motor. At this time, the time period of every 60 degrees and accordingly the rotational speed of the motor can be measured by sequentially storing the input capture values.

The speed control arithmetic operation determines the current value by comparing the aforementioned motor speed and speed command. On the basis of the results of the position determination, the current statuses of the upper and lower arms in the U, V and W phases are switched. In the power supply system of 120 degrees, any one of the U, V and W phases is sequentially driven. The phases, left undriven, can output a predetermined level as the port output by clearing the predetermined bit of the register TOER to o and by disabling the output of the timer.

Alternatively, the FB bit of the aforementioned register TGCR can be cleared to 0, and the input capture signals of the inputs (TIOC0A, TIOC0B and TIOC0C) of the Hall elements can be used as the feedback inputs to enable the one-phase reset synchronization PWM output whereas the others can be set to a predetermined level. With the P bit of the TGCR being set to 1 and with the N bit being cleared to 0, for example, the U-phase reset synchronization PWM is outputted from the falling edge of the TIOC0A to the rising edge of the TIOC0B, to maintain the U-phase output at the low level from the rising edge of the TIOC0B to the rising edge of the TIOC0A. The U#-phase is outputted from the falling edge of the TIOC0A to the falling edge of the TIOC0B, to maintain the U#-phase output at the low level from the falling edge of the TIOC0B to the falling edge of the TIOC0A.

Figure 54:
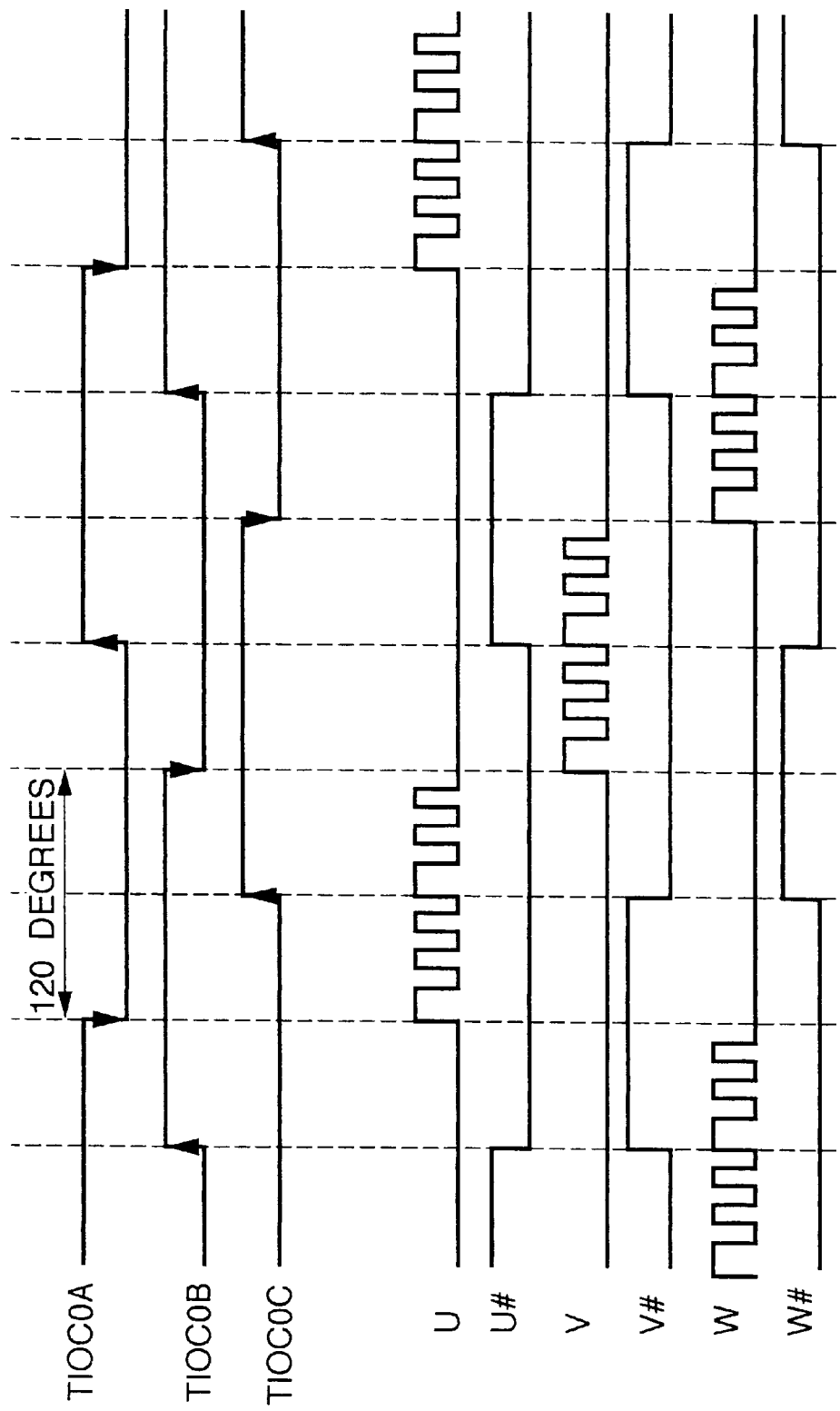
FIG. 54 is a timing chart of timer outputs in the control system of FIG. 53.

FIG. 54 is a timing chart of the timer outputs in the control system of FIG. 53. FIG. 54 shows an example, in which the so-called "power supply system of 120 degrees" is realized by the reset synchronization PWM mode for the register TGCR of BDC=1, N=0, P=1 and FB=0. The U-phase is outputted from the falling edge of the TIOC0A to the falling edge of the TIOC0B, and the U#-phase is outputted from the rising edge of the TIOC0A to the rising edge of the TIOC0B.

When the output is disabled, the low level is outputted. For only the positive phase, the reset synchronization PWM waveform is outputted. For the negative phase, the gate signal is outputted.

According to the embodiments thus far described, the following effects can be achieved.

(1) Since the sub-counter is provided to realize the two parallel up-count and down-count for counting from the upper limit (Tc/2+DTR) to the lower limit 1, the PWM output of duty of 0% to 100% can be achieved to eliminate the restriction upon the set range thereby to lighten the burden upon the central processing unit.

(2) The upper arm (U, V and W) and the lower arm (U#, V# and W#) can be made symmetric with respect to the duty of 50%. Since these upper and lower arms are not simultaneously turned on, the time period, for which both the positive and negative phase outputs are inactive, can be made shorter than two times of the dead time. This feature is suited for driving the inverter motor to output an arbitrary duty so that the rotation control can be smoothed by eliminating the ripples of the speed and torque.

(3) By selecting the updating timing of the compare register from the crest or the valley or from both the crest and valley, the rewrite disable time period can be eliminated to lighten the burden upon the software, and the outputs of 0% and 100% can be synchronously outputted to establish the highest torque for driving the inverter motor.

(4) Since the updating timing of the compare register can be rewritten at both the crest and valley, the control accuracy can be improved.

(5) Since the input counters (TCNT3 and TCNT4) and the compare registers (TDCR and TDDR) can be selected for one comparator, the increase in the physical scale can be suppressed.

(6) By providing the TR as the buffer for the BR, the register rewrite timing can be arbitrarily set to exert no burden upon the software.

(7) Since the rewrite of the control register is disabled, it is possible to prevent erroneous operation of the timers, caused by the false write of the control registers requiring only the initialization.

(8) The write by the data transfer unit such as the DTC can be effected by causing the buffer registers to be in the continuous regions, and the PWM duty can be set without any load upon the software by starting such DTC by the compare match (upper limit) or the underflow (lower limit).

(9) Since the count value (two-phase encoder) of the up/down times by the compare match period of the interval timer can be captured, the position determination can be made. The pulse width of the count input of the up/down timers can be detected to detect the speed. The speed/position can be detected in synchronism with the speed or position sampling period to eliminate the external circuit and thereby to lighten the burden upon the software. The encoder output of the inverter motor can be used as the clock input of the up/down timers to effect the speed/position detection in synchronism with the sampling period of the inverter motor. The dynamic range of the motor position determination can be widened by making it possible to connect the counters of the encoder input in cascade.

(10) Since three or more input capture inputs are provided for one counter (TCNT0) to input the outputs of the Hall elements of the inverter motor, the instant, at which the inverter motor comes to a predetermined position, can be measured to detect the speed/position.

(11) Thanks to the two groups of the two-phase encoders, one of them can be inputted to the encoder of the motor whereas the other for another input, so that the speed command train can be inputted.

(12) Since the A/D converter can be started at both the crest and valley and the analog input produced by current-voltage converting the motor drive current to the A/D converter, an effect is achieved that the motor drive current can be measured in synchronism with the PWM output to facilitate the control of the motor drive. The A/D converter can be equipped with a plurality of sample-and-hold circuits to sample a plurality of three-phase motor drive currents simultaneously so that the measurement accuracy of the motor drive current can be improved to improve the motor control accuracy.

(13) Since the edges of the internal clocks can be selectively detected, the number of count-up clocks can be increased without increasing the number of internal signals by making effective use of the control bits of the control registers.

Although the present invention has been specifically described in connection with its embodiments, it should not be limited thereto but can naturally be modified in various manners without departing the gist thereof. For example, the number of whole channels of the timers should not be limited to five channels+sub-counters, and addition and deletion can be made. What is necessary is the function corresponding to the channels 3 and 4 and the sub-counters. For example, the sub-counters may be used as general purpose timer counters. Alternatively, the number of whole channels may be sixteen. The channels may be constructed of an integral module or a functional block or may be divided and connected with each other as in the so-called "timer network". The number of timer general registers TGR may also be arbitrary. The operation mode and the structure of the control registers can also be modified in various manners. What is necessary is to prepare modes and the number of TGRs capable of measuring the position and speed of the motor in accordance with the kind of the control system and the kind of the motor.

The other functional blocks of the microcomputer are also not limited. The CPU or other modules or functional blocks need not be partially or wholly incorporated. For example, the CPU may be eliminated and a semiconductor integrated circuit device which can be read/written from the external microprocessor can be used. The timer input/output terminals need not act as the input/output ports but may be independent terminals. The construction of the A/D converter or the construction of the DTC can also be modified in various manners. It is desirable that the registers for setting the duties of the PWM output can be easily rewritten by the data transfer unit such as the DTC.

The application system also should not be limited to the foregoing embodiments. It is easy to eliminate some of the functions or to add new functions. The motor may be an AC synchronous motor or a DC servomotor. The motor may be a motor of the type which is rotated by the induced magnetic field generated by the controlled current for driving the coil of the stator. A typical representative of the motors of 180-degree power feed type using the complementary PWM mode is a squirrel-cage induction motor, and can be used in the industrial general purpose inverter. The application system can be an air conditioner, a freezer, a pump or a machine tool.

Although the foregoing description has been made upon the case in which our invention is applied to the microcomputer which is the background of application field thereof, it should not be limited thereto but can be applied to other semiconductor integrated circuit devices or data processors. The present invention can be widely applied at least to a control apparatus such as a semiconductor integrated circuit device having a six-phase PWM output function capable of controlling the motor or a data processor.

The effects achieved by the representative one of the invention disclosed herein will be briefly described in the following.

(1) Two up-counters and two down-counters having time differences corresponding to the dead time are provided to count values between the lower and upper limits (½ period+dead time) such that the upper limit of the up-counter for counting the relatively large value is equalized to the lower limit of the down-counter for counting the relatively large value, such that the upper limit of the up-counter for counting the relatively small value and the down-counter for counting the relatively small value intersect at a count value corresponding to the ½ period, such that the up-counter for counting the relatively large value and the down-counter for counting the relative large value intersect at a count value corresponding to the dead time, and such that the up-counter for counting the relatively small value and the down-counter for counting the relatively small value contact at the lower limit, whereby the upper and lower symmetric counts are realized.

(2) A first compare register (TGR) and a second compare register (BR) can be compared with the aforementioned counters so that they are compared when the aforementioned counter values are smaller than the dead time and larger than the count value corresponding to the ½ period and so that only the first comparisons are compared when they are larger than the dead time and smaller than the count value corresponding to the ½ period.

(3) When the positive-phase output is in an OFF level state so that the compare registers coincide with the up-count for counting the relatively small value, the negative-phase output is set to an ON level. When the compare registers coincide with the down-count for counting the relatively small value, the negative-phase is set to an OFF level. When the negative-phase is in the OFF level state so that the compare registers coincide with the down-count for counting the relatively large value, the positive-phase output is set to the ON level. When the compare registers coincide with the up-count for counting the relatively large value, the positive-phase output is set to the OFF level.

(4) The central processing unit CPU writes the second compare register. When a transition is made from the region for the two comparison to the region for only the first comparison, the data can be transferred from the second compare register to the first compare register. It is further possible to select data transfer from the three data transfers: the data transfer from the second compare register to the first compare register when the transition is made from the region for the two comparison to the region for only the first comparison at the up-count time; the data transfer from the second compare register to the first compare register when the transition is made from the region for the two comparisons to the region for only the first comparison at the up-count time; and the data transfer from the second compare register to the first compare register when the transition is made from the region for the two comparisons to the region for only the first comparison at the down-count time.

Thanks to these effects, (1) the complementary PWM outputs of a duty of 0 to 100% can be made without burdening the software. (2) The phases of 0% and 100% can be matched. (3) The dead time (non-overlap time) can be always established at the ON/OFF switching time between the positive/negative phases.

(4) The OFF period of the positive/negative phases can be shorter than two times of the dead time.

(5) The duties of the positive/negative phases can be made symmetric with respect to the duty of 50%.

(6) The timing for rewriting the data of the compare registers can be made arbitrary. As a result, uniform operations can be enabled to lighten the burden upon the software thereby to drive the motor smoothly and efficiently.

What is claimed is:

1. A circuit in a single chip microcomputer, comprising:

a first register storing a first value;

a second register storing a second value larger than the first value;

a third register storing a third value larger than the second value, wherein the difference between the second value and the third value corresponds to the first value;

a first counter receiving clock signals, wherein the first counter generates a count value by counting up and down between the first value and the third value by counting the clock signals;

a second counter receiving the clock signals, wherein the second counter generates a count value by counting up and down between a fourth value smaller than the first value and the second value by counting the clock signals, wherein the difference between the first value and the fourth value corresponds to the first value, wherein the difference between the count value of the first counter and the count value of the second counter corresponds to the first value, wherein the second counter counts up when the first counter counts up, and wherein the second counter counts down when the first counter counts down;

a third counter receiving the clock signals, wherein the third counter generates a count value by counting up and down between the first value and the fourth value and between the third value and the second value by counting the clock signals, wherein the third counter begins to count down from the third value when the count value of the first counter matches the second value, wherein the third counter begins to count up from the second value when the count value of the second counter matches the second value, wherein the third counter begins to count up from the fourth value when the count value of the second counter matches the first value, and wherein the third counter begins to count down from the first value when the count value of the first counter matches the first value;

a fourth register storing a fifth value between the fourth value and the third value;

an up-down control circuit coupled to the first, second and third counters and controlling up and down counting of the first, second and third counters;

a compare circuit, wherein the compare circuit compares the fifth value with the respective count values of the first and second counters when the fifth value is between the first value and the second value, wherein the compare circuit compares the fifth value with the respective count values of the first counter counting up and the third counter counting up or with the respective count values of the first counter counting down and the third counter counting down when the fifth value is larger than the second value, and wherein the compare circuit compares the fifth value with the respective count values of the second counter counting down and the third counter counting down or with the respective count values of the second counter counting up and the third counter counting up when the fifth value is smaller than the second value, wherein complementary non-overlapped PWM signals are generated.

2. A circuit according to claim 1, further comprising:

a control logic circuit coupled to receive an output of the compare circuit, and having:

a first function for producing a positive phase signal of the complementary non-overlapped PWM signals, wherein, in a period when the fifth value is larger than the second value, the positive phase signal changes from a first state to a second state in response to the count value of the first counter matching the fifth value when the first counter is counting up, and changes from the second state to the first state in response to the count value of the first counter matching the fifth value when the first counter is counting down, and wherein, in a period when the fifth value is smaller than the first value, the positive phase signal changes from the first state to [a] the second state in response to the count value of the third counter matching the fifth value when the third counter is counting up, and changes from the second state to the first state in response to the count value of the third counter matching the fifth value when the third counter is counting down, and a second function for producing a negative phase signal of the complementary non-overlapped PWM signals, wherein, in the period when the fifth value is smaller than the first value, the negative phase signal changes from the second state to the first state in response to the count value of the second counter matching the fifth value when the second counter is counting up, and changes from the first state to the second state in response to the count value of the second counter matching the fifth value when the second counter is counting down, wherein, in the period when the fifth value is larger than the second value, the negative phase signal changes from the second state to the first state in response to the count value of the second counter matching the fifth value when the third counter is counting up, and changes from the first state to the second state in response to the count value of the second counter matching the fifth value when the third counter is counting down, first, second and third counters is compared with the sixth value during a period when the third counter is counting, wherein the fifth value corresponds to either a count-up or count-down operation of the first, second and third counters, and the sixth value corresponds to the other of the count-up or the count-down operation of the first, second and third counters.

3. A circuit according to claim 2,
wherein the complementary non-overlapped PWM signals are coupled to drive a motor.

4. A circuit according to claim 3,
wherein the fifth value in the fourth register is compared with the respective count values of the first, second and third counters in the period when the count value of the second counter is between the fourth value and the first value and in the period when the count value of the first counter is between the second value and the third value.

5. A circuit according to claim 3, further comprising:
a fifth register storing a sixth value that is to be stored in the fourth register as a new value after a period when the third counter stops counting,
wherein, when the sixth value is set in the fifth register, the count value of the respective first, second and third counters is compared with the sixth value during a period when the third counter is counting,
wherein the fifth value corresponds to either a count-up or count-down operation of the first, second and third counters, and the sixth value corresponds to the other of the count-up or the count-down operation of the first, second and third counters.

6. A timer circuit, included in a single-chip microcomputer, for generating complementary non-overlapped pulse width modulation signals, comprising:
a first register storing a first value;
a second register storing a second value larger than the first value;
a third register storing a third value larger than the second value, wherein the difference between the second value and the third value corresponds to the first value;
a first counter receiving clock signals, wherein the first counter generates a count value by counting up and down between the first value and the third value by counting the clock signals;
a second counter receiving the clock signals, wherein the second counter generates a count value by counting up and down between a fourth value smaller than the first value and the second value by counting the clock signals, wherein the difference between the first value and the fourth value corresponds to the first value, wherein the difference between the count value of the first counter and the count value of the second counter corresponds to the first value, wherein the second counter counts up when the first counter counts up, and wherein the second counter counts down when the first counter counts down;
a third counter receiving the clock signals, wherein the third counter generates a count value by counting up and down between the first value and the fourth value and between the third value and the second value by counting the clock signals, wherein the third counter begins to count down from the third value when the count value of the first counter matches the second value, wherein the third counter begins to count up from the second value when the count value of the second counter matches the second value, wherein the third counter begins to count up from the fourth value when the count value of the second counter matches the first value, and wherein the third counter begins to count down from the first value when the count value of the first counter matches the first value;
a fourth register storing a fifth value between the fourth value and the third value, wherein the fifth value is selectively changed by a central processing unit;
an up-down control circuit coupled to the first, second and third counters and controlling up and down counting of the first, second and third counters;
a compare circuit, wherein the compare circuit compares the fifth value with the respective count value of the first and second counters when the fifth value is between the first value and the second value, wherein the compare circuit compares the fifth value with the respective count value of the first counter counting up and the third counter counting up or with the respective count value of the first counter counting down and the third counter counting down when the fifth value is greater than the second value, and wherein the compare circuit compares the fifth value with the respective count value of the second counter counting down and the third counter counting down or with the respective count value of the second counter counting up and the third counter counting up when the fifth value is less than the second value, wherein complementary non-overlapped PWM signals are generated.

7. A timer circuit according to claim 6, further comprising:
a control logic circuit coupled to receive an output of the compare circuit and having:
a first function for producing a positive phase signal of the complementary non-overlapped PWM signals,
wherein, in a period when the fifth value is greater than the second value, the positive phase signal changes from a first state to a second state in response to the count value of the first counter matching the fifth value when the first counter is counting up, and changes from the second state to the first state in response to the count value of the first counter matching the fifth value when the first counter is counting down, and
wherein, in a period when the fifth value is less than the first value, the positive phase signal changes from the first state to the second state in response to the count value of the third counter matching the fifth value when the third counter is counting up, and changes from the second state to the first state in response to the count value of the third counter matching the fifth value when the third counter is counting down; and
a second function for producing a negative phase signal of the complementary non-overlapped PWM signals,
wherein, in the period when the fifth value is less than the first value, the negative phase signal changes from the second state to the first state in response to the count value of the second counter matching the fifth value when the second counter is counting up, and changes from the first state to the second state in response to the count value of the second counter matching the fifth value when the second counter is counting down,
wherein, in the period when the fifth value is greater than the second value, the negative phase signal changes from the second state to the first state in response to the count value of the second counter matching the fifth value when the third counter is counting up, and changes from the first state to the second state in response to the count value of the second counter matching the fifth value when the third counter is counting down.

8. A timer circuit according to claim 7, wherein the complementary non-overlapped PWM signals are coupled to drive a motor.

9. A timer circuit according to claim 7,
wherein the fifth value in the fourth register is compared with the respective count values of the first, second and third counters in the period when the count value of the second counter is between the fourth value and the first value and in the period when the count value of the first counter is between the second value and the third value.

10. A timer circuit according to claim 8, further comprising:
a fifth register storing a sixth value that is to be stored in the fourth register as a new value after a period when the third counter stops counting,
wherein, when the sixth value is set in the fifth register, the count value of the respective first, second and third counters are compared with the sixth value during a period when the third counter is counting,
wherein the fifth value corresponds to either a count-up or count-down operation of the first, second and third counters, and the sixth value corresponds to the other of the count-up or count-down operation of the first, second and third counters.

11. In a semiconductor integrated circuit, a method for producing complementary non-overlapping PWM signals, comprising the steps of:
counting between a first value and a third value with a first counter;
counting between a fourth value and a second value with a second counter;
wherein the first value is greater than the fourth value, the second value is greater than the first value, and the third value is greater than the second value;
counting between the second value and the third value and between the first value and the fourth value with a third counter, wherein the third counter counts down from the third value when the count value of the first counter matches the second value, wherein the third counter counts up from the second value when the count value of the second counter matches the second value, wherein the third counter counts up from the fourth value when the count value of the second counter matches the first value, and wherein the third counter counts down from the first value when the count value of the first counter matches the first value;
storing a fifth value;
generating the complementary non-overlapped PWM signals, wherein the step of generating the complementary non-overlapped PWM signals comprises the steps of comparing the fifth value with the respective count values of the first and second counters when the fifth value is between the first value and the second value, comparing the fifth value with the respective count values of the first counter counting up and the third counter counting up or with the respective count values of the first counter counting down and the third counter counting down when the fifth value is larger than the second value, and comparing the fifth value with the respective count values of the second counter counting down and the third counter counting down or with the respective count values of the second counter counting up and the third counter counting up when the fifth value is smaller than the second value.

12. The method of claim 11, wherein the fifth value is selectively changed by a central processing unit.

13. The method of claim 11, wherein the semiconductor integrated circuit comprises a single chip microcomputer.

14. The method of claim 11, wherein the complementary non-overlapping PWM signals are coupled to a motor.

15. The method of claim 14, wherein the motor is applied in an air conditioner, freezer, pump or machine tool.

16. The method of claim 11, wherein the third counter comprises a single counter for counting between the second value and the third value and between the first value and the fourth value.

17. The method of claim 11, wherein the fifth value corresponds to the duty cycle of the complementary non-overlapping PWM signals.

18. The method of claim 11, wherein the difference between the count values of the first and second counters corresponds to dead time in the complementary non-overlapping PWM signals.

19. The method of claim 11, wherein the second counter counts up when the first counter counts up, and wherein the second counter counts down when the first counter counts down.

\* \* \* \* \*

UNITED STATES PATENT AND TRADEMARK OFFICE
CERTIFICATE OF CORRECTION

PATENT NO : 5,933,344
DATED : 08/03/99
INVENTOR(S) : Mitsuishi et.al.

It is certified that the following errors appear in the above-identified patent and that said Letters Patent is hereby corrected as shown below:

Column 48, Line 33, delete "[a]".

Column 50, Line 20, delete "PWM" insert --pulse width modulation--.

Column 50, Line 26, delete "PWM" insert --pulse width modulation--.

Column 50, Line 47, delete "PWM" insert --pulse width modulation--.

Column 50, Line 66, delete "PWM" insert --pulse width modulation--.

Signed and Sealed this

Twenty-seventh Day of February, 2001

*Attest:*

NICHOLAS P. GODICI

*Attesting Officer*  Acting Director of the United States Patent and Trademark Office